(12) United States Patent
Murakami et al.

(10) Patent No.: US 12,292,408 B2
(45) Date of Patent: May 6, 2025

(54) ELECTROPHORESIS AND ELECTROTRANSFER DEVICES, SYSTEMS, AND METHODS

(71) Applicants: LIFE TECHNOLOGIES CORPORATION; LIFE TECHNOLOGIES HOLDINGS PTE LIMITED, Singapore (SG)

(72) Inventors: Marie Murakami, San Diego, CA (US); Kyle Bulloch, Rancho Santa Fe, CA (US); Neil Olson, San Diego, CA (US); Ross Winnick, San Diego, CA (US); Wei Fuh Teo, Johor (MY); Michael Thacker, San Diego, CA (US)

(73) Assignees: Life Technologies Corporation, Carlsbad, CA (US); Life Technologies Holdings PTE Limited, Singapore (SG)

( * ) Notice: Subject to any disclaimer, the term of this patent is extended or adjusted under 35 U.S.C. 154(b) by 0 days.

(21) Appl. No.: 17/305,651

(22) Filed: Jul. 12, 2021

(65) Prior Publication Data
US 2022/0011264 A1    Jan. 13, 2022

Related U.S. Application Data

(60) Provisional application No. 63/051,349, filed on Jul. 13, 2020.

(51) Int. Cl.
G01N 27/447    (2006.01)
(52) U.S. Cl.
CPC . *G01N 27/44739* (2013.01); *G01N 27/44713* (2013.01); *G01N 27/44743* (2013.01)

(58) Field of Classification Search
CPC ....... G01N 27/44739; G01N 27/44713; G01N 27/44743; G01N 27/44704; G01N 27/447; G01N 27/44782
See application file for complete search history.

(56) References Cited

U.S. PATENT DOCUMENTS 3,047,489 A    7/1962 Samuel
3,470,080 A    9/1969 Raymond et al.
(Continued)

FOREIGN PATENT DOCUMENTS

CN    102711904 A    10/2012
CN    201930012200.2    5/2019
(Continued)

OTHER PUBLICATIONS

Life Technologies, User Guide of Mini Gel Tank, Catalog No. A25977, Publication No. MAN0006968, 2014. https://assets.thermofisher.com/TFS-Assets/LSG/manuals/mini_gel_tank_man.pdf (Year: 2014).*

(Continued)

*Primary Examiner* — Luan V Van
*Assistant Examiner* — Shizhi Qian
(74) *Attorney, Agent, or Firm* — BakerHostetler

(57) ABSTRACT

Systems are provided for gel electrophoresis and electrotransfer that comprise one or more chambers that can removably and interchangeably receive either an electrophoresis cassette, or an electrotransfer cassette, and provide an electrical interface for both electrophoresis and electrotransfer of biomolecules. Electrophoresis devices including clamps and electrotransfer cassettes and related devices are provided. Methods for electrophoresis and electrotransfer using the systems and devices are also provided.

11 Claims, 61 Drawing Sheets

(56) References Cited

U.S. PATENT DOCUMENTS

| | | |
|---|---|---|
| 3,620,947 A | 11/1971 | Allen et al. |
| 3,719,580 A | 3/1973 | Roberts et al. |
| 3,856,655 A | 12/1974 | Roberts |
| 3,888,758 A | 6/1975 | Saeed |
| D236,881 S | 9/1975 | Mitchell |
| 4,049,534 A | 9/1977 | Posner |
| 4,284,491 A | 8/1981 | Vesterberg |
| D269,123 S | 5/1983 | Hoefer |
| 4,415,418 A | 11/1983 | Turre et al. |
| D282,352 S | 1/1986 | Hoefer et al. |
| 4,574,040 A | 3/1986 | Delony et al. |
| 4,576,702 A | 3/1986 | Peck et al. |
| 4,773,984 A | 9/1988 | Flesher et al. |
| D303,007 S | 8/1989 | Flesher et al. |
| D303,012 S | 8/1989 | Flesher et al. |
| D315,951 S | 4/1991 | Berninger et al. |
| 5,013,420 A | 5/1991 | Schuette |
| 5,415,758 A * | 5/1995 | Comeau ............. G01N 27/4473 204/464 |
| 5,433,837 A | 7/1995 | Brunk et al. |
| 6,001,233 A | 12/1999 | Levy |
| 6,110,340 A | 8/2000 | Lau et al. |
| 6,193,868 B1 | 2/2001 | Hsu |
| D443,068 S | 5/2001 | Manusu et al. |
| 6,436,262 B1 | 8/2002 | Perez |
| 6,451,193 B1 | 9/2002 | Fernwood et al. |
| 6,942,775 B1 | 9/2005 | Fox |
| D557,047 S | 12/2007 | Dretzka |
| 7,749,367 B2 | 7/2010 | Zhou |
| 7,867,372 B2 | 1/2011 | Cheung et al. |
| 8,192,601 B2 | 6/2012 | Latham |
| 8,357,278 B2 | 1/2013 | Latham |
| D698,037 S | 1/2014 | Nelson et al. |
| 8,715,476 B2 | 5/2014 | Latham et al. |
| 9,205,379 B2 | 12/2015 | Latham et al. |
| D748,815 S | 2/2016 | Murray et al. |
| D749,235 S | 2/2016 | Murray et al. |
| D757,958 S | 5/2016 | Murray et al. |
| D782,695 S | 3/2017 | Shanafelter et al. |
| D794,823 S | 8/2017 | Nelson et al. |
| 9,945,808 B2 | 4/2018 | Latham et al. |
| 9,945,809 B2 | 4/2018 | Mckee et al. |
| 9,945,810 B2 | 4/2018 | Jonsson et al. |
| 10,041,906 B2 | 8/2018 | Ran |
| D832,458 S | 10/2018 | Nelson et al. |
| 10,145,817 B2 | 12/2018 | Zhou |
| D851,779 S | 6/2019 | Bulloch et al. |
| D890,363 S | 7/2020 | Nelson et al. |
| D954,984 S | 6/2022 | Bonnoitt et al. |
| 2005/0103632 A1* | 5/2005 | Chen ................ G01N 27/44756 204/600 |
| 2006/0254918 A1 | 11/2006 | Jackson |
| 2007/0284250 A1* | 12/2007 | Magnant .......... G01N 27/44739 204/464 |
| 2008/0202935 A1* | 8/2008 | Cheung ............ G01N 27/44704 204/616 |
| 2010/0200406 A1 | 8/2010 | Qi et al. |
| 2010/0264030 A1 | 10/2010 | Arciniegas et al. |
| 2010/0326829 A1* | 12/2010 | Wang ............... G01N 27/44756 204/615 |
| 2011/0114487 A1 | 5/2011 | Schmidt et al. |
| 2016/0011147 A1 | 1/2016 | Jackson |
| 2016/0299099 A1 | 10/2016 | Uri et al. |
| 2017/0153204 A1* | 6/2017 | Bulloch ........... G01N 27/44747 |
| 2018/0348163 A1 | 12/2018 | Rongrong et al. |
| 2019/0153426 A1* | 5/2019 | Abrams ............. C12N 15/1017 |

FOREIGN PATENT DOCUMENTS

| | | | |
|---|---|---|---|
| CN | 209513819 U | 10/2019 | |
| IN | 201831035743 | 9/2018 | |
| IN | 201721020607 | 8/2019 | |
| KR | 10-1964614 B1 | 4/2019 | |
| KR | 10-1977839 B1 | 5/2019 | |
| WO | 2002/077630 A1 | 10/2002 | |
| WO | WO-2005098408 A1 * | 10/2005 | ....... G01N 27/44739 |
| WO | 2006/047885 A2 | 5/2006 | |
| WO | 2015/079048 A1 | 6/2015 | |
| WO | 2018/228447 A1 | 12/2018 | |

OTHER PUBLICATIONS

International Search Report and Written Opinion received for PCT Patent Application No. PCT/US21/41312, mailed on Apr. 21, 2022, 30 pages.

Thermofisher: "Mini Blot Module: For transfer of proteins using the Mini Gel Tank", Catalog No. B1000, Online manual, Sep. 15, 2014, 30 pages.

Thermofisher: "Mini Gel Tank", Invitrogen, Catalog No. A25977, Online manual, Dec. 12, 2015, 2 pages.

Invitrogen Electrophoresis System, Online, Published date unknown, Retrieved on Sep. 11, 2024 from URL: https://www.ebay.com/itm186490297548.

* cited by examiner

ELECTROPHORESIS AND ELECTROTRANSFER DEVICES, SYSTEMS, AND METHODS

CROSS-REFERENCE TO RELATED APPLICATIONS

This application claims benefit of U.S. Provisional Application No. 63/051,349 filed Jul. 13, 2020, which is incorporated herein by reference in its entirety.

FIELD

The present disclosure generally relates to systems that can perform both electrophoresis and electrotransfer of biomolecules. The disclosure further relates to electrophoresis systems, electrophoresis devices, electrotransfer systems and electrotransfer devices. Methods of electrophoresis and electrotransfer using the systems and devices are also described.

BACKGROUND

Electrophoresis is a common procedure for the separation of biological molecules (biomolecules), such as nucleic acids, DNA, RNA, polypeptides and proteins based on their size and charge. In gel electrophoresis, biomolecules can be separated into bands by an electric field that causes the molecules to migrate through a filtering matrix. Typical filtering matrices comprise gels. Electrophoresis cassettes comprise a slab of a filtering matrix (such as a gel), that is sandwiched between two glass or plastic plates. Gels have an open molecular network structure defining pores that are saturated with an electrically conductive buffered solution including a salt. These pores are large enough to enable passage of biomolecules migrating through the gel in response to an electrical field. Several types of gels can be used for electrophoresis such as, but not limited to, polyacrylamide gels, agarose gels and starch gels.

During electrophoresis, a gel, in a pre-cast or a self-cast electrophoresis cassette, is typically loaded with samples containing biomolecules and a tracking dye and placed in a chamber having a cathode and an anode in contact with buffer solutions that enable formation of an electric field across the gel when connected to an electrical power supply. The electric field so generated, is applied across the gel and consists of a negative charge at one end and a positive charge at the other end, causing sample biomolecules and tracking dye to separate from each other and migrate toward the bottom of the gel. The electrophoresis is halted before the biomolecule of interest reaches the end of the gel.

Electrophoretically separated biomolecules are typically transferred from the separating gel onto another material in order to perform additional analysis on the biomolecules such as, but not limited to, immunological characterization, chemical reactions, quantitation, etc. Electro-blotting or electrotransfer is a method known in the art for transferring resolved or separated biomolecules from a gel onto another material.

In an electrotransfer, following electrophoretic separation of biomolecules, the electrophoresis gel containing the separated biomolecules is placed in contact with a relatively thin material or support. The material is typically a porous material, such as, but not limited to, a nitrocellulose-based membrane, a PVDF-based membrane, an activated paper, an activated nylon membrane or the like. A buffer is added to the electrotransfer device and an electrical current is passed through the sandwiched gel and blotting membrane in a direction generally perpendicular to the surface of the blotting membrane. This results in some or most of the biomolecules being electrophoretically transferred from the gel to the porous material.

Existing systems, apparatus and methods of electrophoresis or electrotransfer require separate systems and devices for each procedure. For example, for electrophoresis, a gel cassette, a gel tank to retain the gel cassette and electrophoresis buffer, and electrodes to support electrical connectivity are some of the multiple separate pieces of equipment required. For electrotransfer, one requires an electrotransfer stack, electrodes, a container to hold the stack and electrotransfer buffer, and electrical connectivity. Each procedure has multiple time-consuming steps and needs different sets of equipment. In addition, existing electrophoresis systems often have issues with usage of large quantities of buffers such as overflow of buffers and/or spillover and/or leakage of buffers from anode and cathode buffer reservoirs. Wet electrotransfer systems in the art also have similar problems including buffer spill-over, and/or leaking of buffers during assembly and run, usage and waste of large buffer quantities during stack assembly, etc. Wet electrotransfer systems also often generate large volumes of hazardous waste such as waste transfer buffer that typically contains methanol or other hazardous material. A need exists in the art for better gel electrophoresis and electrotransfer devices, systems, and methods.

SUMMARY

The systems, devices, and methods described herein address several problems in the art. In some embodiments, systems, devices, and methods described herein address problems in the art by providing a single system that can be used for both gel electrophoresis and electrotransfer. In some embodiments, systems, devices, and methods described herein address the problems in the art by providing leak-free gel electrophoresis and/or electrotransfer devices and systems. In some embodiments, systems, devices, and methods described herein address the problems in the art by providing increased throughput for electrophoresis and/or electrotransfer, lower buffer volume requirements and reduced volumes of liquid hazardous waste.

In one embodiment, a system for gel electrophoresis and electrotransfer comprises at least one chamber, one compartment, one vessel, or one component, that can removably and interchangeably receive either an electrophoresis cassette, or an electrotransfer cassette, and can provide an electrical interface for both electrophoresis and electrotransfer of biomolecules.

In one embodiment, a system has at least two chambers to allow parallel processing of electrophoresis and/or electrotransfer of biomolecules on two or more gels or transfer membranes.

In some embodiments, a system of the disclosure can comprise two or more chambers to enable simultaneous electrophoretic separation and/or simultaneous electrotransfer of multiple gels/matrices/membranes/materials.

While most embodiments in this disclosure are described with a non-limiting example of two chambers, the present teachings can be extended to one chamber, or to more than two chambers placed adjacent to each other to increase the throughput. In some embodiments, at least two chambers in a system of the disclosure, can be arranged back to back, or side-by-side, or adjacent to each other, or can be arranged in tandem, or can be abutting each other, or are placed adjoining each other or can be stacked, or can be vertically stacked one over the other, or diagonally joined, or vertically stacked and staggered with one chamber above and the other chamber behind the other, and/or tilting one or both chambers relative to each other at an angle.

Some embodiments describe, a gel electrophoresis cassette and clamping systems that can be placed into a system of the disclosure, wherein the system can perform both gel electrophoresis and electrotransfer. Some embodiments describe various electrotransfer cassettes that can be placed into a system of the disclosure, wherein the system can perform both gel electrophoresis and electrotransfer.

Systems, devices, cassettes and methods of the disclosure, advantageously result in one or more of the foregoing including: one system for electrophoresis and electrotransfer, ability to conduct high throughput electrophoresis and/or electrotransfer of biomolecules in two or more gels or transfer membranes at the same time, reduced number of devices or components, reduced cost, reduced accessories, reduced footprint of equipment needed, reduced space for storage of systems and devices, reduced buffer spill-over, reduced leakage, reduced or no overfill of buffers, reduced amount of buffers used, and reduced liquid hazardous waste as compared to existing systems and devices for electrophoresis or electrotransfer. In contrast to some existing devices and systems for electrophoresis or electrotransfer, the present systems and devices for electrophoresis and electrotransfer, reduced preparatory work by not requiring chilling buffers or freezing ice packs for use to reduce temperatures during use. Devices and systems of the present disclosure, in some embodiments, use lower voltages and power.

In one embodiment, the present disclosure describes a system comprising at least one chamber or one compartment configured to receive either an electrophoresis cassette or an electrotransfer cassette. The system further comprises electrodes and electrical connections that can connect to a power source to provide electrical connectivity to the chamber for facilitating electrophoresis or electrotransfer in the electrophoresis cassette or the electrotransfer cassette placed in the chamber.

In some embodiments, a system of the disclosure comprises at least two chambers where each chamber is independently configured to receive either an electrophoresis cassette or an electrotransfer cassette, a first electrode and a second electrode.

In some embodiments, a system of the present disclosure comprises at least two chambers, each chamber independently configured to receive either an electrophoresis cassette or an electrotransfer cassette, a first electrode, and a second electrode, wherein the electrodes have an electrical interface that can be connected to an external or internal power supply. In some embodiments, the first electrode and the second electrode have interfaces that extend into each chamber such that each chamber has an anode and a cathode.

In some embodiments, the first electrode spans both chambers or has an interface that spans both chambers and is configured to electrically contact an electrical interface located on an electrotransfer cassette. In some embodiments, the first electrode has an extension into each chamber that functions as an anode during electrophoresis.

In some embodiments, the second electrode has extensions configured to contact a second electrode interface located on an electrotransfer cassette. In some embodiments, the second electrode spans both chambers or has an interface that spans both chambers and is configured to electrically contact an electrical interface located on an electrotransfer cassette. In some embodiments, the second electrode has extensions that function as cathodes in each chamber during electrophoresis.

In some embodiments, the first electrode is an anode and the second electrode is a cathode.

In some embodiments, a first electrode spans both chambers or is split into component or electrode interfaces that are located in each chamber of a system of the present disclosure. In some embodiments, a second electrode spans both chambers or is split into component or electrode interfaces that are located in each chamber of a system of the disclosure.

In some embodiments of a system of the disclosure, a first electrode (including its interfaces and components) is connected to a common first electrical node and the second electrode (including its interfaces and components) is connected to a common second electrode node. In some embodiments, the first electrode node and the second electrode node are located on portions of the chambers or the system that are configured to electrically connect with a power supply.

In some embodiments, the first electrode node and the second electrode node are located on portions of the chambers or the system that make contact with a lid configured to cover the system.

In some embodiments, systems of the disclosure, can additionally comprise a lid configured to cover the at least one or more chambers or compartments. In one embodiment, a lid of a system of the disclosure comprises an electrical connection that is removably connectable to a power source, and one or more electrical contacts configured to electrically connect with chamber electrodes to complete an electrical circuit in a chamber or a compartment, when the lid is placed on the device, to facilitate electrophoresis and/or electrotransfer. Electrodes in at least one chamber are also configured to connect electrically with electrical interfaces of electrotransfer cassettes of the disclosure.

In some embodiments, a lid of the system can comprise an electrical connection that is removably connectable to a power source comprising one or more cables and/or one or more plugs that can be plugged into a power source. An external power source is typically used with a system of the disclosure. However, systems of the disclosure can comprise an internal power source as well.

In some embodiments, a lid of the system can comprise mechanical features that interact with complimentary mechanical features on the top of the chambers such that the electrical contacts on the lid connect with the first electrical node and the second electrical node in an orientation that prevents reversal of electrodes when the system is in use. In some embodiments a lid comprises mechanical features such as grooves that can engage with an users fingers to allow removal of the lid with ease.

In some embodiments, a lid of the system can comprise color coded features operable to cover the chambers in an orientation that allows lid electrical contacts to connect with the corresponding first electrical node and the second electrical node that prevents reversal of electrodes when in use.

In some embodiments, a lid of the system can comprise at least one feature, such as one or more cable hooks which allow the electrical cables to wrap around the lid and remain secure during storage. In some embodiments, a lid of the system has one or more air vents that allow venting of buffer steam during electrophoresis or electrotransfer. In some embodiments, a lid is made of a transparent or translucent materials that allows visibility during use to view if the set-up is correct and to view performance.

In some embodiments, when a lid is used with an electrophoresis system, mechanical features such as ridges or grooves on the underside of the lid allow the lid to fit on the chambers only when the cam handles (used to secure an electrophoresis gel cassette to a system) are locked.

In one embodiment, the present disclosure describes a system comprising at least two chambers, each chamber independently configured to receive either an electrophoresis cassette or an electrotransfer cassette, three electrodes, and a lid configured to cover the chambers, the lid comprising an electrical connection that is removably connectable to a power source, and one or more electrical contacts configured to electrically connect with the electrodes to complete an electrical circuit for each of the two chambers, when the lid is placed on the chambers. In some embodiments of the system, the three electrodes comprise a first electrode that spans both chambers and a second electrode located in each chamber. In some embodiments, the lid comprises at least two electrical contacts configured to electrically connect with the first electrode and the second electrode to complete an electrical circuit for each of the two chambers, when the lid is placed on the device.

In some embodiments, the at least two chambers of a system of the disclosure are separated by at least one common surface between them. Non-limiting examples of a common surface between the chambers includes a wall between at least a portion of the two chambers, a partition between at least a portion of the two chambers, a common connector and the like. In some embodiments, the at least two chambers are separated by a space between the two chambers. In some embodiments, the at least two chambers are separated by common surface and a space between the at least two chambers.

Each chamber has at least a first interior surface and a second interior surface. Additional interior surfaces can be present. In some embodiments, a system of the disclosure can further comprise a gasket located adjacent to or on portions of one of the interior surfaces of the chamber. In some embodiments, a system of the disclosure can further comprise a gasket located adjacent to or on portions of the first interior surface. Typically, a three-sided gasket is used which in non-limiting examples can be a C-shaped or a U-shaped gasket. Alternatively, a two-sided, or a four-sided gasket can be used as well.

In embodiments, where a system of the disclosure or at least one chamber thereof is used for electrophoresis, one or two electrophoresis cassettes can be placed into a chamber or compartment of the system. In some embodiments, an electrophoresis cassette for use in a system of the disclosure comprises two parallel plates having a gel enclosed between the two plates. Each chamber or compartment of a system of the disclosure is configured to independently receive an electrophoresis cassette and is further configured to independently receive a clamping or securing mechanism that is operable to clamp an electrophoresis cassette in one or more chambers/compartments. In some embodiments, a clamping mechanism of the disclosure is operable to clamp an electrophoresis cassette to an interior surface of a chamber/compartment. In some embodiments, a clamping mechanism of the disclosure is operable to clamp an electrophoresis cassette to a sealing mechanism such as a gasket, or a clamping or securing mechanism inside a chamber/compartment. In some embodiments, a gasket is placed on at least a portion of an inner surface of a chamber/compartment of a system of the disclosure. Typically, a three-sided gasket is used which in non-limiting examples can be a C-shaped or a U-shaped gasket. Alternatively, a two-sided, or a four-sided gasket can be used as well.

In some embodiments, the present disclosure provides a system for performing gel electrophoresis comprising: a base comprising at least two chambers, each chamber configured to independently receive an electrophoresis cassette comprising two parallel plates enclosing a gel, each chamber configured to independently receive a clamp for securing the electrophoresis cassette to a surface of each chamber, a single first electrode spanning the two chambers, each chamber having a separate second electrode connected at a common electrical node, a removable lid providing electrical connectivity to a power source, and the lid having electrical connectors to complete the circuit between the chamber electrodes when placed over the base. In one embodiment, a system for electrophoresis of the disclosure comprises one electrophoresis cassette. In one embodiment, a system for electrophoresis of the disclosure comprises two electrophoresis cassettes.

In some embodiments, the first electrode of a chamber further comprises a conducting wire that runs along the bottom of each chamber to enable electrical current to flow across the chamber for electrophoresis. In some embodiments, a wire that runs along the bottom of each chamber serves as the anode during electrophoresis when an electrophoresis cassette is placed in one or both chambers. The conducting wire is made of any conductible material, such as but not limited to, platinum, gold, silver, copper, palladium, steel, stainless steel, iridium, conductive plastics, or any coated conductive material.

Embodiments of the present disclosure relate to a clamp for securing an electrophoresis cassette to a surface. In one embodiment, a clamp of the disclosure comprises: a cam plate having a flat surface, two protruding ridges and two protruding edges both located on a first side of the flat surface, the protruding ridges of the cam plate configured to be placed adjacent to and in contact with the edges of a first plate of the electrophoresis cassette, two independently movable cam handles that are operable to move forward toward the cam plate or backward away from the cam plate, the two cam handles attached to the cam plate via a peg located on the cam plate, wherein moving the cam handles forward toward the cam plate secures an electrophoresis cassette to the surface, and wherein moving the cam handles backward away from the cam plate releases the electrophoresis cassette from the surface. The two protruding edges located perpendicular to the flat surface of the cam plate that faces the electrophoresis cassette are positioned adjacent to the cam arms and provide a guide to the placement of the electrophoresis cassette. Optionally, the cam plate can also have two additional protrusions located on the second side of the flat surface of the cam plate that protrude at the edges of the cam plate in a plane perpendicular to the flat surface of the cam plate that faces away from the electrophoresis cassette.

In another embodiment, a clamp of the disclosure comprises: a cam plate having a flat surface and two protruding ridges, the protruding ridges of the cam plate are configured to be placed adjacent to and in contact with the edges of a first plate of the electrophoresis cassette, two independently movable cam handles that are operable to move forward toward the cam plate or backward away from the cam plate, the two cam handles attached to the cam plate via a peg located on the cam plate, wherein moving the cam handles forward toward the cam plate secures an electrophoresis cassette to the surface, and wherein moving the cam handles backward away from the cam plate releases the electrophoresis cassette from the surface.

In some embodiments, cam handles of a clamp of the disclosure can move from 0 degree to 180 degree range of motion. In some embodiments, cam handles of a clamp of the disclosure can move from 0 degree to 45 degree range of motion.

In some embodiments, a clamp of the disclosure comprises a plurality of nubs on the bottom side of a flat surface of a cam plate. In some embodiments, a clamp of the disclosure comprises a plurality of nubs on the bottom side of a flat surface of a cam plate that faces the gel cassette. Number of nubs can vary. In some non-limiting exemplary embodiments, 1 nubs, 2 nubs, 3 nubs, 4 nubs, 5 nubs, 6 nubs, 7 nubs, 8 nubs, 9 nubs, 10 nubs etc., are on the bottom side of a flat surface of a cam plate that faces the gel cassette. Nub design can vary in shape and size. In some embodiments, the nubs are configured to distribute pressure on all parts of the gel cassette plate at the bottom to prevent warping or bowing of the gel cassette during electrophoresis and/or when the gel cassette is secured for electrophoresis. In some embodiments, the nubs allow for free circulation of buffer ions at the bottom of the cassette.

In some embodiments, a surface onto which a clamp of the disclosure clamps or secures an electrophoresis cassette is a surface on a portion or part of an electrophoresis tank. In some embodiments, a surface onto which a clamp of the disclosure clamps or secures an electrophoresis cassette is a surface on a portion or part of a system of the disclosure that can perform both electrophoresis and/or electrotransfer.

In some embodiments, a surface onto which a clamp of the disclosure clamps or secures an electrophoresis cassette is a gasket located on a portion, or a part or a wall or a surface of an electrophoresis tank or a gasket located on a portion, or a part or a wall or a surface of a system of the disclosure that can perform both electrophoresis and/or electrotransfer.

A clamping mechanism of the disclosure or a clamp of the disclosure creates or forms a liquid-proof seal between an electrophoresis cassette and a gasket in a chamber/compartment of the system. In some embodiments, clamping an electrophoresis cassette into a chamber or compartment of a system of the disclosure, results in two fluidically separated sub-chambers/sub-compartments in the chamber or compartment. In some embodiments, a first sub-chamber/sub-compartment is formed between a portion of the first interior surface of a chamber/compartment, a portion of a gasket, and a plate of the electrophoresis cassette that faces the first interior surface of the chamber of a system into which the electrophoresis cassette and clamp are placed. In some embodiments, a portion of a gasket forming the first sub-chamber comprises three sides of a gasket and can include the left and right sides and a bottom side of a gasket. In some embodiments, a second sub-chamber/sub-compartment is formed between the left and right sides of the gel cassette, the side of the gel cassette that faces toward the second interior surface and the remainder of the chamber of the system into which the electrophoresis cassette and clamp are placed.

Sub-chambers or sub-compartments so formed, during use of the system, can be filled with buffers for electrophoresis and can function as a first and a second buffer reservoir.

In some embodiments, a first buffer reservoir is formed between a portion of the first interior surface of a chamber/compartment, a portion of a gasket, and a plate of the electrophoresis cassette that faces the first interior surface of the chamber of a system into which the electrophoresis cassette and clamp are placed. In some embodiments, a second buffer reservoir is formed between the right and left side edges of the gel cassette, the plates/sides of the gel cassette that faces toward the second interior surface and the remainder of the chamber into which the electrophoresis cassette and clamp are placed.

The system of the present disclosure is not limited to any size and can be scaled up or down to accommodate electrophoresis cassettes or electrotransfer cassettes of any size. For example, electrophoresis cassettes that can be used can include one or more mini-gel cassettes, midi-gel cassettes, large gel cassettes. In other non-limiting examples, each chamber of a system of the disclosure can accommodate electrophoresis buffer volumes of from about 30 ml to 5 liters.

In some embodiments of a system of the disclosure, one or both chambers of the system have an electrophoresis cassette and a clamp. In some embodiments of a system of the disclosure, one or both chambers of the system have an electrotransfer cassette.

In some embodiments of a system of the disclosure, one chamber of the system has an electrophoresis cassette and a clamp, and, the other chamber of the system has an electrotransfer cassette.

Embodiments of the present disclosure relate to electrotransfer cassettes. In one embodiment, an electrotransfer cassette of the disclosure comprises two plates (or shells) that can be joined, reversibly or permanently, by at least one joining mechanism to allow the two plates to move between an open position and a closed position, a locking mechanism to lock the two plates in the closed position, a sealing mechanism operable to seal the two plates in the closed position to form a liquid-proof seal on at least three sides, a second plate configured to receive components of a transfer stack on its interior side, and the external sides of the first plate and the second plate comprising at least one electrical interface each that is connected to an electrode located on the inside of each plate.

In embodiments, where a liquid-proof seal is formed on three sides of the electrotransfer cassette, the three sides are the bottom side, the left side and the right side of the cassette. In some embodiments, the liquid proof seal is formed on all four sides of the electrotransfer cassette.

In some embodiments, a joining mechanism of an electrotransfer cassette, comprise one or more of the following: a hinge, a plurality of hinges, a dis-connected hinge, a clamp, one or more hooks, one or more clips, mechanical components on both plates (or shells) that can slide and interlock, gluing, taping, bonding or welding two plates together, linkage designs, two plates connected by flexible material, or external components to join two plates. In some embodiments, the joining mechanism are reversible or permanent joining mechanisms. Permanent joining mechanisms allow for the two plates to stay together as one component. This can be advantageous for users as they provide fewer components and/or allow for easier closure of plates since there is no need to align plates prior to closure. Reversible joining mechanisms allow for two separate shells.

In some embodiments, electrodes located inside the two plates of an electrotransfer cassette of the disclosure, are plate electrodes that are embedded in or placed on the inner surface of each plate. In alternate embodiments, electrodes located inside the two plates of an electrotransfer cassette can be wire electrodes, wire mesh electrodes, or bar electrodes. These electrodes can be made of conductive materials such as but not limited to steel, stainless steel, copper, platinum, palladium, iridium, titanium, conductively coated materials, conductive plastics, etc.

In some embodiments, the external electrical interfaces of the plate electrodes can be springs, electrical nodes, brackets, pins, plugs, or any design that allows for an electrical contact such as an electroplated interface to the electrode. The external electrical interfaces are configured to physically or electrically connect with electrodes or electrode extensions that have electrical connections to a power supply. The electrodes or electrode extensions can be comprised in a system of the disclosure that can perform both electrophoresis and/or electrotransfer. The electrodes or electrode extensions can be comprised in any system that can perform electrotransfer.

In one embodiment, in a system of the present disclosure, the first electrode that spans both chambers is configured to contact a first electrode interface on an electrotransfer cassette that can be placed into one or more chambers. In some embodiments, the first electrode interface of an electrotransfer cassette is an anode interface.

In some embodiments, the second electrode of a chamber/compartment of the present disclosure has extensions configured to contact a second electrode interface on an electrotransfer cassette that can be placed into one or more chambers. In some embodiments, the second electrode interface of an electrotransfer cassette is a cathode interface.

Non-limiting examples of electrode interfaces in systems, cassettes, devices and other components of the present disclosure can be springs, nodes, adaptors, plugs, connectors, plugs, and pins.

In some embodiments, a locking mechanism of an electrotransfer cassette of the present disclosure comprises a slider. A slider, in some embodiments, comprises: a band that wraps around portions of the width of the exterior side of the first plate, side extensions of the band that further wrap around portions of the depth of the exterior side of the first plate, and elements operable to reversibly engage with portions on the exterior side of the second plate to form a lock between the first and second plates when engaged. In some embodiments, when the two plates are closed, a slider of the electrotransfer cassette of the disclosure aligns with corresponding elements on the second plate that are operable to slide to form a lock.

In some embodiments, a locking mechanism can be a slider that can be attached to one of the plates via one or more mounting features. The slider, in some embodiments, can have mating mounting features that are operable and attach the slider permanently or reversibly to the plate. In some embodiments, a locking mechanism can be a slider located on one plate with mechanical mating features on the slider that can mate with corresponding mechanical features located on the other plate. Mating features are typically located on both sides of each plates.

In some embodiments, a locking mechanism can be a clamp on one plate and a clamp closure located on the other plate. Clamping mechanism is typically attached to one plate via a mounting feature. The clamp typically has mating mounting features which allow the clamp to attach to the other plate. Several mounting features can be used for example, a peg and hole mechanism and the like.

In some embodiments, a sealing mechanism of an electrotransfer cassette of the disclosure comprises at least one slider. In one example embodiment, when the two plates are closed, the slider (as described above) is moved in the direction toward the top end of the plates to form a lock and a liquid-proof seal on at least three sides of the electrotransfer cassette. In one example embodiment, when the two plates are closed, a slider is moved in the direction toward the bottom end of the plates to form a lock and a liquid-proof seal on at least three sides of the electrotransfer cassette. In one example embodiment, when the two plates are closed, a slider which is located on one of the sides of the closed plates is moved either up or down to form a lock and a liquid-proof seal on at least three sides of the electrotransfer cassette. In some embodiments, a liquid-proof seal can be formed on all the four sides of an electrotransfer cassette. Formation of a liquid-proof seal (or liquid-tight seal) creates or forms a liquid reservoir inside the electrotransfer cassette. In some embodiments, a sealing mechanism of an electrotransfer cassette of the disclosure can additionally comprises a gasket that is placed on one of the two plates of the electrotransfer cassette.

In some embodiments, the lip or a protrusion can be located on the first plate or on the second plate. The lip or opening allows ease of dispensing a liquid into or out of the electrotransfer cassette. The lip or protrusion can also provide additional structural support to the cassette. In some embodiments, the second plate has a lip or a protrusion or an opening on the top side that is operable to dispense a liquid (such as transfer buffer) into the electrotransfer cassette after it is sealed on the other three sides or to pour liquids out of the cassette after completion of electrotransfer. An electrotransfer cassette can have a visual marker such as a fill line or other indication inside the liquid reservoir to indicate the amount of liquid (such as electrotransfer buffer) to be filled by a user.

In some embodiments, an electrotransfer cassette of the disclosure, further comprises elements that provide a support structure located on the external or internal side of the first plate or the second plate. In some embodiments, a support structure for an electrotransfer cassette of the disclosure, can be located external to the cassette. In non-limiting examples, a support structure can reduce or prevent warping or bowing of the first plate. In non-limiting exemplary embodiments, a support structure can comprise one or more ribs, one or more ridges, one or more grooves, one or more protruded structures, a concave surface or a convex structure, one or more reinforcement elements that can be added externally or combined with the plate, nubs, inserts, supports located in the electrotransfer system that provides support and/or rigidity to the electrode plates of the electrotransfer cassette. In some embodiments, one or more support structures allow the two electrode plates to be parallel to each other which allows uniform electrical fields for efficient transfer of biomolecules during electrotransfer.

In some embodiments, a support structure allows the second plate to rest at an angle. In some embodiments, the angle caused by the support structure allows for an ergonomic advantage to assemble and/or view the transfer stack. In some embodiments, the angle of the support structure allows the second plate to contain a volume of transfer buffer which aids in keeping the transfer stack hydrated throughout assembly. In some embodiments, the angle of the support structure reduces buffer spillage during assembly of the transfer stack on the second plate.

In some embodiments, an electrotransfer cassette of the present disclosure is configured to be placed in a system of the disclosure that can perform both electrophoresis and/or electrotransfer. In some embodiments, an electrotransfer cassette of the present disclosure is configured to be placed in any system that can perform electrotransfer. In some embodiments, an electrotransfer cassette an electrotransfer system after it is locked and sealed.

In non-limiting examples, electrotransfer cassettes that can be used can include cassettes that can be used to simultaneously transfer biomolecules from one or more mini-gel cassettes, one or more midi-gel cassettes, one or more large gel cassettes to one or more electro transfer membranes.

In some embodiments, in use, a liquid reservoir of a closed and sealed electrotransfer cassette of the present disclosure, is filled with a buffer and placed in a chamber of a system of the disclosure that can perform both electrophoresis and/or electrotransfer and the lid of the system is placed on the chamber and connected to a power source to complete the electrical circuit of the electrotransfer cassette system. In some embodiments, in use, buffer is not filled in the liquid reservoir prior to electrotransfer.

In some embodiments, the present disclosure provides a system for performing electrotransfer comprising: at least two chambers, a single first electrode spanning the two chambers of the base, connected to a first electrical node located on a top side of the base, a second electrode located in each chamber, the two second electrodes connected at a common second electrical node located on the top side of the base, each chamber configured to independently receive an electrotransfer cassette, the electrotransfer cassette comprising: two plates joined by a joining mechanism configured to allow the two plates to move from an open position and a closed position, a locking mechanism operable to lock the two plates; and a sealing mechanism operable to for a liquid-proof seal on at least three sides of the electrotransfer cassette, a second plate configured to receive components of a transfer stack on its interior side, and the external sides of the first plate and the second plate comprising at least one electrical connection each that is connected to an electrode located on the inside of each plate, the electrical connections on the first and second plate in electrical contact with the first and second electrodes of the chambers, and a removable lid that covers the chambers, the lid providing electrical connectivity to a power source, and the lid having electrical connectors that electrically connect with the electrical connections of the electrotransfer cassette to complete the circuit when the electrotransfer cassette is placed in the base and the lid covers the base. In some embodiments, the locking mechanism comprises a slider operable to lock (or to clamp or to bias) the two plates in the closed position. In some embodiments, the sealing mechanism comprises the slider that can seal the two plates in the closed position to form a liquid-proof seal on at least three sides. In some embodiment, the sealing mechanism further comprises at least one gasket located in at least one of the two plates. In one embodiment, a system for electrotransfer of the disclosure comprises one electrotransfer cassette. In one embodiment, a system for electrotransfer of the disclosure comprises comprising two electrotransfer cassettes.

Embodiments of the disclosure relate to methods of performing gel electrophoresis or electrotransfer using the devices and systems described herein.

In some embodiments, a method of performing gel electrophoresis comprises: obtaining an electrophoresis cassette with a gel; removing a gel comb from the electrophoresis cassette; optionally rinsing the wells with water or running buffer; placing the electrophoresis cassette into at least one chamber of a system of the present disclosure; placing a clamp of the disclosure into the chamber and clamping the gel cassette onto a portion of a surface of the chamber; pouring an electrophoresis buffer into the first buffer reservoir; pouring an electrophoresis buffer into the second buffer reservoir; loading samples and controls into the wells; connecting the electrical nodes/interfaces/connection of the system (that are electrically connected to the electrodes of the chambers) to a power source; selecting a voltage and a time on a power supply unit; performing electrophoresis on the samples and controls.

In some embodiments of the method, the gel cassette is placed adjacent to a gasket that is present on a wall of the at least one chamber. In some embodiments, the clamping step comprises moving cam handles of a clamp of the disclosure toward the gel cassette to lock them in place.

In some embodiments, wherein a system of the disclosure has a lid, the step of connecting the electrical nodes/interfaces/connection in the system to a power source comprises the steps of: placing a lid onto the system such that the lid electrical connections are connected in the correct polarity to the system electrode interfaces/nodes/connections; and connecting the plug in the lid to a power source.

The present disclosure also provides electrotransfer cassettes and electrotransfer systems. In some embodiments, a gel used for electrotransfer of biomolecules from the gel onto a transfer membrane, is a gel run in any electrophoresis system. In other embodiments, a gel used for an electrotransfer method of the disclosure can be a gel run in an electrophoresis system as described above.

In some embodiments, a gel on which electrophoresis has been performed to resolve biomolecules is first removed from an electrophoresis cassette. This typically involves prying or breaking an electrophoresis cassette open with a gel knife and removing the gel prior to assembling a transfer stack. A transfer stack typically comprises a sponge, and one or more layers of filter paper (and/or other porous/gel like materials soaked in electrotransfer buffer), followed by a gel onto which biomolecules that are resolved by electrophoresis is placed onto, followed by a transfer membrane (typically nitrocellulose, PVDF or any porous material), another stack of one or more layers of filter paper and another sponge soaked in electrotransfer buffer. This stack can be assembled onto one plate of an electrotransfer cassette. Typically, the plate in the electrotransfer cassette having the cathode is the plate in which the stack is assembled on top of In some embodiments of this disclosure, a tray of the disclosure is designed to place an electrotransfer cassette in the open position and assemble the transfer stack. Trays of the disclosure are designed to contain the excess buffer and avoid spillage and messes on lab benches and tables as well as to provide a container to soak consumables in buffer prior to transfer.

In one embodiment, a method of performing electrotransfer of biomolecules comprises: obtaining a gel onto which biomolecules have been separated by electrophoresis; assembling a transfer stack onto a second plate of an electrotransfer cassette of the disclosure comprising placing a blotting material on top of the gel and further placing filter papers and sponges above and below the blotting material and gel stack; closing the first plate of the electrotransfer cassette on to the second plate; locking and sealing the electrotransfer cassette on at least three sides by a locking and sealing mechanism on the electrotransfer cassette; placing the electrotransfer cassette into at least one chamber of a system of the disclosure that can perform electrotransfer and electrophoresis; connecting the electrical connection/nodes/interfaces on the system to a power source; selecting a transfer voltage and a run-time on the power supply; performing electrotransfer of biomolecules from the gel onto the blotting material.

In one embodiment the locking and sealing is by sliding a slider on the electrotransfer cassette to lock and seal the electrotransfer cassette. In one embodiment the locking and sealing is by clamping a clamp on the electrotransfer cassette to lock and seal the electrotransfer cassette. In one embodiment, the sealing is by a gasket located on at least one of the two plates of the electrotransfer cassette. The gasket can be a three-sided or a four-sided gasket.

In some embodiments, the sealing forms a liquid-proof seal. In some embodiments the liquid-proof seal is formed on at least three sides of the electrotransfer cassette. In one embodiment, placing the electrotransfer cassette into a chamber of a system of the disclosure comprises: standing the electrotransfer cassette such that the joining side (hinge/hook side) is on the bottom of the system and the unsealed fourth side is on top. At this stage, the method can comprise optionally pouring an electrotransfer buffer into the opening on top of the electrotransfer cassette. In some embodiments, there is no need to pour additional electrotransfer buffer into the electrotransfer cassette since the transfer stack has sufficient buffer. In embodiments, where a system of the disclosure has a lid, the step of connecting the electrical connection of the system to a power source comprises: placing the lid onto the chambers such that lid electrical connections connect with chamber electrode connections and connecting the electrical connection on the lid to a power source.

In some embodiments the liquid-proof seal is formed on all sides of the electrotransfer cassette.

In some embodiments, the assembly of the transfer stack in the second plate is done by placing the open electrotransfer cassette into a tray to avoid spillage of buffer on surfaces. In some embodiments, stack assembly comprises: soaking filter paper and sponges in transfer buffer; pouring transfer buffer into the second plate; placing a layer of sponge followed by filter paper on the second plate; orienting the gel with the wells toward the bottom side of the electrotransfer cassette and placing this gel over the filter-paper; placing the blotting material (such as, but not limited to a membrane, a PVDF membrane, a nylon membrane, or any porous material onto which biomolecules can be transferred etc.) on top of the gel; using a roller to remove any air bubbles from each layer of the stack; placing another piece of filter paper on top of the blotting material (membrane); placing another sponge on top of the filter paper.

In some embodiments, the present disclosure provides a method for simultaneously performing both electrotransfer and electrophoresis comprising: securing an electrophoresis cassette with a clamp in a first chamber of a system of the disclosure; loading a sample comprising biomolecules to be electrophoresed into the electrophoresis cassette; placing an electrotransfer cassette with a transfer stack having a gel with biomolecules and a blotting material onto which electrotransfer of biomolecules is desired into a second chamber of the system of the disclosure; selecting a voltage and optionally selecting a time for which the voltage run is desired using a power supply device; performing electrophoresis in the electrophoresis cassette and electrotransfer of biomolecules from the gel onto the blotting material. In some embodiments, the electrophoresis and the electrotransfer are each carried out at a different time since a common voltage is used.

These and other features of the present teachings will become more apparent from the detailed description in sections below.

BRIEF DESCRIPTION OF THE DRAWINGS

One or more embodiments of the present disclosure may be better understood in reference to one or more the drawings below. The skilled artisan will understand that the drawings, described below, are for illustration purposes only. The drawings are not intended to limit the scope of the present teachings in any way.

FIG. 7A depicts a front perspective view of a clamp, FIG. 7B depicts a front view of the clamp, FIG. 7C depicts a back view of a clamp, and FIG. 7D depicts a side view of a clamp, depicting a cam arm positioned onto a side of the clamp, according to one embodiment;

FIGS. 11A, 11B and 11C depicts an exemplary electrotransfer cassette of the disclosure, having a clamp closure and locking mechanism wherein FIG. 11A depicts an open position, FIG. 11B depicts a closed position and FIG. 11C depicts a locked position, according to one embodiment;

FIGS. 12A, 12B, 12C, 12D and 12E depicts an exemplary electrotransfer cassette of the disclosure, having hinges and having two plates with a slider on one of the plates for closing and locking wherein FIG. 12A depicts an open position with an exploded view of transfer stack assembly, FIG. 12B depicts an open position with assembled stack; FIG. 12C depicts an half-open position, FIG. 12D depicts a closed position with a slider that can be slide down to lock the cassette, and FIG. 12E depicts a locked position with slider slide down, according to one embodiment;

FIGS. 13A, 13B and 13C depicts an exemplary electrotransfer cassette of the disclosure, having no hinges and two plates with a slider lock attached to one plate, wherein FIG. 13A depicts an open position, FIG. 13B depicts a closed but unlocked position with slider on top, and FIG. 13C depicts a locked position with slider slid down, according to one embodiment;

FIGS. 14A, 14B, 14C, 14D and 14E depicts an exemplary electrotransfer cassette of the disclosure, having no hinges and having two separate plates with a slider on one of the plates for closing and locking wherein FIG. 14A depicts an open position with an exploded view of transfer stack assembly, FIG. 14B depicts an open position with assembled stack; FIG. 14C depicts an half-open position with details of the locking mechanism, FIG. 14D depicts a closed position with a slider that can be slide upward to lock the cassette, and FIG. 14E depicts a closed and unlocked position with additional details on the interlocking mechanisms, according to one embodiment;

FIGS. 15A, 15B, 15C, and 15D depicts an exemplary electrotransfer cassette of the disclosure, having at least one hinge and at least one slider on one of the plates for closing and locking wherein FIG. 15A depicts a front view of the inside of an open position, FIG. 15B depicts a back view of the outside of an open position; FIG. 15C depicts a closed but unlocked position with a slider that can be slide down to lock the cassette, and FIG. 15D depicts a locked position with slider slide down, according to one embodiment;

FIG. 22A-22F pictorially depicts an example method of electrotransfer, wherein FIG. 22A depicts an electrotransfer cassette in the open configuration placed in a tray, FIG. 22B depicts an electrotransfer cassette with an exploded view of a transfer stack, FIG. 22C depicts an electrotransfer cassette in the closed and locked position in the tray, FIG. 22D depicts an electrotransfer cassette in the closed and locked position positioned to be placed into an electrotransfer system; FIG. 22E depicts an electrotransfer cassette inside an electrotransfer system and FIG. 22E depicts an electrotransfer cassette inside an electrotransfer system with a lid on to enable electrical connections, according to one embodiment.

DETAILED DESCRIPTION OF THE DISCLOSURE

Figure 1:
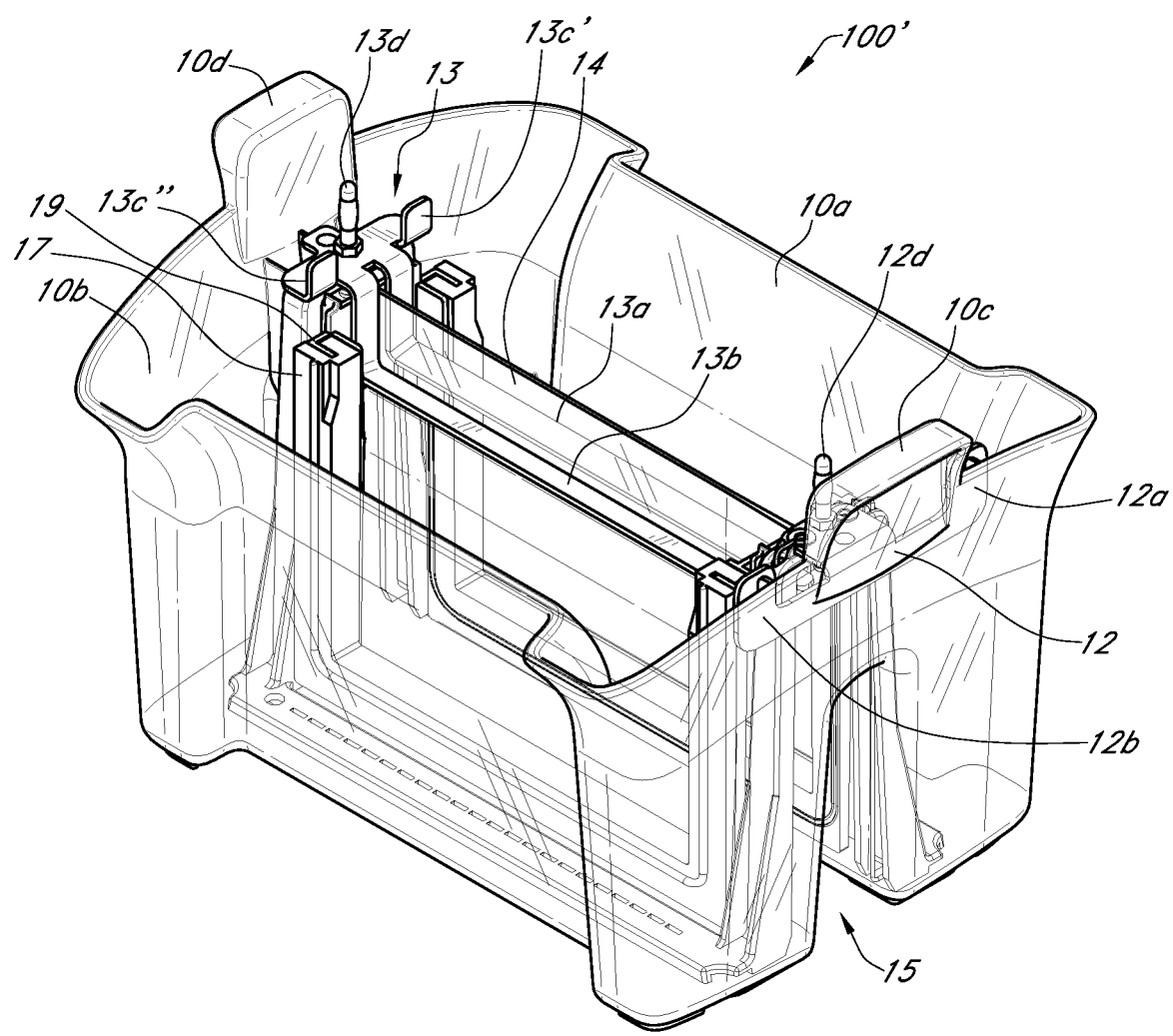
FIG. 1 is a schematic representation of a perspective view of an exemplary system of the disclosure having two chambers, that can be used to perform electrophoresis and/or electrotransfer, according to one embodiment.

It is to be understood that both the foregoing general description and the following detailed description are exemplary and explanatory only and are not intended to limit the scope of the current teachings. In this application, the use of the singular includes the plural unless specifically stated otherwise. For example, the singular forms "a", "an" and "the" as used in the specification also include plural aspects unless the context dictates otherwise. Similarly, any singular term used in the specification also mean plural or vice versa unless the context dictates otherwise.

Also, the use of "comprise", "contain", and "include", or modifications of those root words, for example but not limited to, "comprises", "contained", and "including", are not intended to be limiting. Use of "or" means "and/or" unless stated otherwise. The term "and/or" means that the terms before and after can be taken together or separately. For illustration purposes, but not as a limitation, "X and/or Y" can mean "X" or "Y" or "X and Y".

Whenever a range of values is provided herein, the range is meant to include the starting value and the ending value and any value or value range therebetween unless otherwise specifically stated. For example, "from 0.2 to 0.5" means 0.2, 0.3, 0.4, 0.5; ranges therebetween such as 0.2-0.3, 0.3-0.4, 0.2-0.4; increments there between such as 0.25, 0.35, 0.225, 0.335, 0.49; increment ranges there between such as 0.26-0.39; and the like.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, ACB, CBA, BCA, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Described herein are systems, devices, and methods for electrophoresis and electrotransfer of biomolecules. Systems, devices and methods of the present disclosure overcome several of the problems in the art. In some embodiments, a system that can be used for both gel electrophoresis and electrotransfer is described. A system for gel electrophoresis and electrotransfer, in some embodiments, comprises one or two or more chambers, compartments, or components, that can removably and inter-changeably receive either an electrophoresis cassette or an electrotransfer cassette, and can provide an electrical interface for both electrophoresis and/or electrotransfer of biomolecules. Accordingly, systems of the present disclosure provide a single instrument platform for conducting two different biomolecule analysis methods.

In some embodiments, systems, devices, and methods described herein over problems in the art by providing an increased throughput for electrophoresis and/or electrotransfer by providing an electrophoresis and electrotransfer system that has multiple chambers to allow parallel processing of electrophoresis gels or electrotransfer from multiple gels to multiple electrotransfer membranes. In some embodiments, a system has at least two chambers to allow parallel electrophoresis and/or electrotransfer of biomolecules on two or more gels or transfer membranes.

Systems, devices, and methods described herein also overcome other problems in the art by providing a leak-free gel electrophoresis system. Systems, devices, and methods described herein also overcome other problems in the art by providing leak-free electrotransfer devices and electrotransfer systems.

Accordingly, systems, devices, cassettes and methods of the disclosure, advantageously result in at least one or more of the foregoing benefits as compared to existing systems and devices for electrophoresis or electrotransfer including: one system or platform for electrophoresis and electrotransfer, ability to conduct multiple electrophoresis and/or electrotransfer procedures in a single device by processing biomolecules in two or more gels or transfer membranes at the same time, increased throughput for electrophoresis and electrotransfer, reduced number of devices or parts or components, reduced cost, reduced footprint for equipment storage, reduced spillage, reduced leakage, reduced clean-up, reduced amount of buffers and reagents used and reduced liquid hazardous waste (such as methanol in transfer buffer waste as compared to existing systems and devices for electrophoresis or electrotransfer). In addition, in contrast to some existing devices and systems for electrophoresis or electrotransfer, the present systems and devices for electrophoresis and electrotransfer reduced preparatory work by not requiring chilling buffer or freezing ice packs for use to reduce temperatures during use of the systems or devices.

Additional advantages provided by the present are lower current and power requirements as compared to existing devices.

The section headings used herein are for organizational purposes only and are not to be construed as limiting the subject matter described in any way. All literature and similar materials cited in this application including, but not limited to, patents, patent applications, articles, books, treatises, and internet web pages, regardless of the format of such literature and similar materials, are expressly incorporated by reference in their entirety for any purpose. In the event that one or more of the incorporated literatures and similar materials defines or uses a term in such a way that it contradicts that term's definition in this application, this application controls. While the present teachings are described in conjunction with various embodiments, it is not intended that the present teachings be limited to such embodiments. On the contrary, the present teachings encompass various alternatives, modifications, and equivalents, as will be appreciated by those of skill in the art in light of the present teachings.

Figures and drawings provided in this specification will be used to describe exemplary embodiments. One of skill in the art will note that the drawings and examples are merely for illustration of ideas and concepts and are not intended to limit the scope of the present teachings in any way. All parts are not labeled in each figure and, unless noted, similar parts have similar numbering which may not be described in each figure or every part of the description.

I. Systems and Devices:

Embodiments of the present disclosure describes systems that can be used for both gel electrophoresis and electrotransfer. In one embodiment, a system of the disclosure comprises at least one chamber, compartment, vessel, or component configured to removably and interchangeably receive either an electrophoresis cassette or an electrotransfer cassette. The system further comprises electrodes and a lid that can cover the at least one chamber, compartment or component and provide electrical connectivity. The terms "chambers," "compartments," or "vessel" or "components" or "base" or "base of system" are interchangeably used in this specification.

1) System for Electrophoresis and Electrotransfer:

Embodiments of the present disclosure describe a system for gel electrophoresis and electrotransfer comprises at least one chamber that can removably and interchangeably receive either an electrophoresis cassette, or an electrotransfer cassette, and provides an electrical interface for both electrophoresis and electrotransfer of biomolecules. In one embodiment, a system has at least two chambers to allow simultaneous processing of electrophoresis and/or electrotransfer of biomolecules on two or more gels or transfer membranes.

FIG. 1 is a schematic representation of a perspective view of an exemplary system 100', that can be used for both gel electrophoresis and electrotransfer. In one exemplary embodiment, system 100' has two chambers, 10a and 10b, that are configured to perform electrophoresis and/or electrotransfer. Each chamber 10a and 10b are independently configured to receive either an electrophoresis cassette or an electrotransfer cassette. While FIG. 1 and several other drawings and embodiments in this disclosure are described with the non-limiting example of two chambers, the present teachings can be extended to systems for electrophoresis and electrotransfer having only one chamber, or systems having more than two chambers placed adjacent to each other to increase the throughput of a system of the disclosure. In some embodiments, system of the disclosure has more than two chambers to enable electrophoretic separation or electrotransfer of biomolecules located in gels/matrices/membranes/materials, in each of its chamber.

As shown in the embodiment of FIG. 1, the two chambers 10a and 10b are arranged adjacent to each other in a back-to-back configuration. In alternative embodiments, chambers in a system of the disclosure, can be arranged adjacent to each other, side-by-side, back to back, in tandem, abutting each other, or placed adjoining each other, placed diagonally, or can be vertically stacked one over the other, or vertically stacked and staggered with one chamber above and the other chamber behind the other, and/or tilting one or both chambers relative to each other at an angle.

As shown in FIG. 1, system 100' comprises chambers 10a and 10b, each configured to receive either an electrophoresis cassette or an electrotransfer cassette, and comprises a first electrode 12, and a second electrode 13, wherein each of the electrodes have an electrical interface or node, 12d and 13d, that can be electrically connected to a power supply (not depicted). The power supply can be an external or internal power supply. In some embodiments, the first electrode 12 and the second electrode 13 have extensions or interfaces such as, 12a, 12b, 12c, 13a, 13b, 13c, 13c', 13c" that extend into each chamber such that each chamber has an anode and a cathode.

In some embodiments, the first electrode 12 spans both chambers 10a and 10b or has interfaces such as 12a and 12b that span both chambers that are configured to electrically contact an electrical interface located on an electrotransfer cassette. In some embodiments, the first electrode 12 has an extension into each chamber, such as but not limited to wire 12c, that functions as an anode during electrophoresis.

In some embodiments, the second electrode 13 has extensions or interfaces such as but not limited to 13c' and 13c" configured to contact an electrode interface located on an electrotransfer cassette. In some embodiments, the second electrode 13 spans both chambers or has an interface that spans both chambers, depicted in non-limiting examples by 13c' and 13c", which are configured to electrically contact an electrical interface located on an electrotransfer cassette. In some embodiments, the second electrode 13 has extensions that extend into each chamber, depicted in non-limiting examples as 13a and 13b, that function as cathodes in each chamber during electrophoresis.

Figure 2:
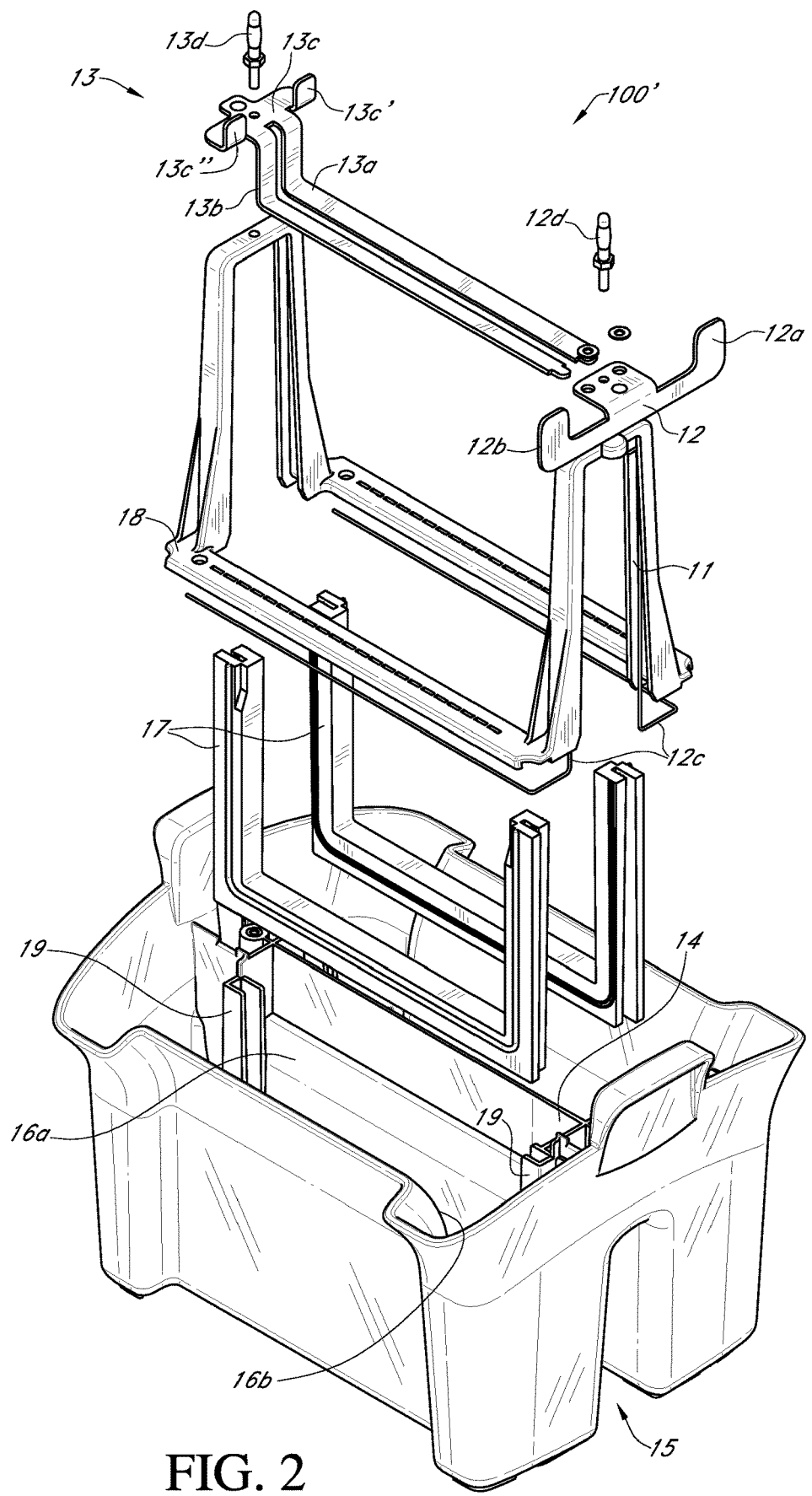
FIG. 2 is an exploded view of FIG. 1, showing the layers of components, according to one embodiment.

FIG. 2 is an exploded view of FIG. 1, showing arrangement of exemplary components of system 100', according to one embodiment. The at least two chambers, 10a and 10b, are each independently configured to interchangeably receive either an electrophoresis cassette or an electrotransfer cassette. The two chambers also comprise three electrodes 12, 13a and 13b. In some embodiments, the three electrodes comprise a first electrode 12 that spans both chambers and a second electrode 13a and 13b, located in each chamber. The first electrode 12 has extensions 12a and 12b spanning chambers 10a and 10b respectively. The first electrode 12 has two extensions 12c, one in each chamber 10a and 10b.

As shown in FIGS. 1 and 2, first electrode 12 that spans both chambers, as extensions 12a and 12b, and/or as extension wires 12c located in each chamber, is connected to a first electrical node 12d and the two second electrodes 13a and 13b (each second electrode located in one chamber 10a and 10b in base 100' of system 100), are connected to a common second electrode node 13d. In some embodiments, the first electrode node 12d and the second electrode node 13d are interfaces that connect with a power supply.

In some embodiments, first electrode 12 that spans both chambers in a system of the present disclosure is an anode. In some embodiments, second electrodes 13a and 13b present in one or more chambers of a system of the disclosure is a cathode.

In some embodiments, as shown in FIG. 2, first electrode 12 further comprises a conducting wire 12c that runs along the bottom of each chamber 10a and 10b to enable electrical current to flow across the chamber for electrophoresis. The conducting wire 12c is made of any conductible material, such as but not limited to, platinum, gold, silver, copper palladium, steel, stainless steel, iridium, conductive plastics, or any coated conductive material. Wire 12c that runs along the bottom of each chamber serves as an anode during electrophoresis when an electrophoresis cassette is placed in one or both chambers 10a and/or 10b. In some embodiments wire 12c is covered by a retaining means 18, depicted in a non-limiting example as a plastic strip with perforations. The perforations allow the wire 12c to make physical contact with an electrophoresis buffer in the chambers while the retaining means allows wire 12c to stay secured onto the floor of the chambers. This allows for passage of electrical field from the anode wire 12c to the buffer. Retaining means 18 also protects the anode wire 12c from damage during system use.

Other retaining means with similar functionality can be used. A frame 11 can be optionally a part of the retaining means 18 and can also serve as a mount for the three electrodes 12, 13a and 13b. In some embodiments, frame 11 and retaining means 18 are combined to form a single part.

Frame 11 protects wire electrode 12c as it emerges from electrode 12 and runs down the sides of each chamber 10a and 10b. In some embodiments, frame 11 in conjunction with perforations 18 optimize the electric field generated by anode wire 12c and the cathode.

The two chambers 10a and 10b of a system of the disclosure are separated by at least one common surface 14 between them. Non-limiting examples of a common surface 14 between the chambers includes a wall between at least a portion of the two chambers, a partition between at least a portion of the two chambers, multiple walls, or multiple partitions. In some embodiments, the two chambers 10a and 10b are separated by a space 15 between the two chambers. In some embodiments, the two chambers 10a and 10b are separated by common surface 14 and a space 15 between the at least two chambers.

Each chamber 10a and 10b has at least a first interior surface 16a and a second interior surface 16b. Additional interior surfaces can be present (not expressly depicted). In some embodiments, a system of the disclosure can further comprise a gasket 17 located adjacent to or on portions of one of the interior surfaces of the chamber. As shown in the examples in FIGS. 1 and 2, base 100' of system 100 comprises gasket 17 located adjacent to or on portions of the first interior surface 16a. Gasket 17 is generally a three-sided gasket and in non-limiting examples can be a C-shaped or a U-shaped gasket. Alternatively, a two-sided, or a four-sided gasket can be used as well. In some embodiments, gasket 17 can be places in a grove 19 that lies adjacent to interior surface 16a.

Figure 3:
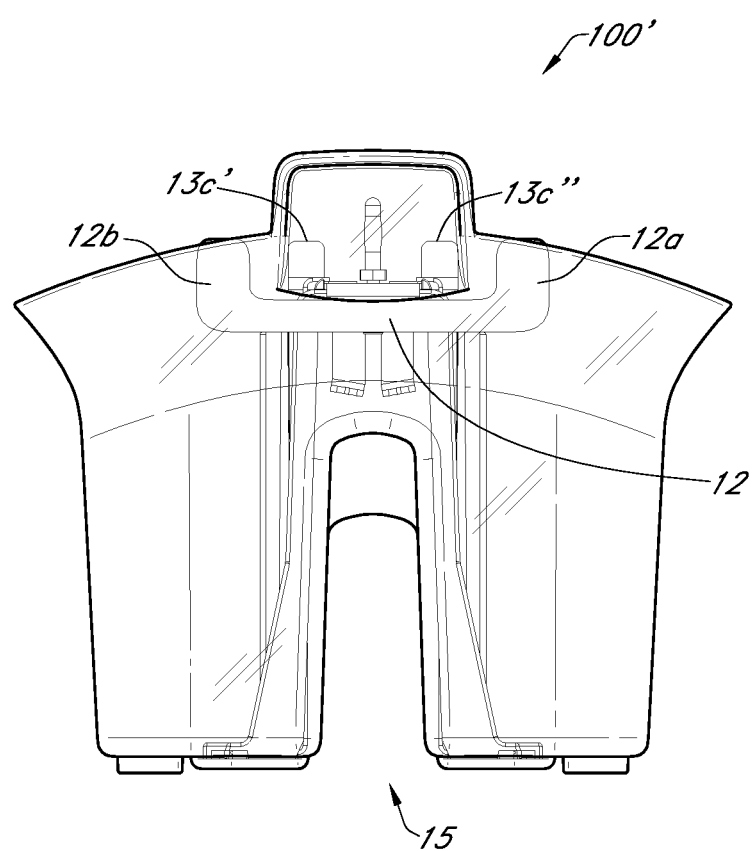
FIG. 3 is a side view of the system of the disclosure shown in FIGS. 1 and 2, according to one embodiment.

FIG. 3 is a side view of system 100' as shown in FIGS. 1 and 2, according to one embodiment.

Figure 4:
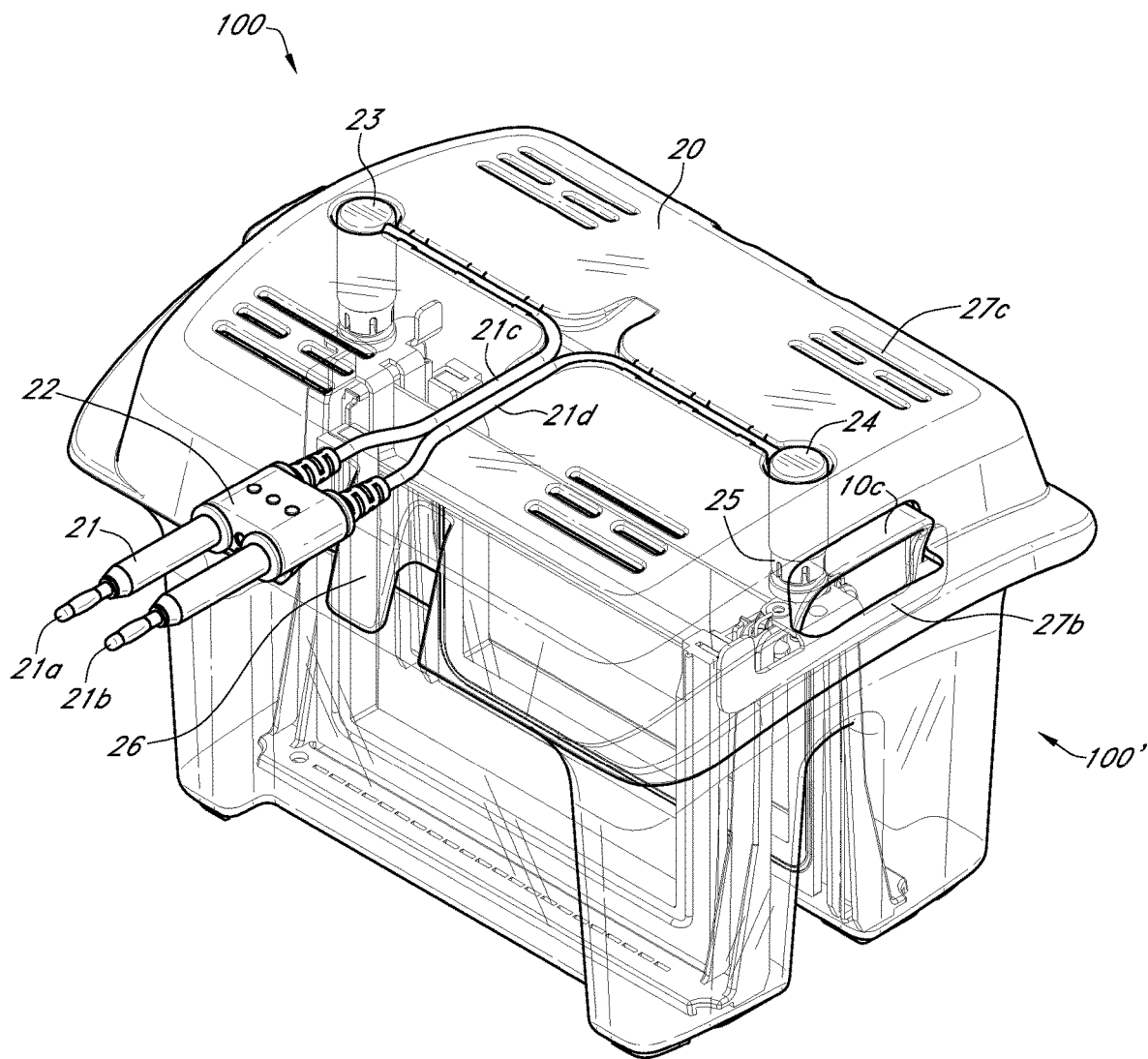
FIG. 4 is a front perspective view of the system of the disclosure shown in FIGS. 1 and 2, having a lid placed thereon, according to one embodiment.

In some embodiments, a system 100', also depicted as system 100 in FIG. 4, can further comprises a lid 20 configured to cover the two chambers 10a and 10b. FIG. 4 is a front perspective view and depicts lid 20 covering system 100' where lid 20 comprises: an electrical connection 21 that is removably connectable to a power source, one or more electrical contacts 23a and 24a (located inside the lid—see FIG. 5C), configured to electrically connect with the first electrode 12 and the second electrode 13, typically via electrical interfaces or electrode nodes such as 12d and 13d, to complete an electrical circuit between the electrodes for each of the two chambers, when the lid 20 is placed on the chambers 10a and 10b. 22 depicts a cable clip.

In some embodiments, the first electrode node 12d and the second electrode node 13d are located on portions of the chambers of the system that make contact with a lid 20 (see FIGS. 1, 2, 3 for electrode nodes and FIG. 4, & FIGS. 5A-5C for more details of lid 20).

As shown in FIG. 4, lid 20 comprises an electrical connection 21 that is removably connectable to a power source. In some embodiments, a lid 20 of system 100 can comprise an electrical connection that is removably connectable to a power source comprising one or more cables and/or one or more plugs that can be plugged into a power source. An external power source is typically used with a system of the disclosure. However, systems with internal power supplies are also contemplated.

As shown in FIG. 4, electrical connection 21 is typically a plug with one or more banana plugs 21a and 21b, that can be plugged into an external power source (not shown). Electrical connection 21 can comprise cable clip 22. Cables 21c and 21d from electrical connection 21 lead to cables 21c and 21d that go to cable retainers 23 and 24 on each side of the lid. Cables 21c and 21d typically have one negatively charged cable (typically color coded black) and one positively charged cable (typically color coded red) and one or more electrical contacts, shown here as 23a and 24a (which are typically banana jacks, metal tabs or any electrical interface) configured to electrically connect with chamber electrodes 12 and 13 via electrode nodes 12d and 13d (which are typically, but not limited to, banana plugs) to complete an electrical circuit for each of the two chambers 10a and 10b, when lid 20 is placed on the chambers 10a and 10b.

In some embodiments, lid 20 can have at least two cable hooks 26 which allow the electrical cables to wrap around the lid and remain secure during storage. In some embodiments, lid 20 can have one or more slots 27c on the top surface that enable venting or airflow to allow any humidity built up during electrophoresis or electrotransfer to vent out. In some embodiments, lid 20 can have one or more slots 27c on the top surface that provide and partial visibility of buffer beneath the lid. In some embodiments, the lid is made of transparent or translucent materials (typically plastics) that allows visibility. For example, a user can see bubbles that form in the buffer during electrophoresis or electrotransfer to know the device is functioning when plugged in. Alternatively, a user can view the inside of a system to review placement of components inside the system.

Figure 5A:
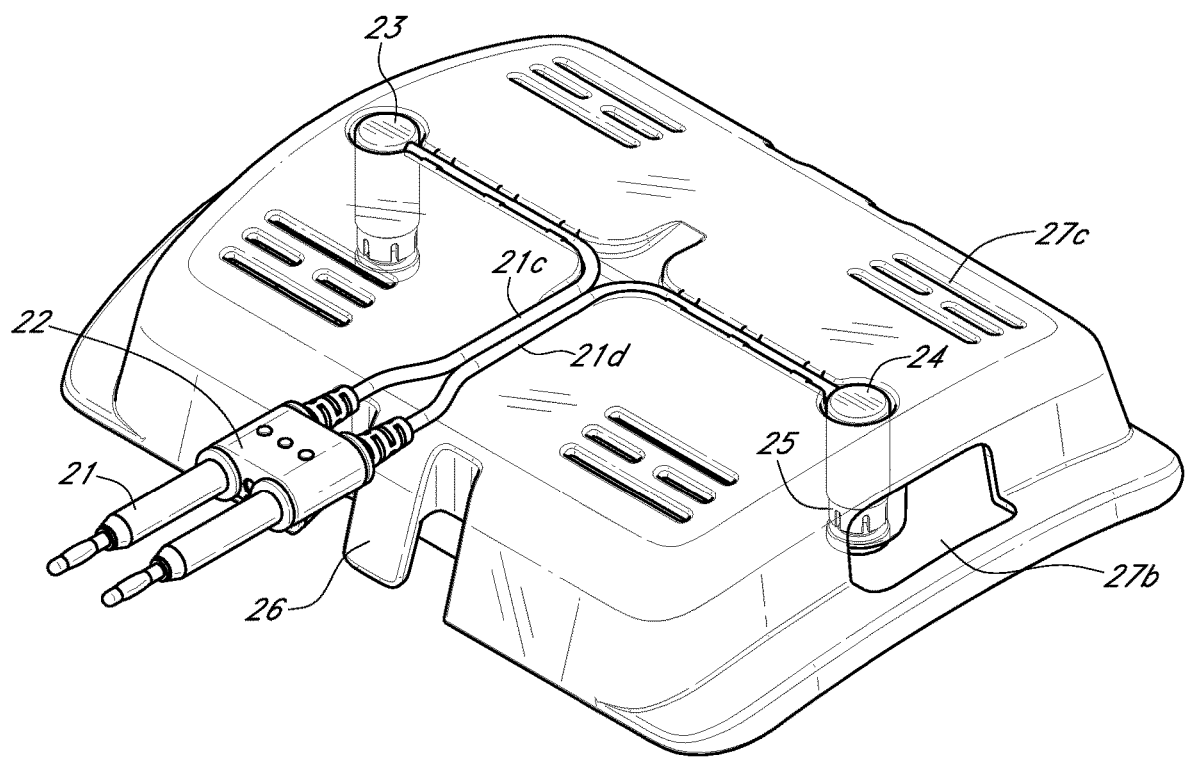
FIG. 5A is a front perspective view of the lid of a system of the disclosure, according to one embodiment.
Figure 5B:
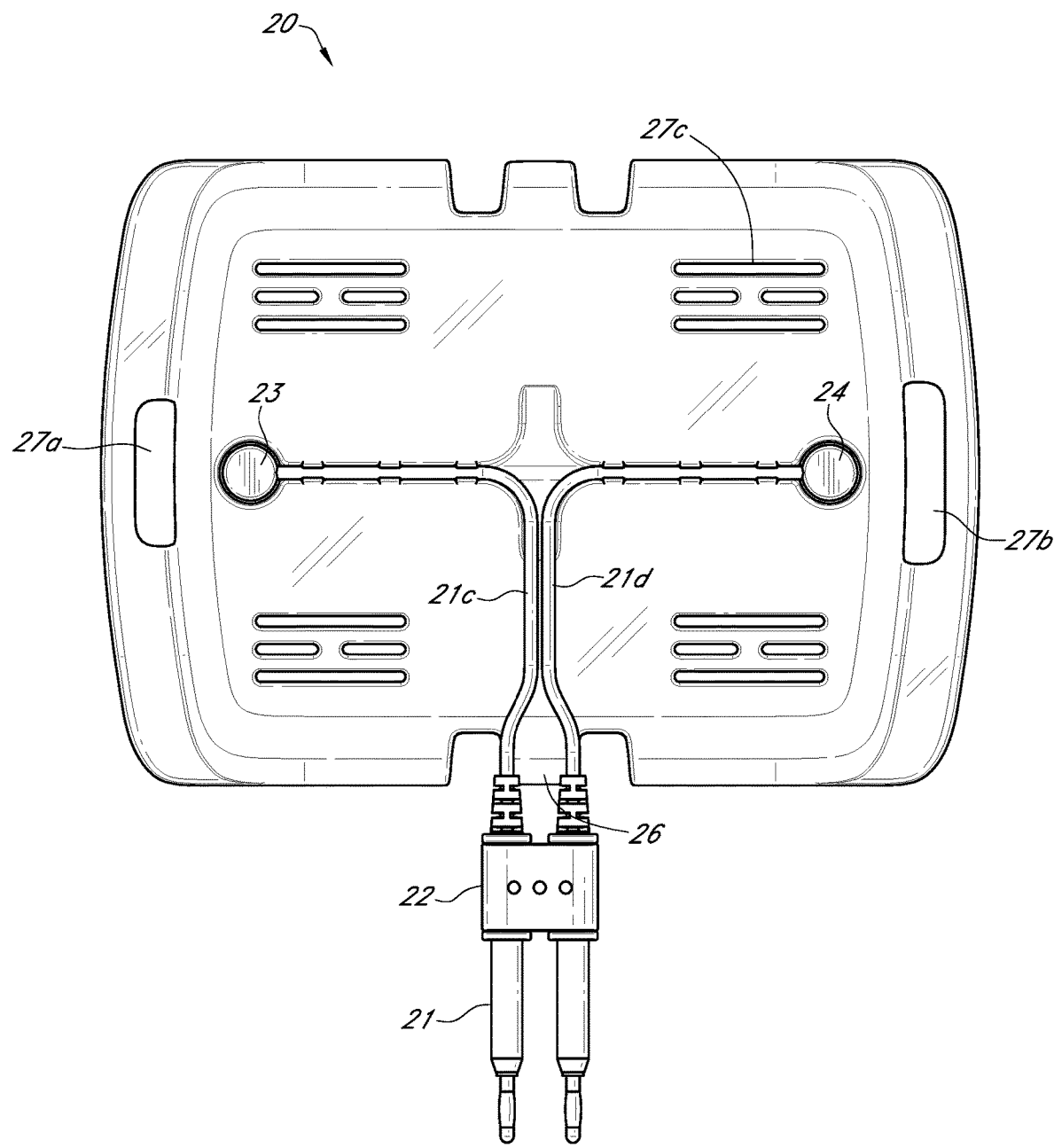
FIG. 5B is a top view of the lid of a system of the disclosure, according to one embodiment.
Figure 5C:
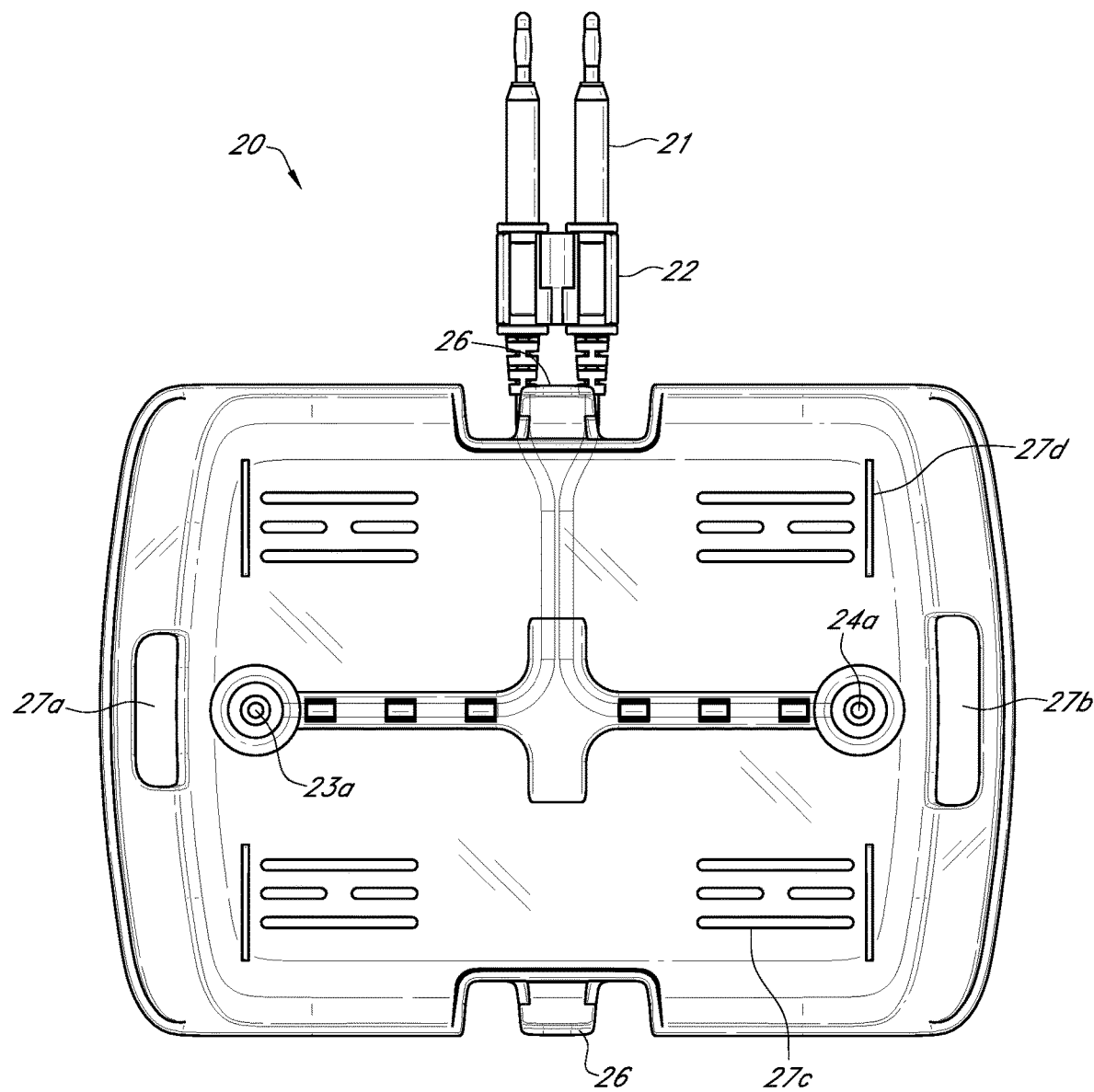
FIG. 5C is a bottom view of the lid of a system of the disclosure, according to one embodiment.

FIG. 5A is a front perspective view of an exemplary lid 20 of a system 100 of the disclosure, according to one embodiment. FIG. 5B is a top view and FIG. 5C is a bottom view of the lid 20 as shown in FIG. 5A. As shown in FIGS. 5A-C, lid 20 comprises cables 21c and 21d from electrical connections 21a and 21b that are further connected to one or more electrical contacts or electrical connectors that are inside the lid, such as but not limited to 23b and 24b, configured to electrically connect with chamber electrodes, to complete an electrical circuit for one or more chambers, when the lid is placed on the chambers, to facilitate electrophoresis and/or electrotransfer by system 100.

Figure 6A:
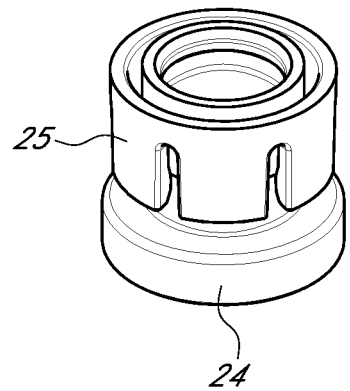
FIGS. 6A and 6B are detailed views of portions of a lid of a system of the disclosure, depicting in FIG. 6A an exemplary cable retainer and spring clip, and in FIG. 6B a portion of an electrode node and an electrical connector of the cable, according to one embodiment.
Figure 6B:
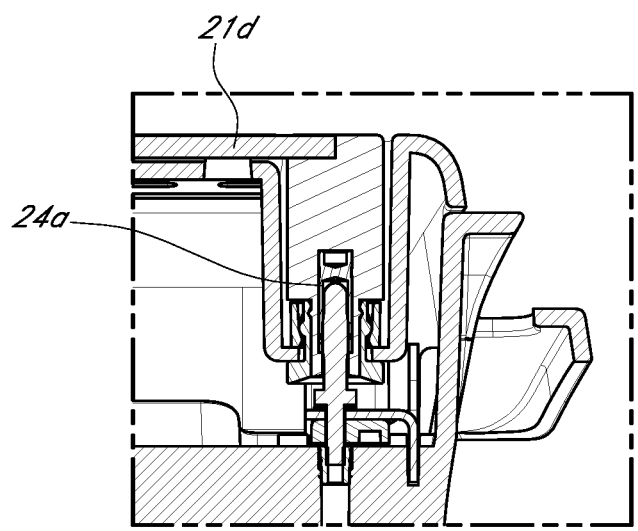

FIG. 6A and FIG. 6B are detailed views of portions of lid 20, depicting in FIG. 6A an exemplary cable retainer 24 (similar to 23 on the other side) and spring clip 25, and in FIG. 6B a portion of a cable ending in an electrical connector 23a and 24a (24a is shown here). Electrical connector or contacts 23a and 24a on lid 20 connect with chamber electrode nodes 12d and 13d. Typically, electrical contacts 23a and 24a are banana jacks and electrode nodes 12d and 13d are banana plugs. However, other types of electrical contacts and nodes are also envisioned.

In some embodiments, lid 20 of system 100 can comprise at least one feature, such as a cable wrap 26, to wrap electrical cables during storage. In some embodiments, lid 20 of system 100 can comprise mechanical features 27a and 27b that interact with complimentary mechanical features on the top of the chambers such as 10c and 10d such that the electrical contacts on the lid 23a and 24a connect with first electrical node 12d and second electrical node 13d in an orientation that prevents reversal of electrodes when system 100 is in use.

In some embodiments, a lid of the system can comprise color coded features, such as one negatively charged cable typically color coded black and one positively charged cable typically color coded red (colors not shown expressly in drawings) operable to cover chambers 10a and 10b in an orientation that allows lid electrical contacts 23a and 24a to connect with the corresponding first electrical node 13d and the second electrical node 12d that prevents reversal of electrodes when in use.

2) Systems and Devices for Electrophoresis:

In some embodiments, the present disclosure provides a system 100 for performing gel electrophoresis. In one embodiment, a gel electrophoresis cassette and clamping system are described that can be placed into a system of the disclosure that can perform both gel electrophoresis and electrotransfer. Electrophoresis cassettes can include any pre-cast or self-cast electrophoresis cassette (such as but not limited to gel cassettes) used in the art to separate biomolecules. Electrophoresis cassettes typically comprise two plastic or glass plates, arranged parallel to each other, sandwiching between them, a matrix in which biomolecules can migrate and be resolved. Electrophoresis cassettes are known in the art and typically comprise a divider plate, a retainer plate and a matrix. Non-limiting examples of matrices include gels made of polymeric materials such as agarose, acrylamide, polyacrylamide, dextrans, starches etc. A comb with teeth is typically placed at the top end of an electrophoresis cassette, in between the two plates, to cause indentations at the top of a gel into which samples comprising biomolecules can be loaded. The use of any parallel plate gel enclosure is contemplated with a clamp and electrophoresis/electrotransfer system of the present disclosure.

A system of the disclosure for electrophoresis comprises system 100, as depicted in embodiments above, having a base 100' having chambers 10a and 10b, into which an electrophoresis cassette is placed, and a lid 20. The electrophoresis cassette is secured to an interior surface of chamber 10a or 10b (and in some embodiments to a gasket therein, such as gasket 17), by means of a clamp.

3) Clamps:

The present disclosure provides a novel clamp for securing an electrophoresis cassette into a system 100. FIGS. 7A, 7B, 7C and 7D depict an exemplary clamp 28 for clamping an electrophoresis cassette into a chamber, such as 10a or 10b, of a system, such as system 100, according to one embodiment of the disclosure.

Figure 7A:
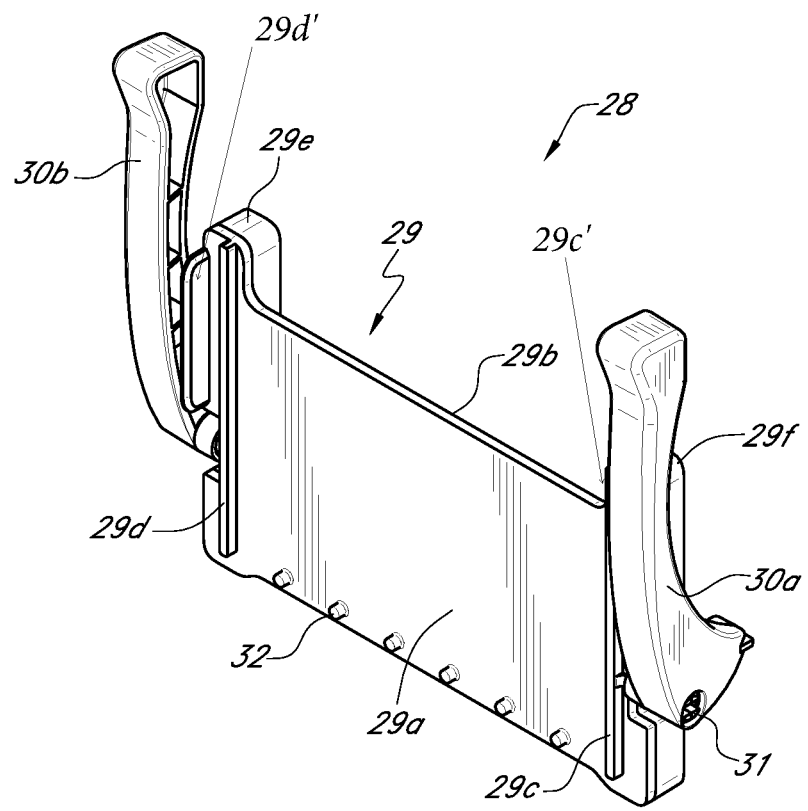
FIGS. 7A, 7B, 7C and 7D depict an exemplary clamp for clamping an electrophoresis cassette into a chamber of the system of the disclosure.
Figure 8A:
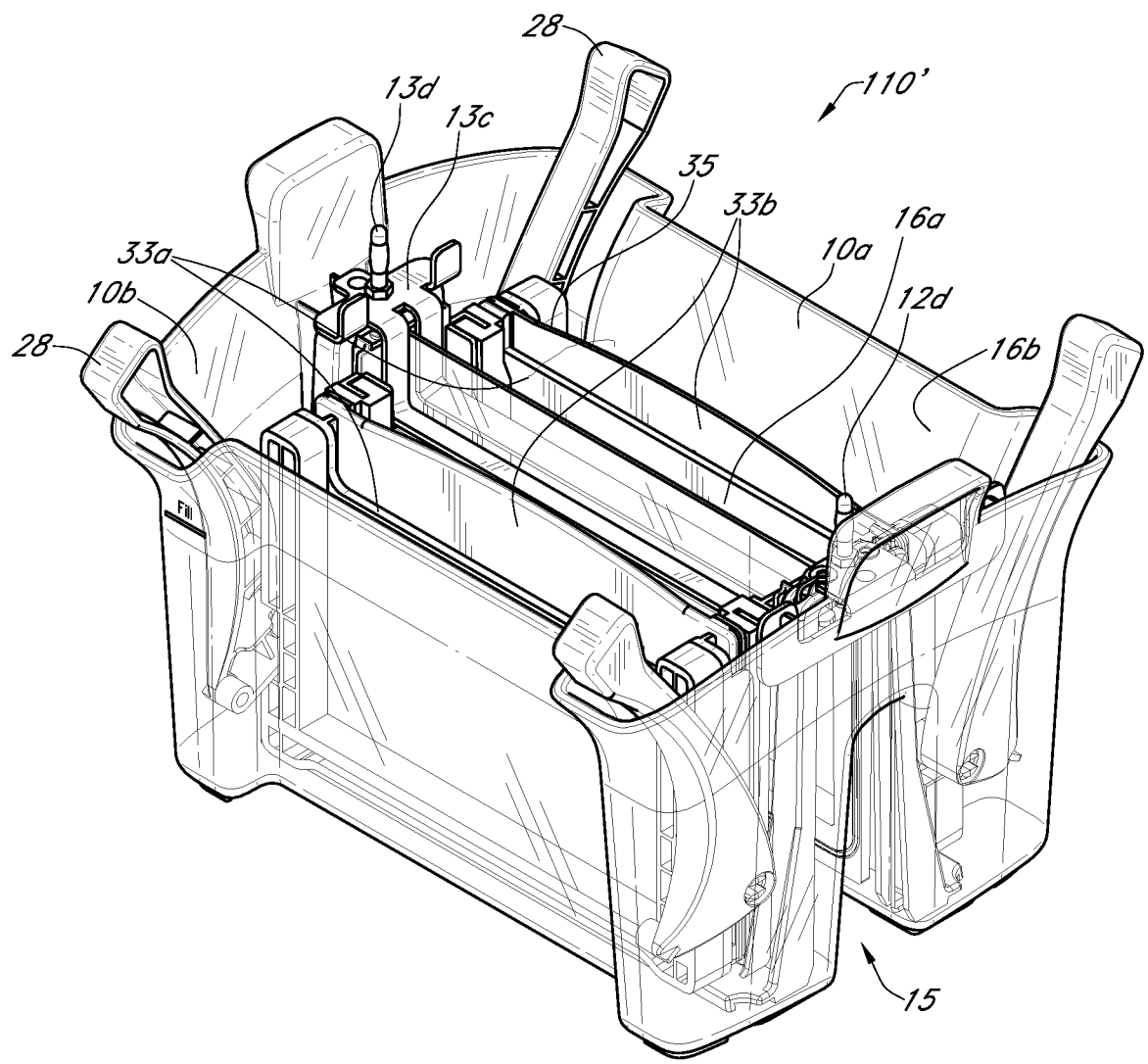
FIG. 8A depicts a front perspective view of an exemplary electrophoresis system of the disclosure, showing an electrophoresis gel cassette and a clamp placed inside both chambers of a system of the disclosure wherein the clamps are in an unlocked position, according to one embodiment.

FIG. 7A depicts a front perspective view of an exemplary clamp 28 comprising: a cam plate 29 having a flat surface, the flat surface having two sides 29a and 29b. Two protruding ridges 29c and 29d extend perpendicular on the first side 29a. Protruding ridges 29c and 29d on first side 29a of cam plate 28 are configured to be placed adjacent to and in contact with the edges of a first plate 33a of an electrophoresis cassette 35 (part 35 and plates 33a and 33b are depicted in FIG. 8A). Protrusions 29e and 29f extend on each corner of second side 29b of plate 29. Two independently movable cam handles 30a and 30b that are operable to move forward toward the cam plate or backward away from the cam plate are attached to cam plate 28 via a peg 31 located on cam plate 28. Two protruding edges 29c' and 29d' are located on first side 29a, perpendicular to the flat surface 29a of the cam plate that faces the electrophoresis cassette. Protruding edges 20c' and 29d' are positioned adjacent to the cam arms 30a and 20b. Protruding edges 29c' and 29d' guide the placement of electrophoresis cassette 35. In one embodiment, moving the cam handles 30a and 30b forward, i.e., toward cam plate 29, secures an electrophoresis cassette 35 to a surface or a portion thereof (surface not expressly depicted), and wherein moving cam handles 30a and 30b backward, i.e., away from cam plate 29, releases the electrophoresis cassette 35 from the surface. In some embodiments, a surface or a portion of a surface to which cam 28 secures an electrophoresis cassette is a gasket 17 located in electrophoresis system 100. In some embodiments, cam handles of a clamp of the disclosure can move from 0 degree to 180 degree range of motion. In some embodiments, cam handles of a clamp of the disclosure can move from 0 degree to 45 degree range of motion.

In some embodiments, a clamp of the disclosure comprises a plurality of nubs 32 on the bottom side of a flat surface first side 29a of cam plate 29. In some embodiments, a clamp of the disclosure comprises a plurality of nubs 32 on the bottom side of a flat surface 29a of a cam plate 29 that faces a gel cassette 35. In some non-limiting exemplary embodiments, 1, 2, 3, 4, 5, 6, 7, 8, 9, 10 nubs etc., are on the bottom side of a flat surface 29a of a cam plate 28 that faces a gel cassette 35. Nub design can vary in shape and size and number. In some embodiments, the nubs are configured to distribute pressure on all parts of the gel cassette plate at the bottom to prevent warping or bowing of the gel cassette during electrophoresis and/or when the gel cassette is secured for electrophoresis. In some embodiments, the nubs allow for free circulation of buffer ions at the bottom of the electrophoresis cassette.

In some embodiments, nubs 32 in conjunction with perforations 18 of an electrophoresis system of the disclosure, allow for free circulation of buffer ions at the bottom of an electrophoresis cassette placed in an electrophoresis system, where anode wire 12c lie below perforations 18.

Figure 7B:
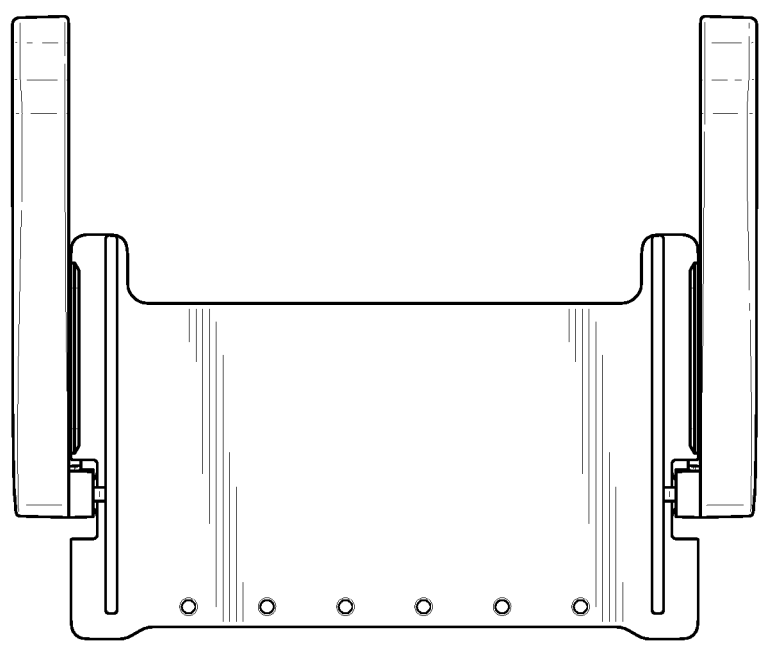
Figure 7C:
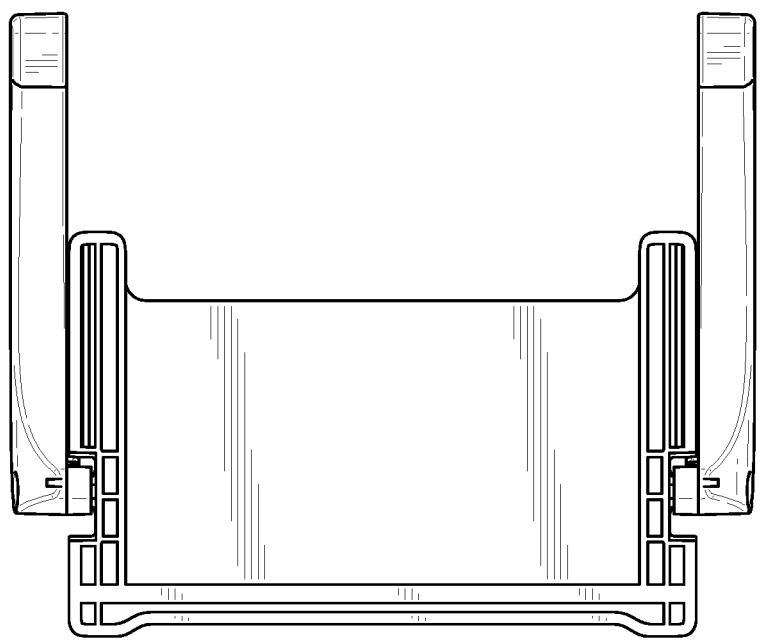
Figure 7D:
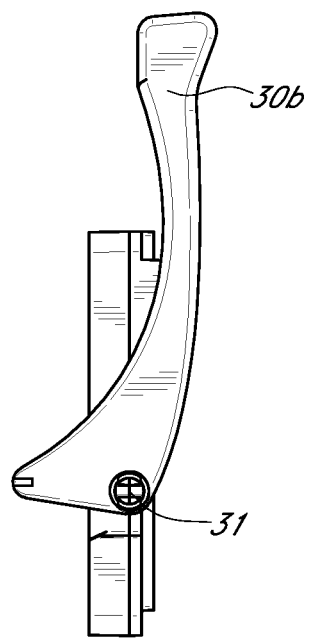

FIG. 7B depicts a front view of clamp 28 and FIG. 7C depicts a back view of clamp 28. FIG. 7D depicts a side view of a clamp 28, depicting a cam arm 30a positioned onto a side of the clamp, according to one embodiment. Cam arm 30 has a receptacle (such as a hole) that is positioned into peg 31 located on the side of cam plate 29. In one embodiment, peg 31 is a spring clip into which cam arm 30 is positioned via a receptacle. In some embodiments cam arm 30 is thereby permanently fixed to cam plate 29 via the spring clip. Alternatively, peg 31 can be located on cam arm 30 and a receptacle (such as a hole) located on cam plate 29. In alternative embodiments, cam arm 30 can be assembled using screws or inserts, such as, but not limited to, a shoulder screw that would allow rotation of the cam arm or cam handle, or posts, or pins, or other clip, or a pivoting, or a rotating design.

In some embodiments, lid 20 fits onto system 100, when the cam arms 30 are in the locked position. This is to ensure the electrophoresis cassette is properly secured in system 100 prior to enabling the electrical connectivity.

In some embodiments, a surface onto which a clamp 28 of the disclosure clamps or secures an electrophoresis cassette is a surface on a portion or part of an electrophoresis tank, depicted in FIG. 8A as base 110' of system 100 shown (without lid 20). In some embodiments, a surface onto which a clamp 28 of the disclosure clamps or secures an electrophoresis cassette 35 is a surface on a portion or part of a system 100 of the disclosure that can perform both electrophoresis and/or electrotransfer. In some embodiments, clamp 28 can be used in conjunction with any electrophoresis tank surface.

In some embodiments, a surface onto which a clamp 28 of the disclosure clamps or secures an electrophoresis cassette is a gasket, such as gasket 17, located on a portion, or a part or a wall or a surface of an electrophoresis tank, or a gasket located on a portion or a part or a wall or a surface of a base 110' of system 100 of the disclosure that can perform both electrophoresis and/or electrotransfer. Gasket 17 can be a three-sided or a four-sided gasket.

4) Electrophoresis Systems:

FIG. 8A depicts a front perspective view of a base 110' of an exemplary electrophoresis system 100 of the disclosure, showing an electrophoresis gel cassette 35 and a clamp 28 placed inside both chambers 10a and 10b, wherein the clamps 28 are in an unlocked position, according to one embodiment.

Figure 8B:
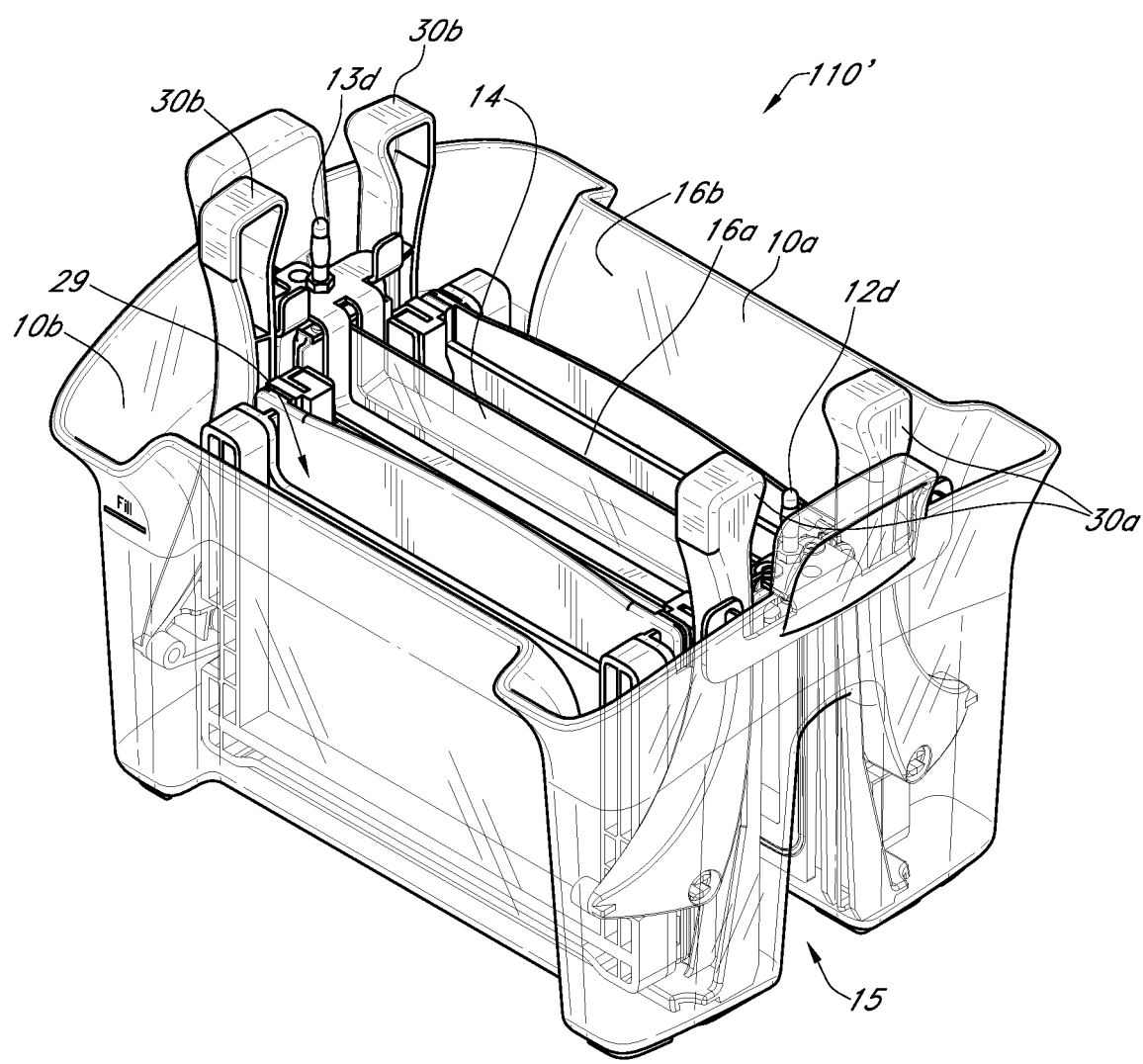
FIG. 8B depicts a front perspective view the electrophoresis system of FIG. 8A, showing an electrophoresis gel cassette and a clamp placed inside both chambers of a system of the disclosure wherein the clamps are in a locked position, according to one embodiment.

FIG. 8B depicts a front perspective view of an exemplary electrophoresis system base 110' of the disclosure, showing an electrophoresis gel cassette 35 and a clamp 28 each placed inside both chambers 10a and 10b wherein the clamps are in a locked position (wherein cam arms 30a and 30b are moved upward toward the cam plate 28), according to one embodiment.

Figure 8C:
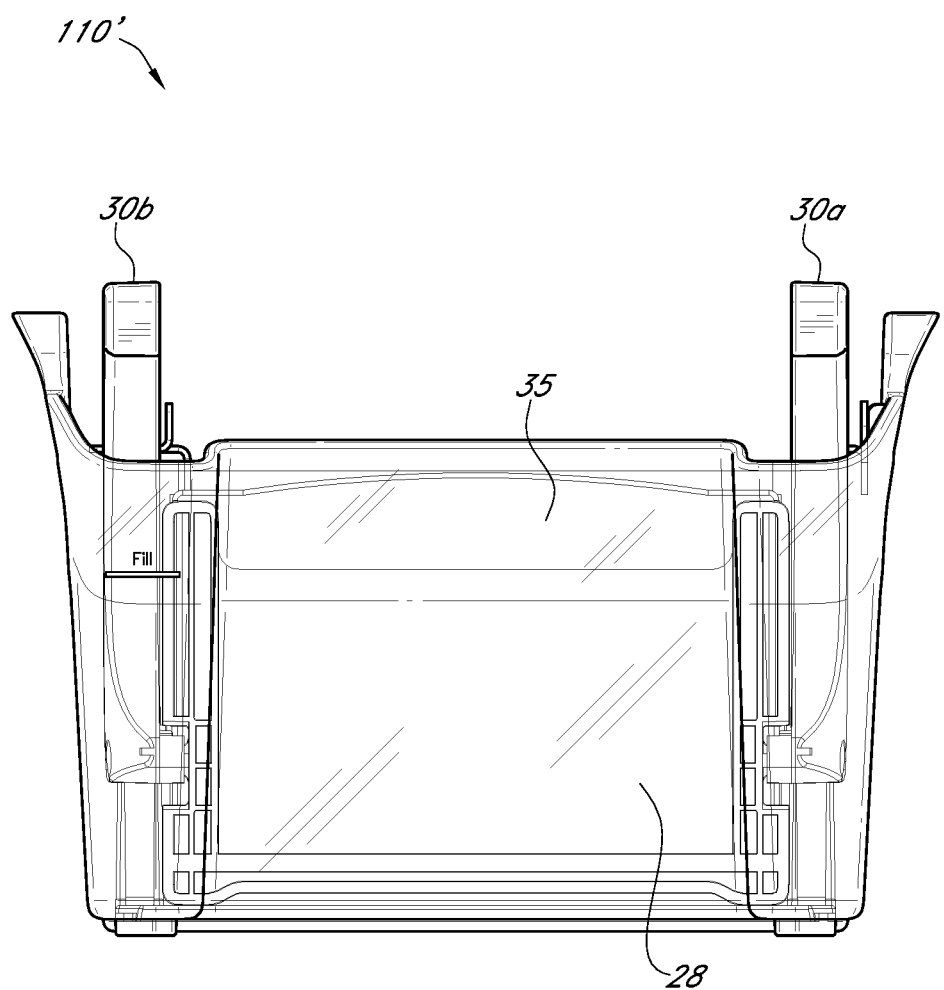
FIG. 8C depicts a front view of the electrophoresis system of FIG. 8B, showing an electrophoresis gel cassette and a clamp placed inside both chambers of a system of the disclosure wherein the clamps are in a locked position, according to one embodiment.

FIG. 8C depicts a front view of the base 110' of electrophoresis system 100 of FIG. 8B, showing an electrophoresis gel cassette 35 and a clamp 28 placed inside both chambers of the system, wherein the clamps are in a locked position, according to one embodiment.

Figure 9A:
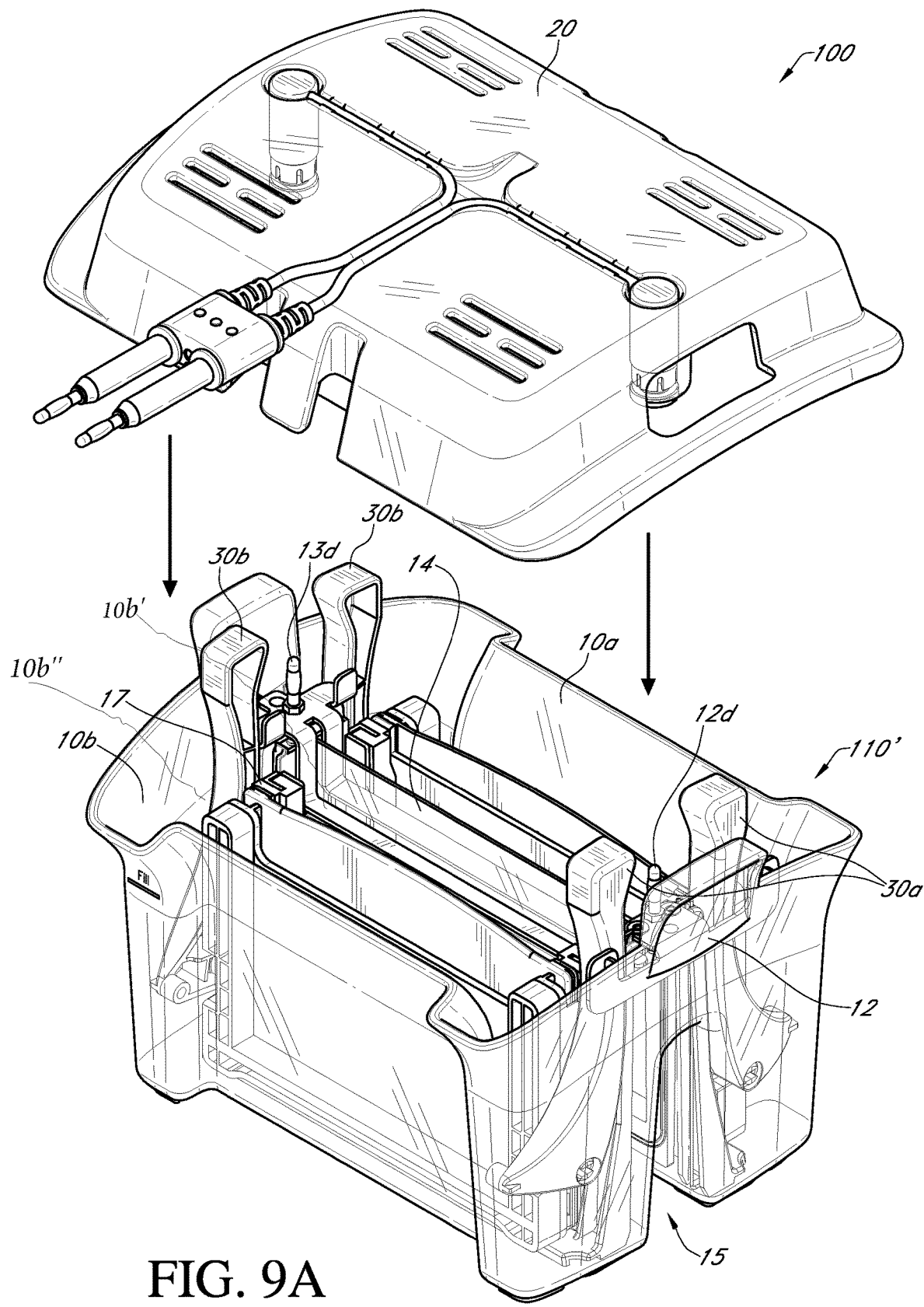
FIG. 9A depicts a front perspective view of FIG. 8B, with a lid shown above that can be placed on the system, according to one embodiment.
Figure 9B:
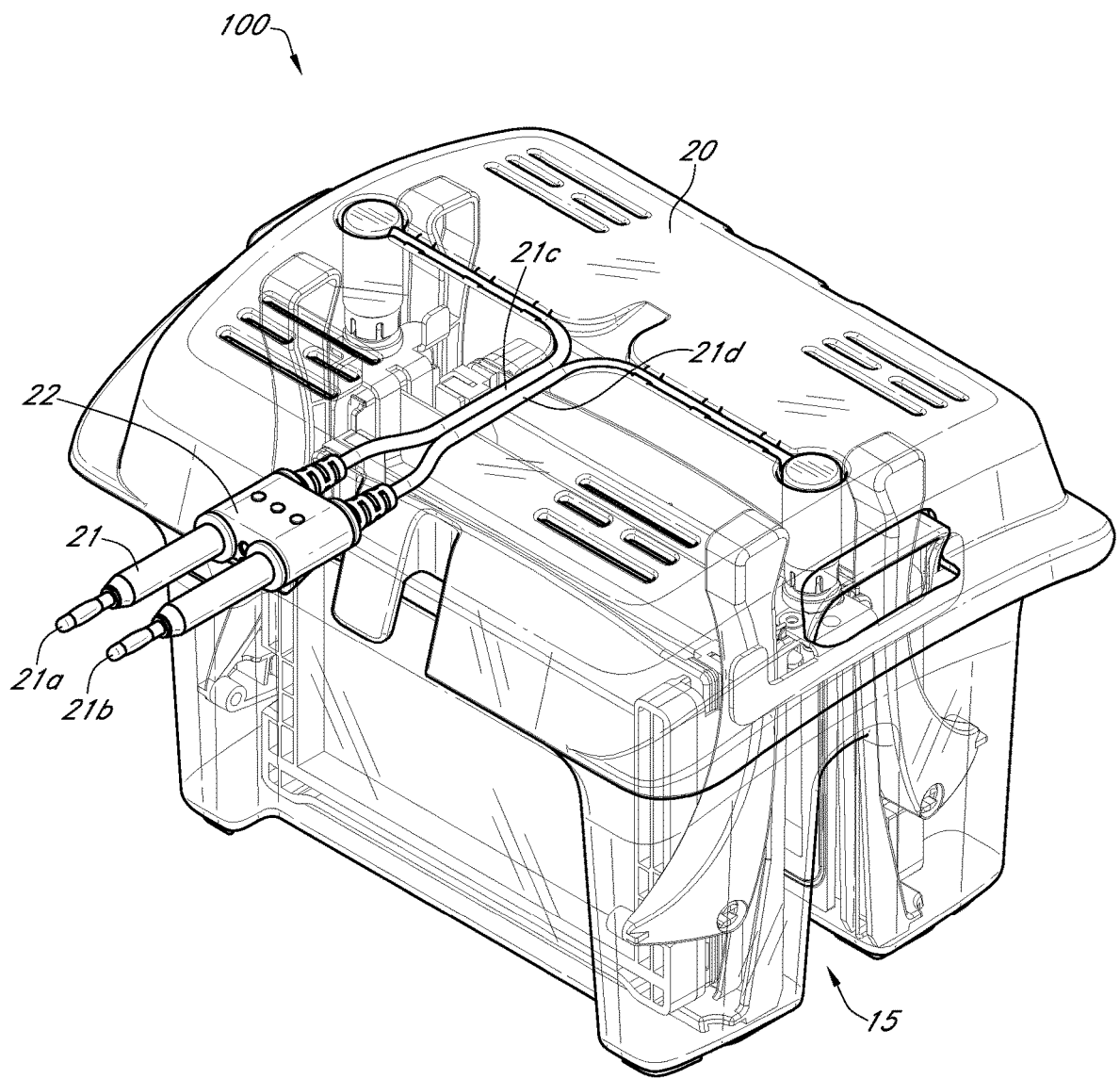
FIG. 9B depicts a front perspective view of FIG. 9A, with the lid placed on the system, according to one embodiment.

FIG. 9A depicts a front perspective view of an electrophoresis system 100 with base 110' and lid 20 shown located above that can be placed on the base 110', as shown by the bold arrows below the lid. FIG. 9B depicts a front perspective view of system 100 with lid 20 placed on the base 110' according to one embodiment. In some embodiments, system 100 for performing gel electrophoresis comprises: a base 110' comprising at least two chambers 10a and 10b, each chamber configured to independently receive an electrophoresis cassette 35 comprising two parallel plates 33a and 33b, enclosing a gel, each chamber configured to independently receive a clamp 28 for securing electrophoresis cassette 35 to a surface of each chamber, a single first electrode 12 from which two wire electrodes 12c run along the base of each chamber 10a and 10b, each chamber having a separate second electrode 13a and 13b connected at a common electrical node 13d. Some embodiments have a removable lid 20 for providing electrical connectivity to a power source, wherein the lid 20 has electrical connectors, such as 23a and 24a that can connect with electrical nodes 13d and 12d, respectively, to complete the circuit between the chamber electrodes when placed over the base. In one embodiment, a system 100 for electrophoresis of the disclosure comprises one electrophoresis cassette 35 and one clamp 28. In one embodiment, a system for electrophoresis 110 of the disclosure comprises two electrophoresis cassettes 35 and two clamps 28.

In some embodiments, a clamping mechanism of the disclosure is operable to clamp an electrophoresis cassette to an interior surface of a chamber/compartment of base 110'. In some embodiments, a clamping mechanism of the disclosure is operable to clamp an electrophoresis cassette to a gasket 17 inside a chamber/compartment. In some embodiments, a gasket 17 is placed on, or affixed to at least a portion of an inner surface 16a of a chamber/compartment of a system 100 of the disclosure. Non-limiting examples of placing or affixing a gasket include, but not limited to, over molding a gasket or gluing a gasket onto at least a portion of inner surface 16a.

In some embodiments, a clamping mechanism of the disclosure such as clamp 28 creates or forms a liquid-proof seal between an electrophoresis cassette 35 and a gasket 17 in a chamber/compartment 10a or 10b of system 100. Clamping an electrophoresis cassette into a chamber or compartment of a system of the disclosure, forms two fluidically separated sub-chambers/sub-compartments 10a' and 10a" in chamber 10a and sub-chambers/sub-compartments 10b' and 10b" in chamber 10b. In some embodiments, a first sub-chamber 10a' is formed between a portion of the first interior surface 16a of a chamber 10a (or 10b), a portion of gasket 17, and a plate 33b of the electrophoresis cassette 35 that faces the first interior surface 16a of the chamber of a system. In some embodiments, a second sub-chamber/sub-compartment 10a" is formed from the left and the right sides of the gel cassette 35, the outer edges of the plate 33a of the gel cassette 35 that faces toward the second interior surface 16b and the remainder of a chamber 10a (or 10b) of system 100 into which the electrophoresis cassette 35 and clamp 28 are placed.

Sub-chambers or sub-compartments so formed, during use of the system, can be filled with buffers for electrophoresis and can function as a first and a second buffer reservoir.

In some embodiments, a first buffer reservoir 10a' is formed between a portion of the first interior surface 16a of chamber 10a, a portion of gasket 17, and a plate of the electrophoresis cassette 33b that faces the first interior surface 16a of the chamber 10a of a system 100 into which the electrophoresis cassette 35 and clamp 29 are placed. In some embodiments, a second buffer reservoir 10a" is formed between the plate of the gel cassette 33a that faces toward the second interior surface 16b and the remainder of the chamber 10a into which the electrophoresis cassette 35 and clamp 28 are placed.

The system of the present disclosure is not limited to any size and can be scaled up or down to accommodate electrophoresis cassettes or electrotransfer cassettes of any size. For example, electrophoresis cassettes that can be used can include one or more mini-gel cassettes, midi-gel cassettes, large gel cassettes. For example, in a non-limiting example, each chamber of a system of the disclosure can accommodate electrophoresis buffer volumes from about 30 ml to 5 liters.

5) Electrotransfer Cassettes:

Embodiments of the present disclosure relate to electrotransfer cassettes. Several electrotransfer cassette embodiments are described that can be placed into a system 100 of the disclosure that can perform both gel electrophoresis and electrotransfer.

In one embodiment, an electrotransfer cassette of the disclosure comprises two plates (or shells) that can be joined, reversibly or permanently, by at least one joining mechanism to allow the two plates to move between an open position and a closed position, a locking mechanism to lock the two plates in the closed position, a sealing mechanism operable to seal the two plates in the closed position to form a liquid-proof seal on at least three sides, a second plate configured to receive components of a transfer stack on its interior side, and the external sides of the first plate and the second plate comprising at least one electrical interface each that is connected to an electrode located on the inside of each plate.

In some embodiments, the liquid proof seal is formed on all four sides of the electrotransfer cassette. In embodiments, where a liquid-proof seal is formed on three sides of the electrotransfer cassette, the three sides are the bottom side, the left side and the right side of the cassette.

In some embodiments, a joining mechanism of an electrotransfer cassette, comprise one or more of the following: a hinge, a plurality of hinges, a dis-connected hinge, a clamp, one or more hooks, one or more clips, mechanical components on both plates (or shells) that can slide and interlock, gluing, taping, bonding or welding two plates together, linkage designs, two plates connected by flexible material, or external components to join two plates. In some embodiments, the joining mechanism are reversible or permanent joining mechanisms. Permanent joining mechanisms allow for the two plates to stay together as one component. This can be advantageous for users as they provide fewer components and/or allow for easier closure of plates since there is no need to align plates prior to closure. Reversible joining mechanisms allow for two separate shells.

In some embodiments, a locking mechanism of an electrotransfer cassette of the present disclosure comprises a slider. A slider, in some embodiments, comprises: a band that wraps around portions of the width of the exterior side of a first plate, side extensions of the band that further wrap around portions of the depth of the exterior side of the first plate, and elements operable to reversibly engage with portions on the exterior side of the second plate to form a lock between the first and second plates when engaged. In some embodiments, when the two plates are closed, a slider of the electrotransfer cassette of the disclosure aligns with corresponding elements on the second plate that are operable to slide to form a lock.

In some embodiments, a locking mechanism can be a slider that can be attached to one of the plates via one or more mounting features. The slider, in some embodiments, can have mating mounting features that are operable and attach the slider permanently or reversibly to the plate. In some embodiments, a locking mechanism can be a slider located on one plate with mechanical mating features on the slider that can mate with corresponding mechanical features located on the other plate. Mating features are typically located on both sides of each plates.

In some embodiments, a locking mechanism can be a clamp on one plate and a clamp closure located on the other plate. Clamping mechanism is typically attached to one plate via a mounting feature. The clamp typically has mating mounting features which allow the clamp to attach to the other plate. Several mounting features can be used for example, a peg and hole mechanism and the like.

In some embodiments, a sealing mechanism of an electrotransfer cassette of the disclosure comprises at least a slider. In some embodiments, a sealing mechanism of an electrotransfer cassette of the disclosure can additionally comprises a gasket that is placed on one of the two plates of the electrotransfer cassette. In one example embodiment, when the two plates are closed, the slider (as described above) is moved in the direction toward the top end of the plates to form a lock and a liquid-proof seal on at least three sides of the electrotransfer cassette. In one example embodiment, when the two plates are closed, a slider is moved in the direction toward the bottom end of the plates to form a lock and a liquid-proof seal on at least three sides of the electrotransfer cassette. In one example embodiment, when the two plates are closed, a slider which is located on one of the sides of the closed plates is moved either up or down to form a lock and a liquid-proof seal on at least three sides of the electrotransfer cassette. In some embodiments, a liquid-proof seal can be formed on all the four sides of an electrotransfer cassette. Formation of a liquid-proof seal (or liquid-tight seal) creates or forms a liquid reservoir inside the electrotransfer cassette.

FIGS. 10A-10I depict one embodiment of an electrotransfer cassette 40 of the disclosure that comprises two plates (or shells), first plate 41 and second plate 42, joined by a joining mechanism (such as at least one hinge 43) to allow the two plates to move between an open position (see FIGS. 10A-10C for open position) and a closed position (see FIGS. 10D-10I for closed position), a locking mechanism to lock the two plates in the closed position, a sealing mechanism further operable to seal the two plates to form a liquid-proof seal on three sides, second plate 42 configured to receive components of a transfer stack on its interior side 42a, and the external sides 42b and the first plate 41 comprising at least one electrical interface each, 45a, 45b, 45c and/or 45d that are connected to an electrode located on the inside of each plate (first plate electrode 46; second plate electrode 47). The three sides of the electrotransfer cassette 40 where a liquid-proof seal is formed are the bottom side 48, the left side 49 and the right side 50 of the interior walls of the cassette. In some embodiments, an electrotransfer cassette of the disclosure comprises two plates (or shells 41 and 42) joined by more than one hinges 43.

In some embodiments, the electrodes located inside the two plates of an electrotransfer cassette of the disclosure, are plate electrodes that are embedded in the inner surface of each plate. In alternate embodiments, electrodes 46 and 47 can be wire electrodes, wire mesh electrodes, bar electrodes or plate electrodes. These electrodes can be made of conductive materials such as but not limited to steel, stainless steel, copper, platinum, palladium, iridium, titanium, conductively coated materials, conductive plastics, etc. In some embodiments, the external electrical interfaces 45 (45a, 45b, 45c, 45d etc) of the plate electrodes can be springs, electrical nodes, brackets, pins, plugs, any design that allows for an electrical contact such as an electroplated interface to the electrode. The external electrical interfaces 45a, 45b, 45c and 45d, of plate electrodes 46 and 47 are configured to physically and/or electrically connect with chamber electrodes 12, 13a and 13b or with electrode extensions of these electrodes, such as 12a, 12b, 13c', 13c'' etc. that have electrical connections to a power supply. The electrodes or electrode extensions can be comprised in a system 100 or 100' of the disclosure that can perform both electrophoresis and/or electrotransfer. Alternatively, the electrodes or electrode extensions can be comprised in any system that can perform electrotransfer (including electrotransfer systems not expressly depicted herein).

In one embodiment, in a system 100 of the present disclosure, as shown for example in FIG. 1, the first electrode 12 that spans both chambers is configured to contact a first electrode interfaces 45c or 45d on an electrotransfer cassette 40 that can be placed into one or more chambers 10a or 10b. In some embodiments, the first electrode interface 45c or 45d of an electrotransfer cassette 40 is an anode interface and connects to internal plate electrode 46.

In some embodiments, the second electrode 13a or 13b of a chamber/compartment of a system 100 of present disclosure has extensions 13c' and 13c'' configured to contact a second electrode interface 45a or 45b on an electrotransfer cassette 40 that can be placed into one or more chambers 10a or 10b. In some embodiments, the second electrode interfaces 45a or 45b of an electrotransfer cassette 40 are cathode interfaces and connect to internal plate electrode 47.

Figure 10A:
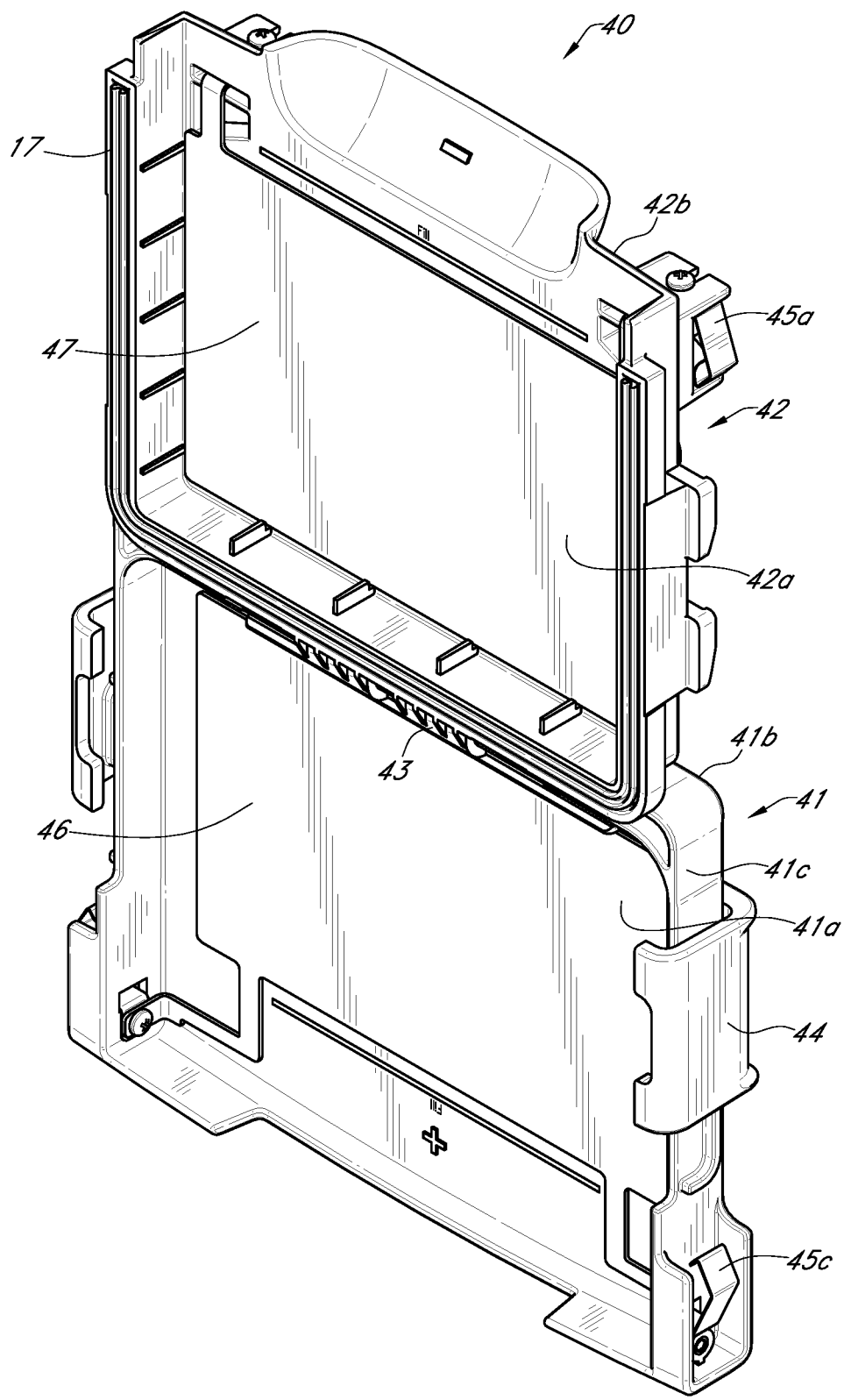
FIG. 10A depicts a front perspective view of the inside of an exemplary electrotransfer cassette, in an open position, according to one embodiment.
Figure 10B:
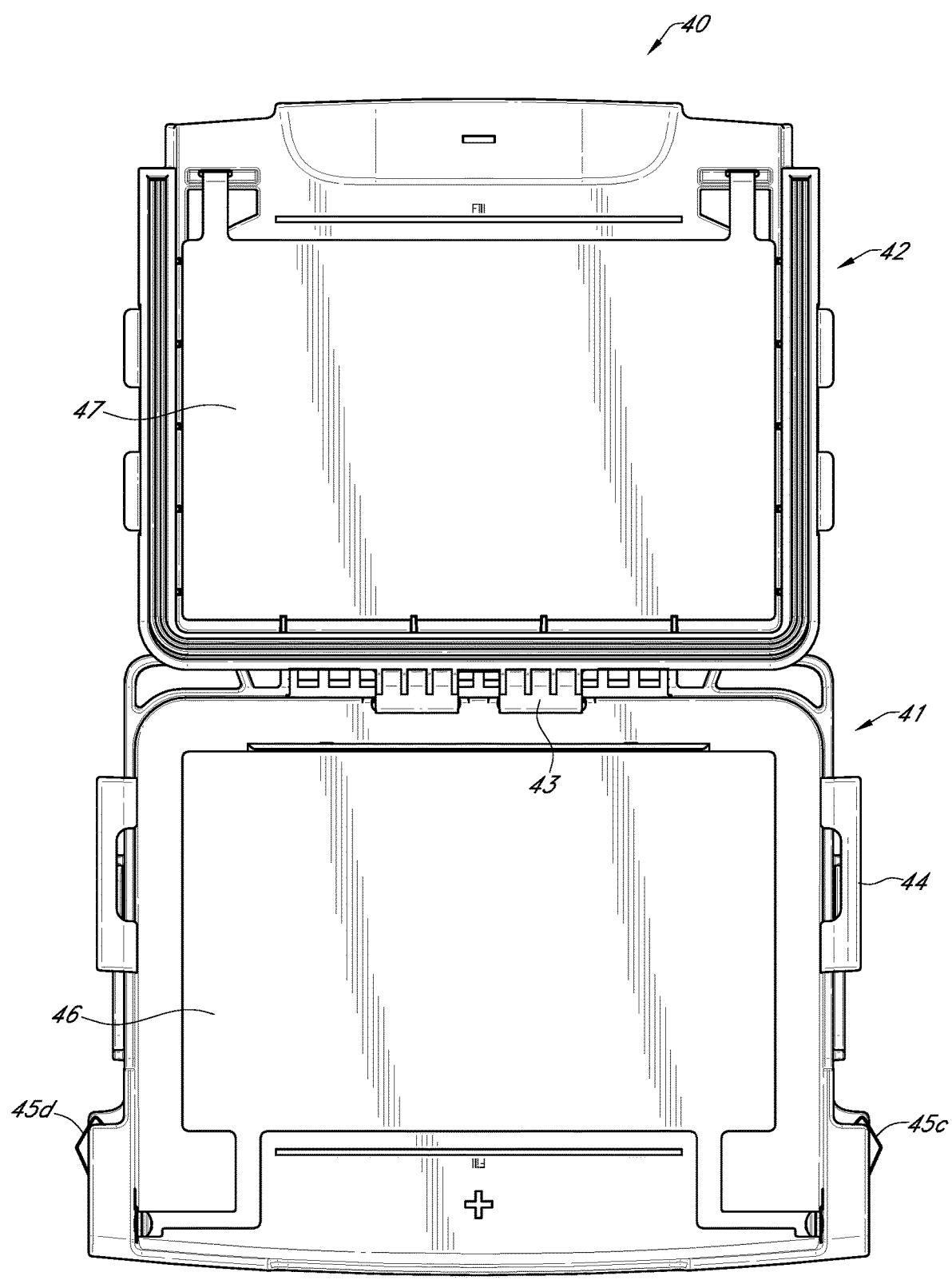
FIG. 10B depicts a front view of the inside of the electrotransfer cassette of FIG. 10A, in an open position, according to one embodiment.
Figure 10C:
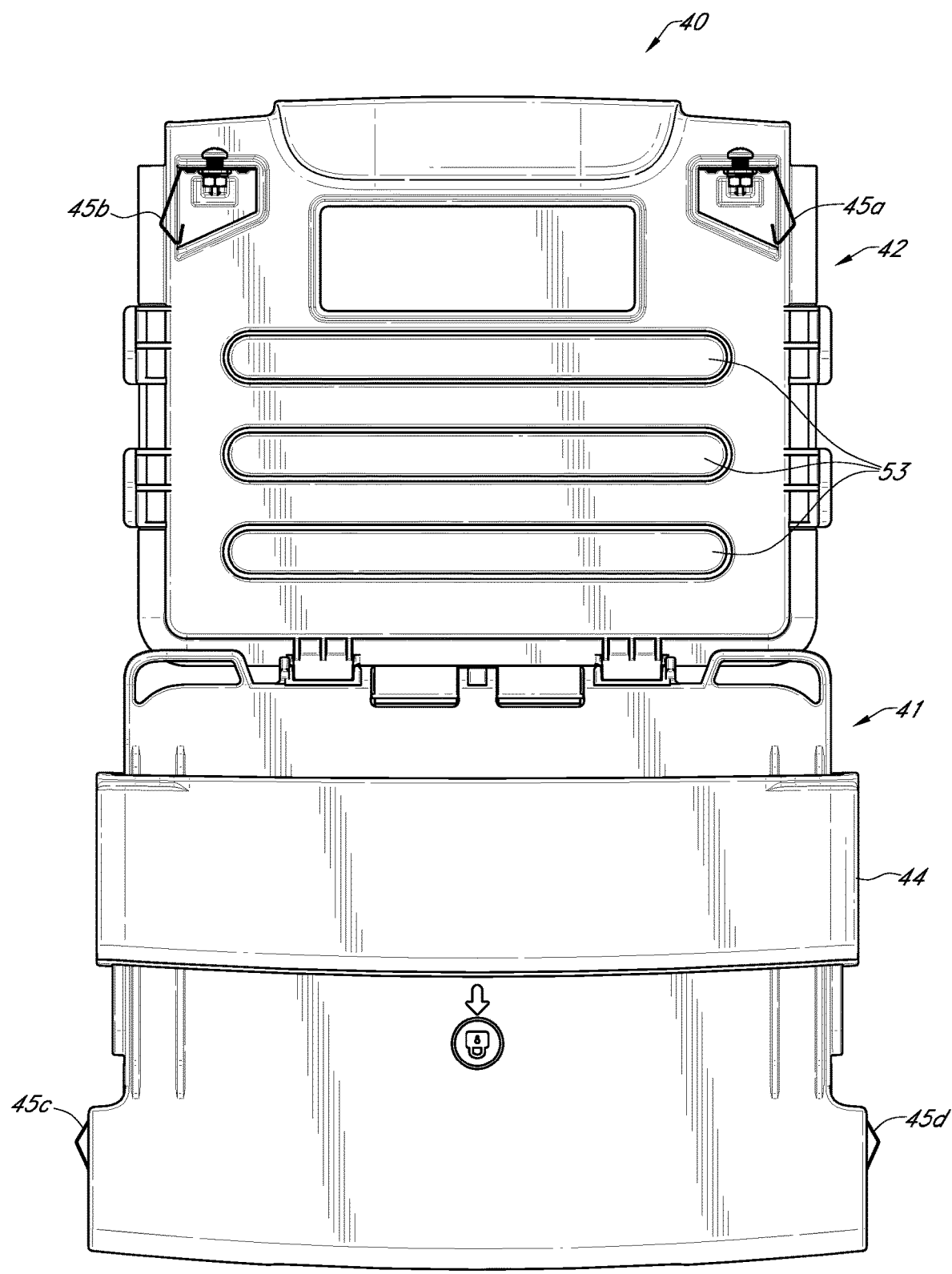
FIG. 10C depicts a back view of the backside of the electrotransfer cassette of FIG. 10B, in an open position, according to one embodiment.
Figure 10D:
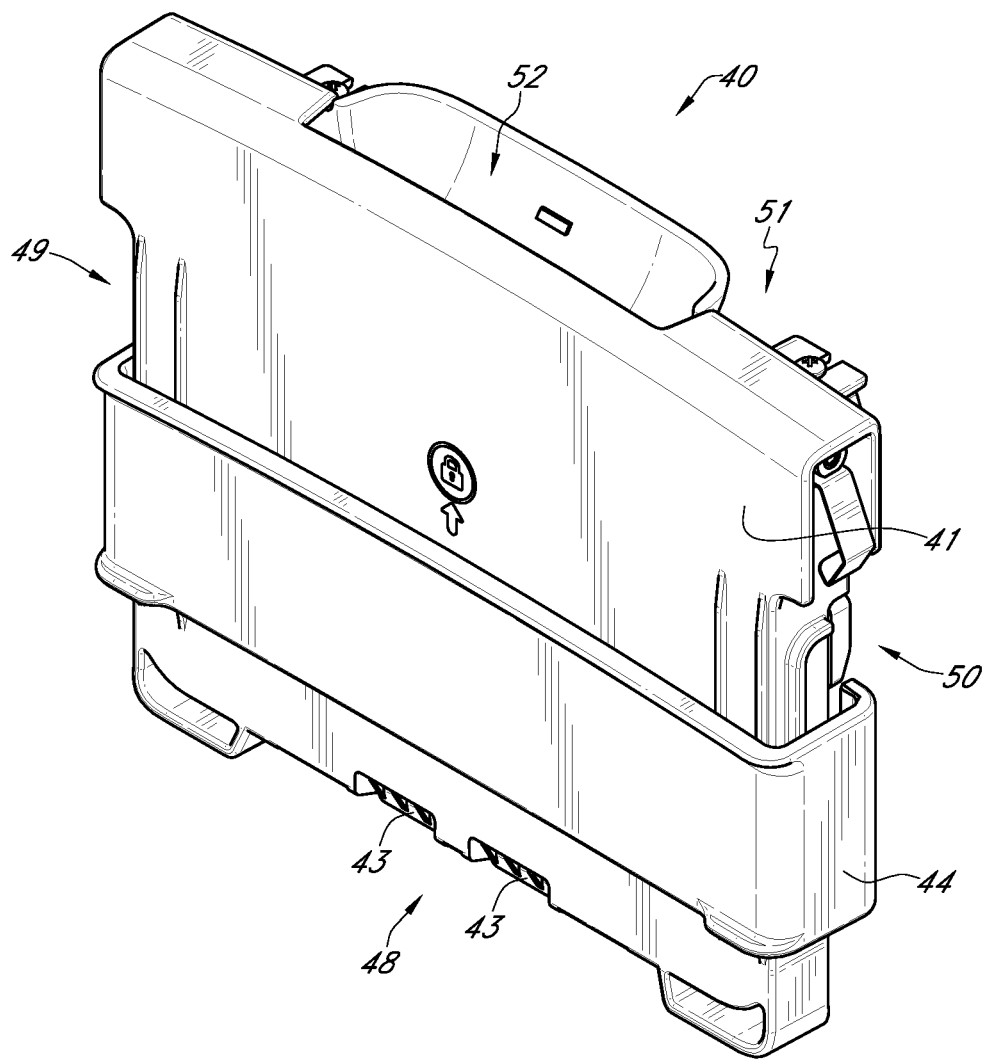
FIG. 10D depicts a front perspective view of the electrotransfer cassette of FIG. 10A, in a closed and unlocked position, according to one embodiment.
Figure 10E:
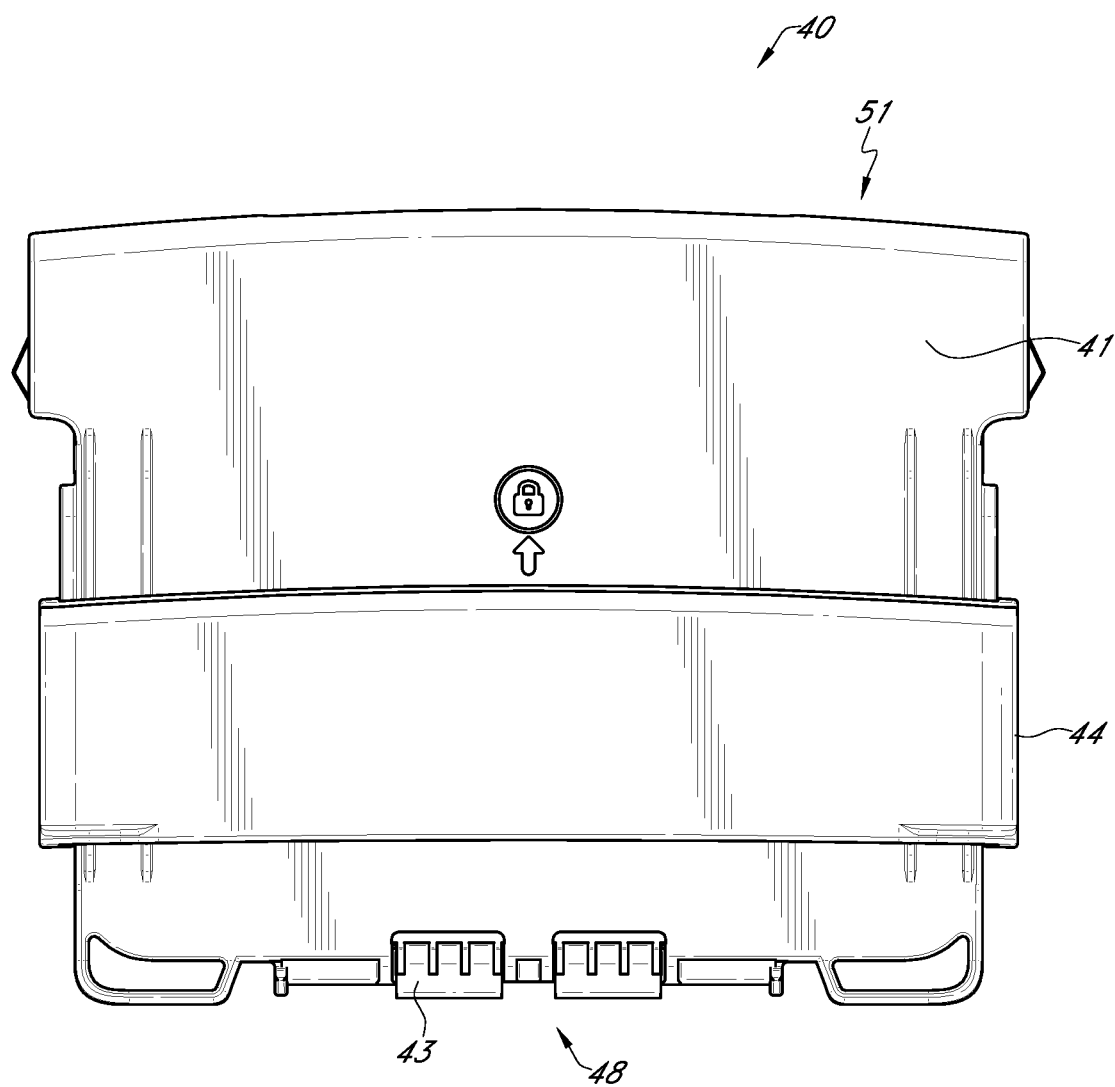
FIG. 10E depicts a front view of the electrotransfer cassette of FIG. 10D, in a closed and unlocked position, according to one embodiment.
Figure 10F:
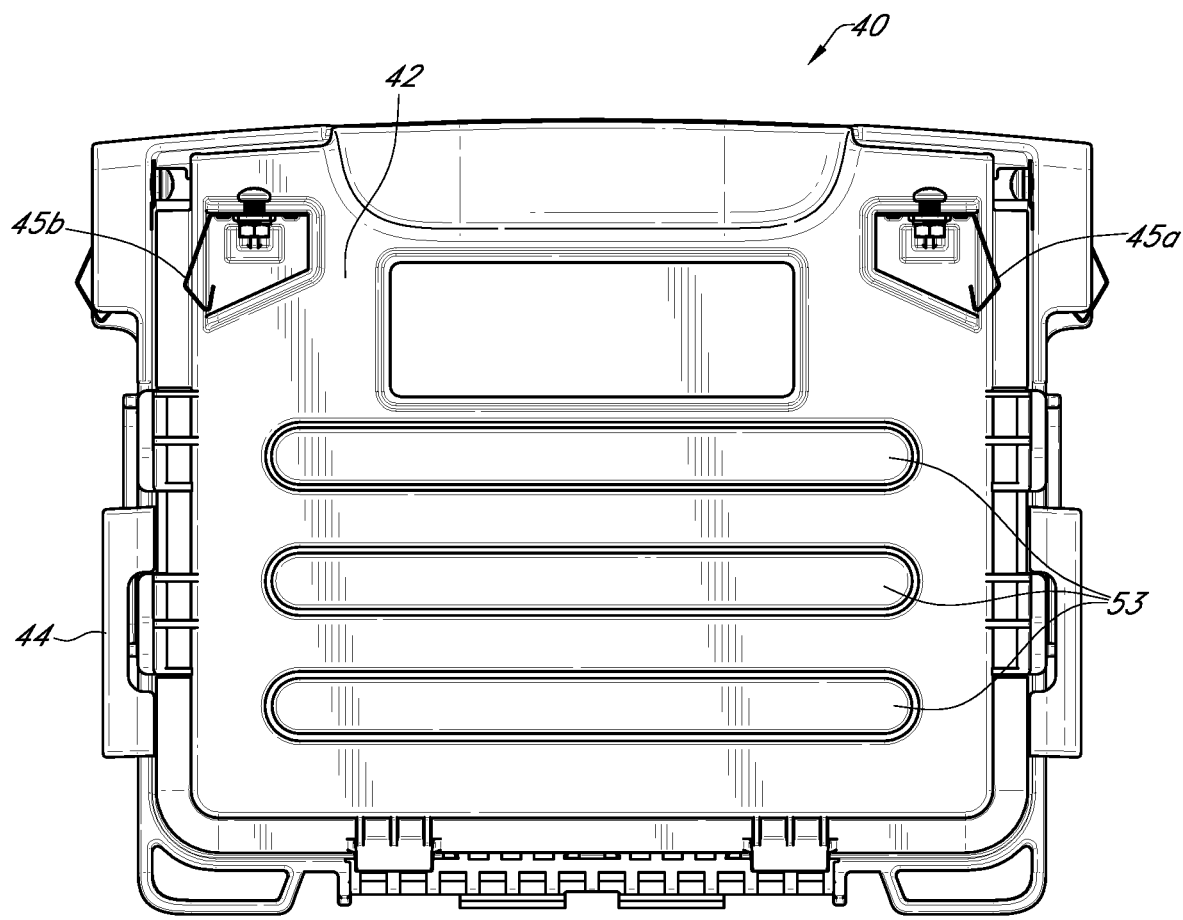
FIG. 10F depicts a back view of the electrotransfer cassette of FIG. 10E, in a closed and unlocked position, according to one embodiment.
Figure 10G:
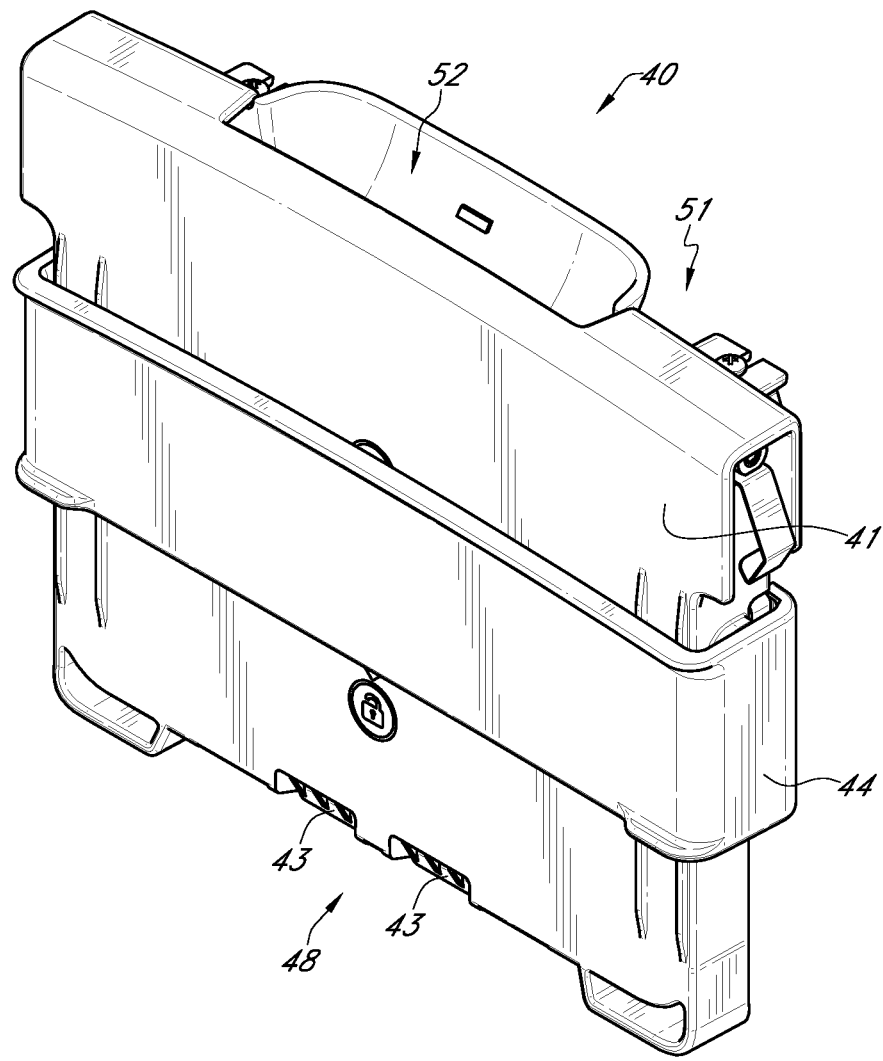
FIG. 10G depicts a front perspective view of the electrotransfer cassette of the system of FIG. 10A, in a closed and locked position, according to one embodiment.
Figure 10H:
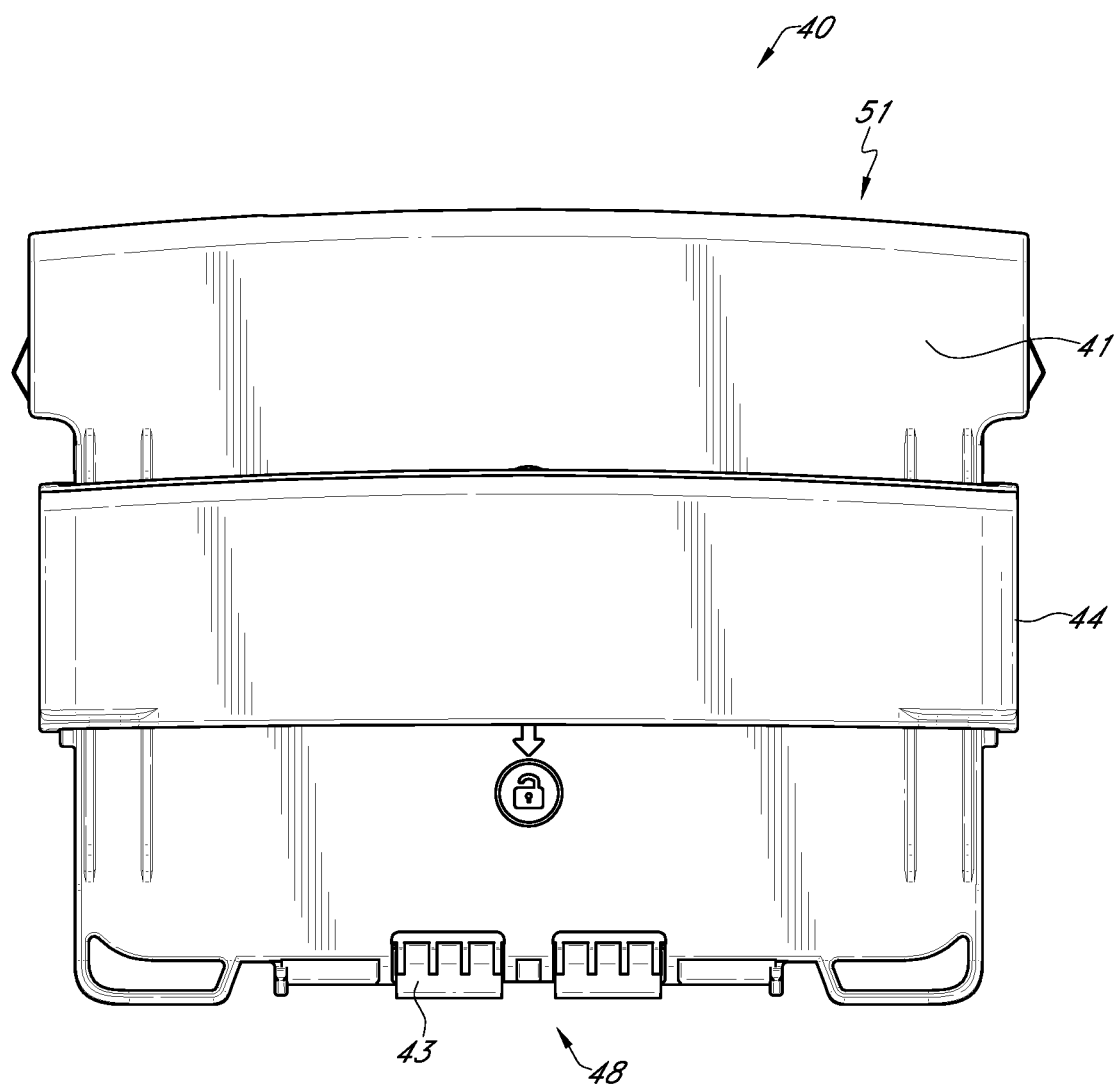
FIG. 10H depicts a front view of the electrotransfer cassette of FIG. 10G, in a closed and locked position, according to one embodiment.
Figure 10I:
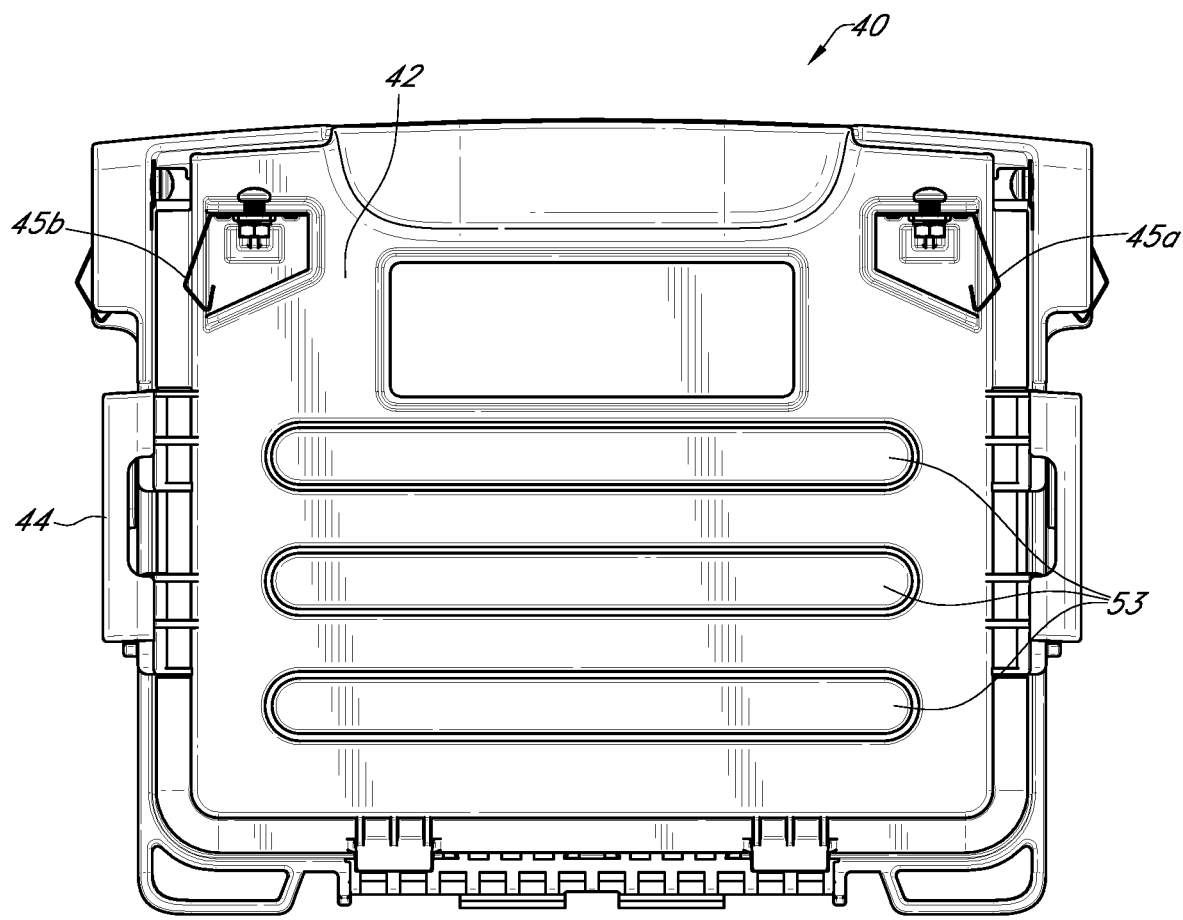
FIG. 10I depicts a back view of the exemplary electrotransfer cassette of FIG. 10H, in a closed and locked position, according to one embodiment.

In some embodiments, a locking mechanism of an electrotransfer cassette of the present disclosure comprises a slider 44. As shown in FIG. 10D, slider 44, in some embodiments, comprises: a band that wraps around portions of the width of the exterior side 41b of the first plate 41, side extensions of the band that further wrap around portions of the depth 41c of the exterior side 41b of the first plate 41, and elements operable to reversibly engage with portions on the exterior side of the second plate 42 to form a lock between the first and second plates when engaged. As shown in FIG. 10D, FIG. 10E and FIG. 10F, in some embodiments, when the two plates 41 and 42 are closed, slider 44 of electrotransfer cassette 40 aligns with corresponding elements on the second plate 42 that are operable to slide to form a lock (see upward arrow in FIG. 10E for direction of sliding). As shown in FIG. 10D and FIG. 10E, in some embodiments, when the two plates 41 and 42 are closed, the slider is moved in the direction toward the top end of the plates (see upward arrow in FIGS. 10D and 10E for direction of sliding), to form a lock and a liquid-proof seal, as shown in FIGS. 10G and 10H, on three sides 48, 49 and 50 on the interior surfaces of electrotransfer cassette 40.

In some embodiments, locking mechanism, such as slider 44, also functions as the sealing mechanism. Additional, sealing mechanism components of electrotransfer cassette 40a comprise a gasket 17 which can be placed on the inner side of one of the two plates 41 or 42, such that it is located between the two plates when the plates are closed. In FIGS. 10A and 10B, gasket 17 is located on plate 42 and forms a liquid-proof seal between the two plates when locking mechanism 44 is slid into a locked and sealed position of electrotransfer cassette 40. Formation of a liquid-proof seal on three sides of the electrotransfer cassette creates or forms a liquid reservoir inside the electrotransfer cassette. In use, if needed, in some embodiments, additional buffer can be poured into the liquid reservoir to enable electrical flow of current in the electrotransfer cassette for the transfer of biomolecules in the transfer stack from a gel/matrix to a membrane/material. In some embodiments, in use, no additional buffer is needed and the liquid reservoir serves to contain buffer in a transfer stack without spillage and enables electrical flow of current in the electrotransfer cassette for the transfer of biomolecules in the transfer stack from a gel/matrix to a membrane/material.

In some embodiments, the second plate 42 has a lip or a protrusion 52 on the top side 51 that is operable to dispense a liquid into the electrotransfer cassette 40 after it is sealed on the other three sides 48, 49 and 50. An electrotransfer cassette can have a visual marker such as a fill line or other indication inside the liquid reservoir to indicate the amount of liquid (such as electrotransfer buffer) to be filled by a user.

In some embodiments, an electrotransfer cassette of the disclosure, further comprises elements that provide a support structure located on the external side of the second plate or first plate. In non-limiting examples, a support structure can reduce or prevent warping or bowing of the first and/or second plate. In one non-limiting exemplary embodiment, a support structure 53 can comprises one or more ribs, one or more ridges, one or more groves, one or more protruded structures, concave protrusions or surfaces or structures.

In some embodiments, a support structure 53 allows the second plate 42 to rest at an angle. In some embodiments, the angle caused by the support structure allows for an ergonomic ease to assemble and/or view the transfer stack. In some embodiments, a support structure 53 reduces buffer spillage during assembly of a transfer stack on the second plate 42. Support structures, in some embodiments, provide support to plate electrodes, such that the two plate electrodes are substantially parallel to each other to allow optimum electrical fields between the two plate electrodes to facilitate efficient transfer of biomolecules during electrotransfer.

Figure 11A:
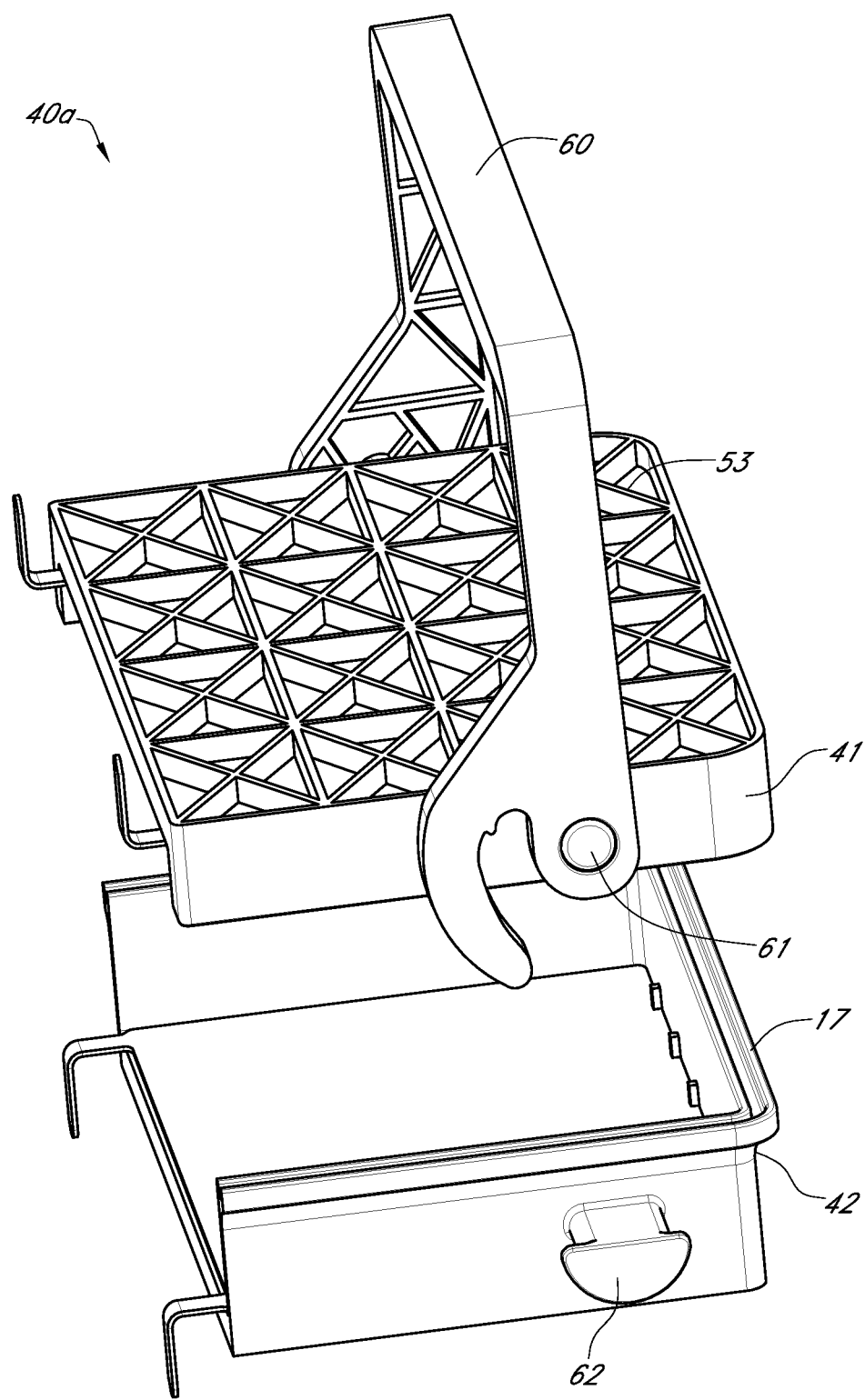
Figure 11B:
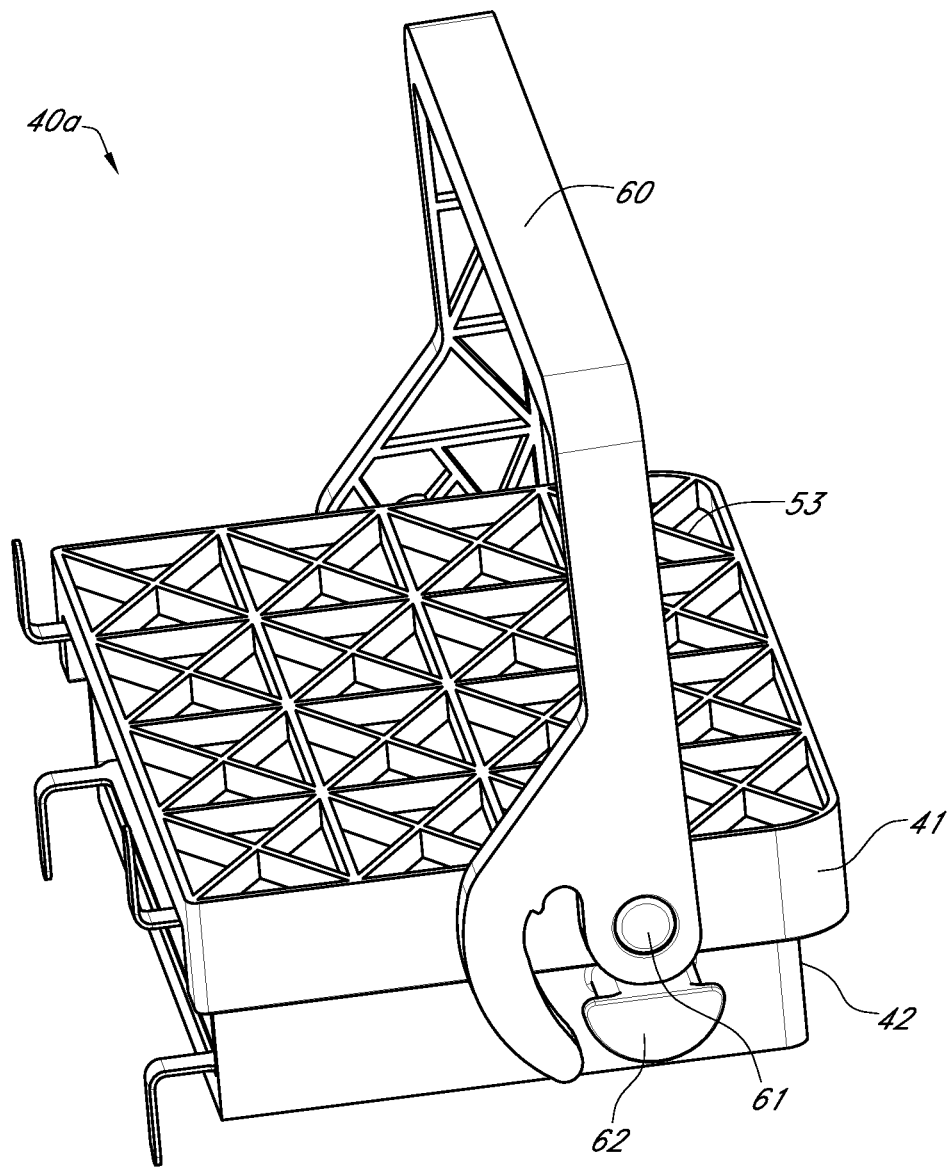
Figure 11C:
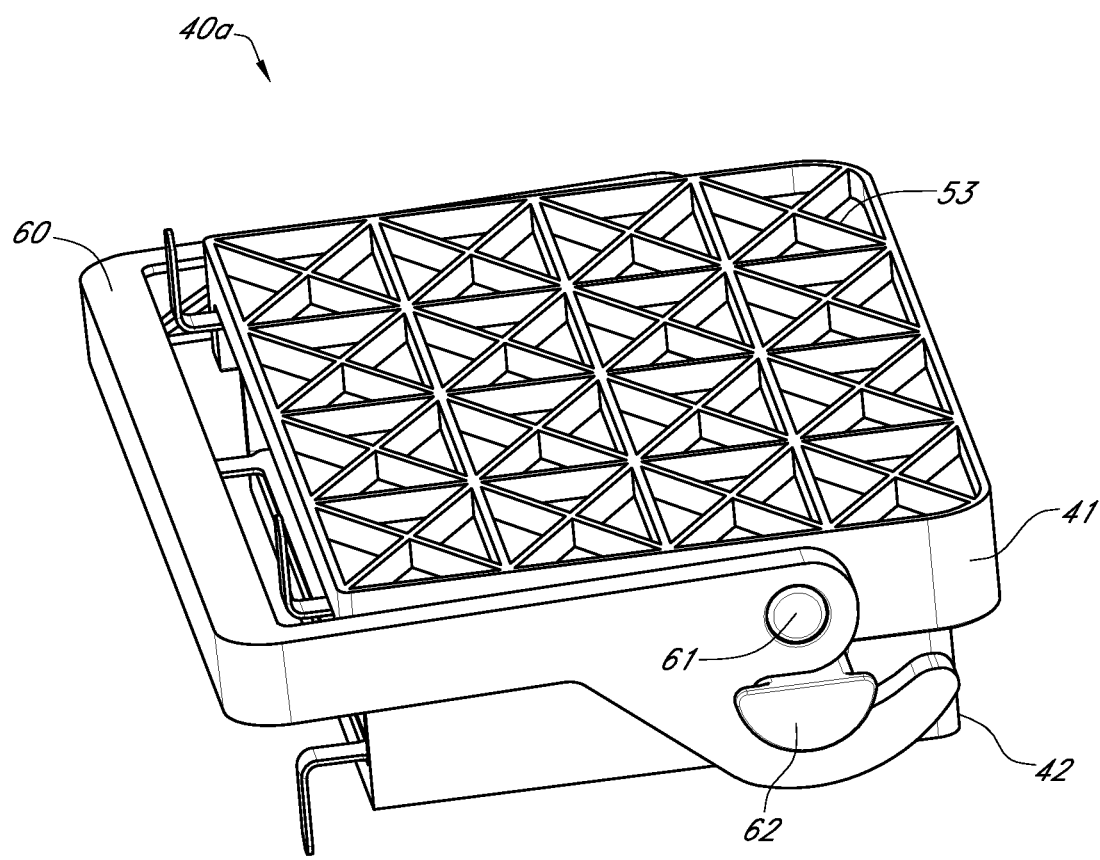

FIGS. 11A, 11B and 11C depicts an exemplary electrotransfer cassette 40a of the disclosure, having a clamp closure, locking and sealing mechanism, according to one embodiment. FIG. 11A depicts electrotransfer cassette 40a in an open position showing two separate plates, second plate 42 operable to receive a transfer stack and first plate 41 operable to enclose the second plate 42 with the transfer stack. A transfer stack (not expressly shown) typically comprises a transfer buffer or conductive ions comprised in a gel or a matrix or in a combination of sponges and filter papers; a gel with biomolecules; and a membrane to transfer the biomolecules onto (not shown). Each plate 41 and 42 houses or comprises an electrode each (similar to 46 and 47 in FIGS. 10A-10I). Plate electrodes 46 and 47 comprise electrical interfaces (not expressly shown) that can be connected to a power supply. First plate 41 comprises or has a clamping mechanism 60 attached or connected thereto which is operable to close, lock and/or seal the two plates together. FIG. 11B depicts a closed position where plates 41 and 42 are closed, but not yet locked or clamped or sealed, where clamp 60 is still upright. In some embodiments, clamping mechanism 60 also functions as the sealing mechanism. One or both plates 41 and 42 can additionally have support structures such as exemplary ribs/ridges 53 depicted on plate 41 herein. Support structures, such as 53, reduce or prevent bowing or warping of plates when clamped. Additional, sealing mechanism components of electrotransfer cassette 40a comprise a gasket (not shown) which can be placed on the inner side of one of the two plates 41 or 42, such that it is located between the two plates when the plates are closed. The gasket forms a liquid-proof seal between the two plates when the clamping mechanism 60 is clamped down as depicted in FIG. 11C which depicts a locked and sealed position of electrotransfer cassette 40a.

Clamping mechanism 60, in some embodiments, is attached to first plate 41 via a mounting feature 61 on the second plate. The clamp mechanism 60 has mating mounting features 62 which allow clamp 60 to attach to first plate 41. As shown in FIGS. 11A, 11B and 11C, these mounting features are depicted as a peg and hole mechanism that enable clamp 60 to pivot between open/closed positions. This 0-180 degree rotating clamp movement allows clamp 60 to move from an open and/or unlocked and/or unsealed position (~0 degrees) to a closed and/or a locked and/or a sealed position (~180 degrees). When clamp 60 is closed (as in FIG. 11B and FIG. 11C), a feature on the clamp engages with a feature 62 on second plate 42 to form a liquid-tight seal (see FIG. 11C). In this non-limiting exemplary embodiment, the mounting and engaging features are depicted as a hook and peg interface. Other similar features can be substituted.

FIGS. 12A, 12B, 12C, 12D and 12E depicts an exemplary electrotransfer cassette 40b of the disclosure, having hinges and having two separate plates 41 and 42 with a slider 44 on one of the plates for closing and locking. The joining mechanism of two separate plates 41 and 42 is one or more hooks 43' shown here located at the bottom of each plate to connect the two plates together and facilitate the plates moving between an open and a closed position via a hinge motion. Alternatively, hooks 43' can be located on the left or right side of plates 41 or 42.

Figure 12A:
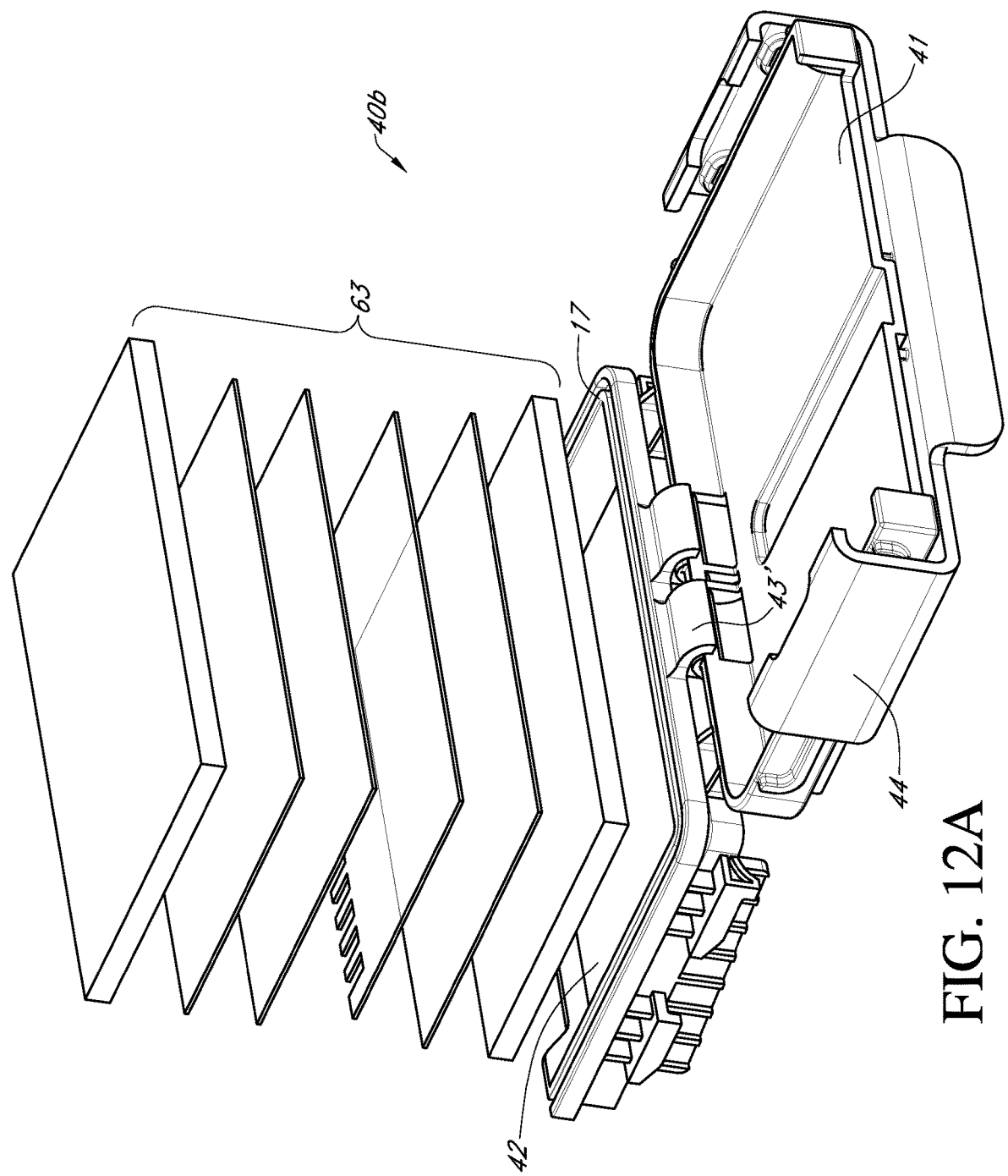

In contrast to the two plates 41 and 42 of electrotransfer cassette 40 of FIGS. 10A-I, these two plates of 40b are not permanently attached and can be unhooked from each other. FIG. 12A depicts an open position of exemplary electrotransfer cassette 40b with an exploded view of transfer stack assembly 63 (see sections below for details on transfer stack assembly) placed in second plate 42 and first plate 41 operable to enclose the second plate 42 having a transfer stack 63. Each plate 41 and 42 houses or comprises an electrode each (not depicted). Plate electrodes comprise electrical interfaces (not expressly shown) that can be connected to a power supply. First plate 41 comprises or has a locking mechanism, depicted as slider 44, attached or connected thereto which is operable to close, lock and/or seal the two plates together. Slider 44 also functions as the sealing mechanism in this embodiment. First plate 41 also has mechanical features to guide sliding motion of slide 44 to enable a smooth closing/locking/sealing for a user.

Figure 12B:
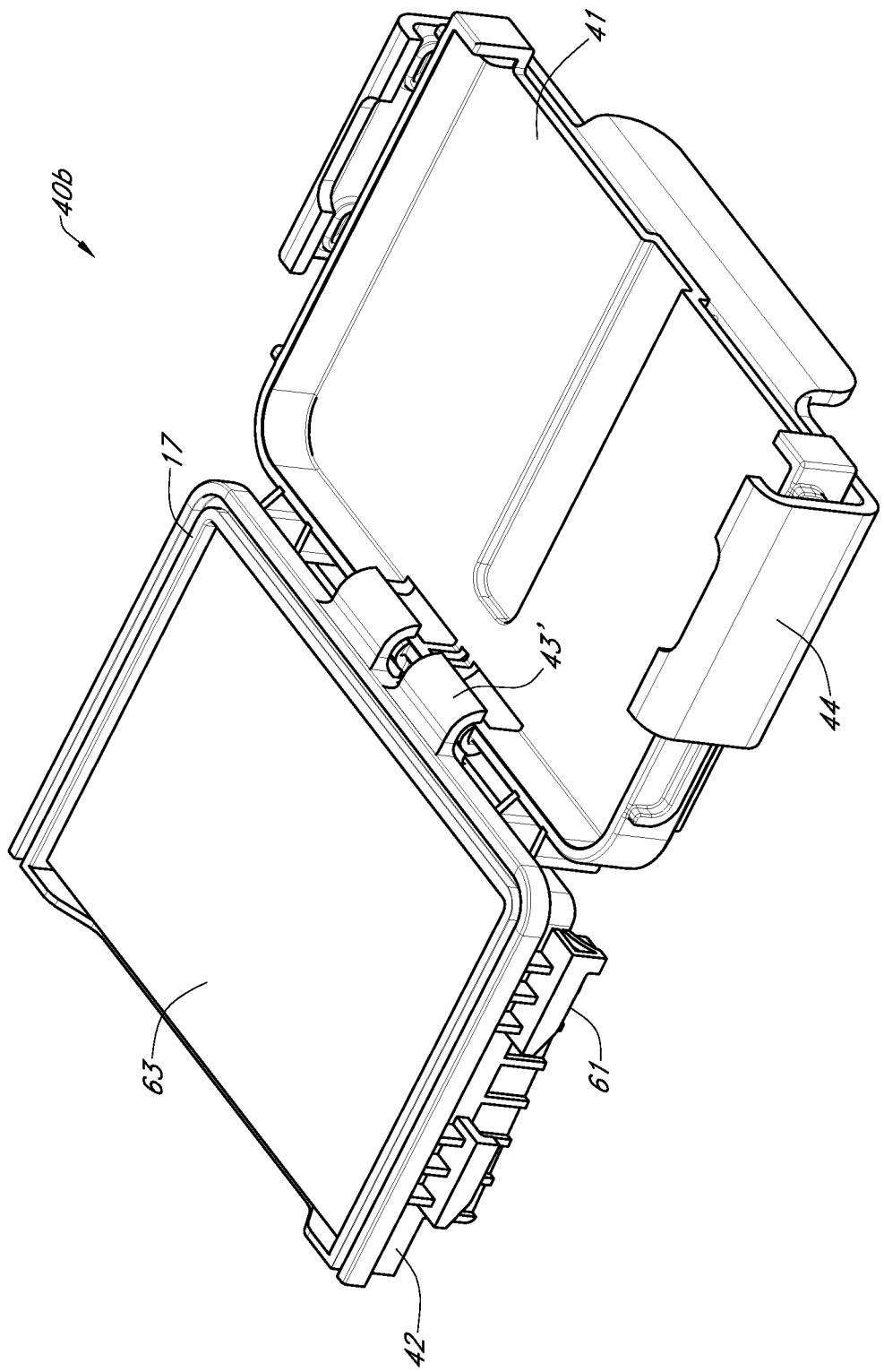
Figure 12C:
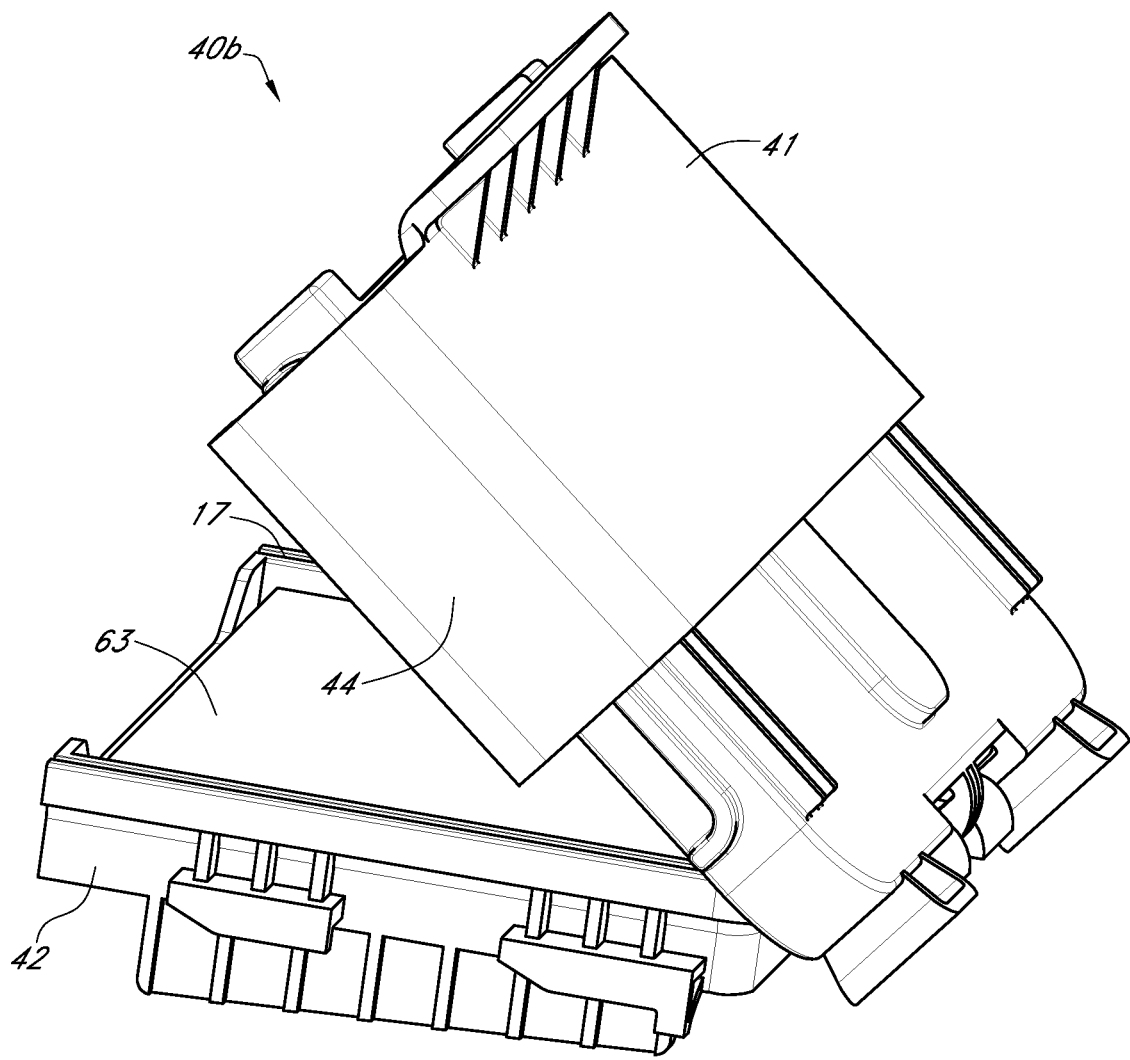
Figure 12D:
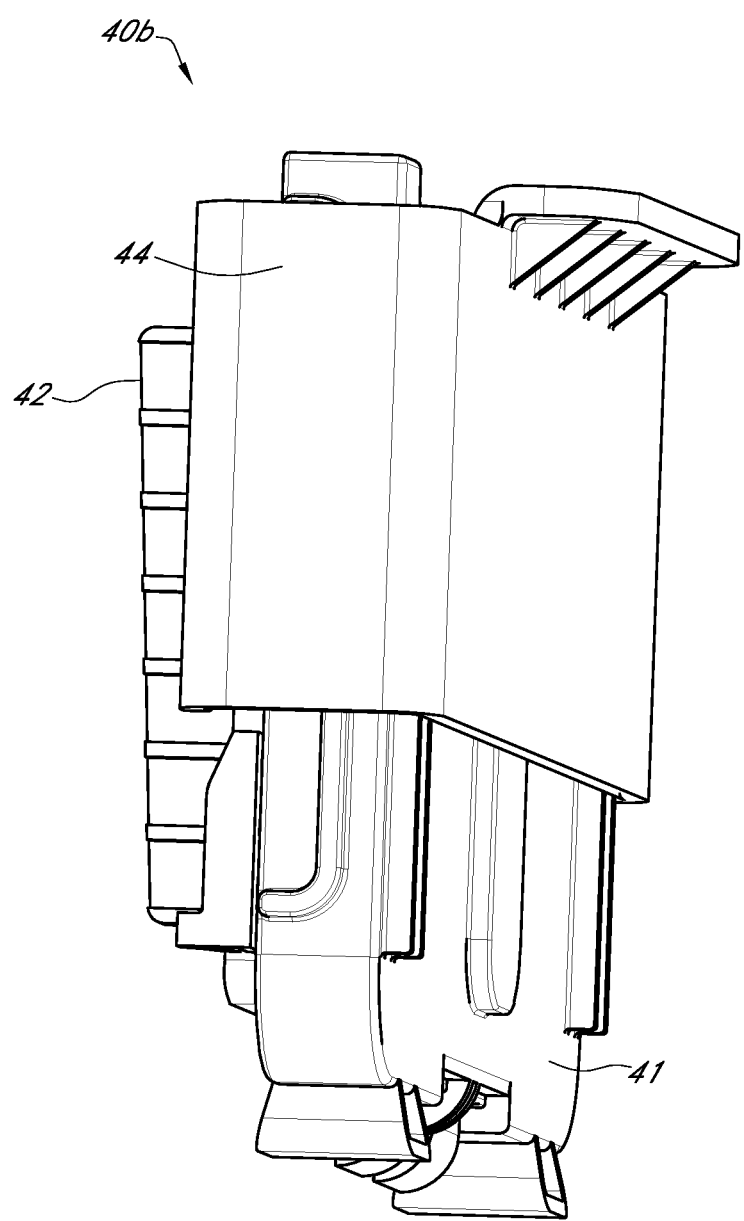
Figure 12E:
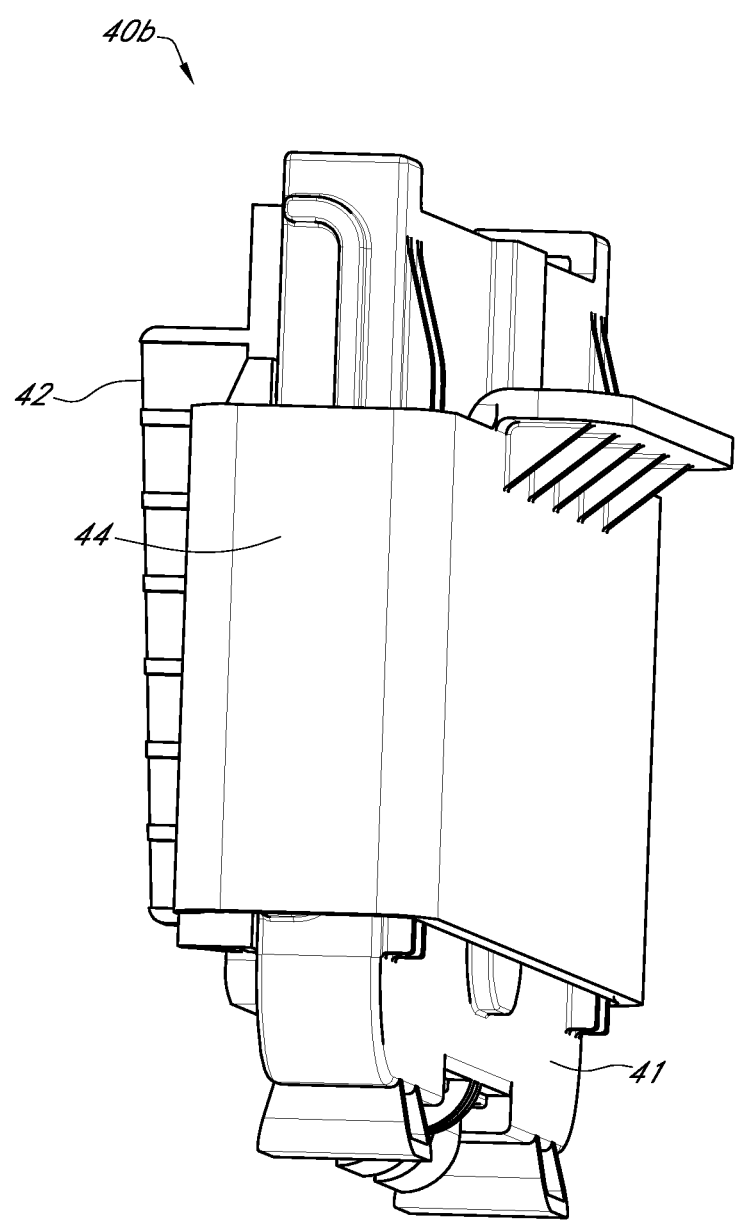

Additional, sealing mechanism components of electrotransfer cassette 40b comprise a gasket 17 which can be placed on the inner side of one of the two plates 41 or 42, such that it is located between the two plates when the plates are closed. FIG. 12B depicts an open position of electrotransfer cassette 40b with assembled transfer stack 63 and in this embodiment, gasket 17 shown as the border on the inside of second plate 42. Gasket 17 forms a liquid-proof seal between the two plates when the locking mechanism 44 and sealing mechanism 44 is down as depicted in FIG. 12E which depicts a locked and sealed position of electrotransfer cassette 40b.

One or both plates 41 and 42 can additionally have support structures such as exemplary ribs/ridges depicted on plate 41 herein. Support structures reduce or prevent bowing or warping of pates when clamped. FIG. 12C depicts a half-open position as the two plates 41 and 42 are being closed.

As shown in FIGS. 12C, D and E, locking and sealing mechanism, embodied here by slider 44, is attached to first plate 41 via one or more mounting or mating features on the second plate with the slider. Slider 44 has mating mounting features that are operable to enable slider 44 to attach to the second plate permanently. As depicted in FIGS. 12D and E, slider 44 engages with one or more mating features 61 on second plate 42 on both sides of the electrotransfer cassette 40b. FIG. 12D depicts a closed position with slider 44 and the top. Slider 44 can be slid downward to lock the cassette and FIG. 12E depicts a locked position with slider slide down.

Figure 13A:
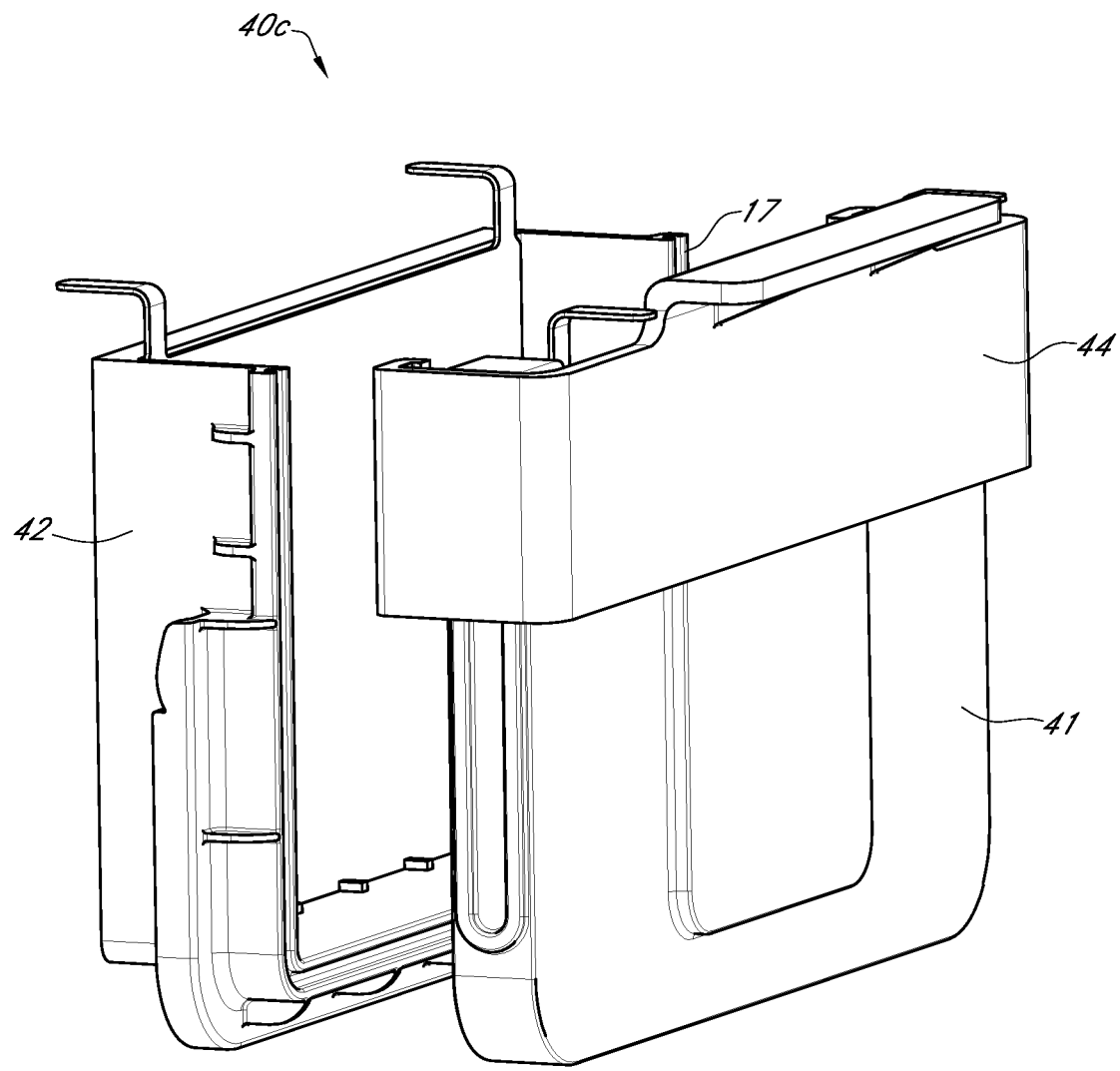
Figure 13B:
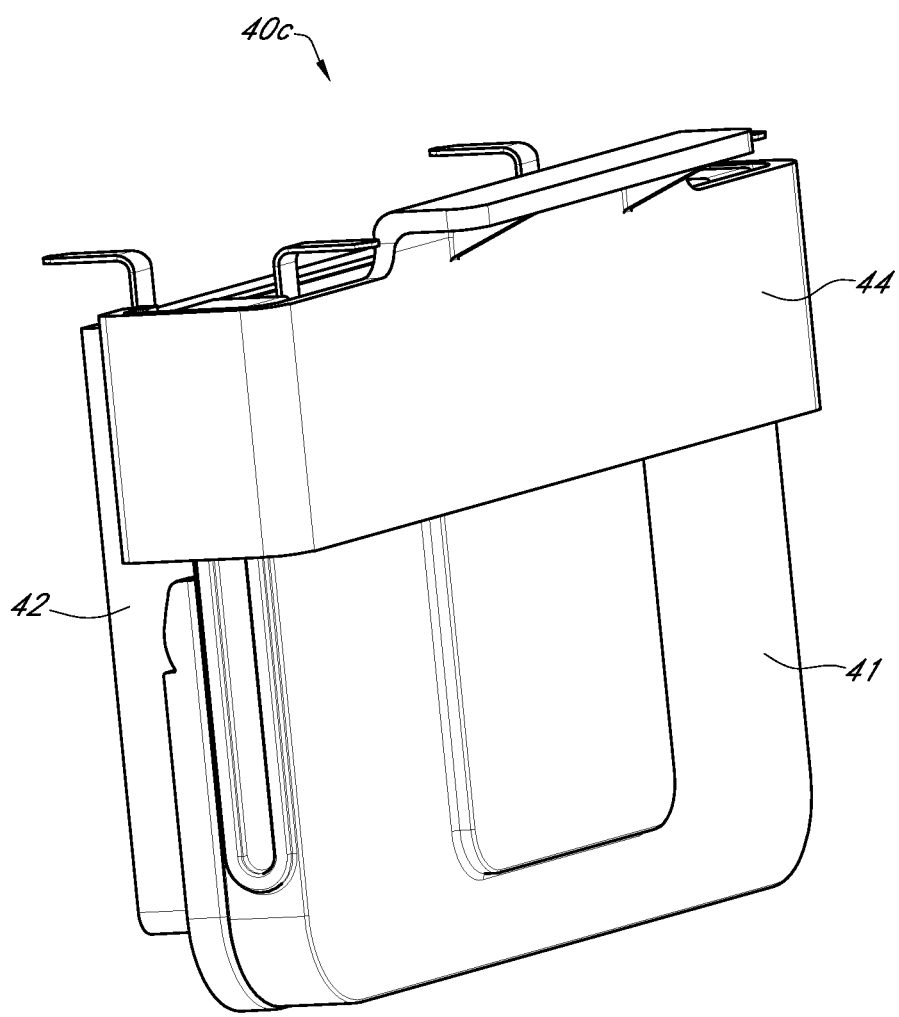
Figure 13C:
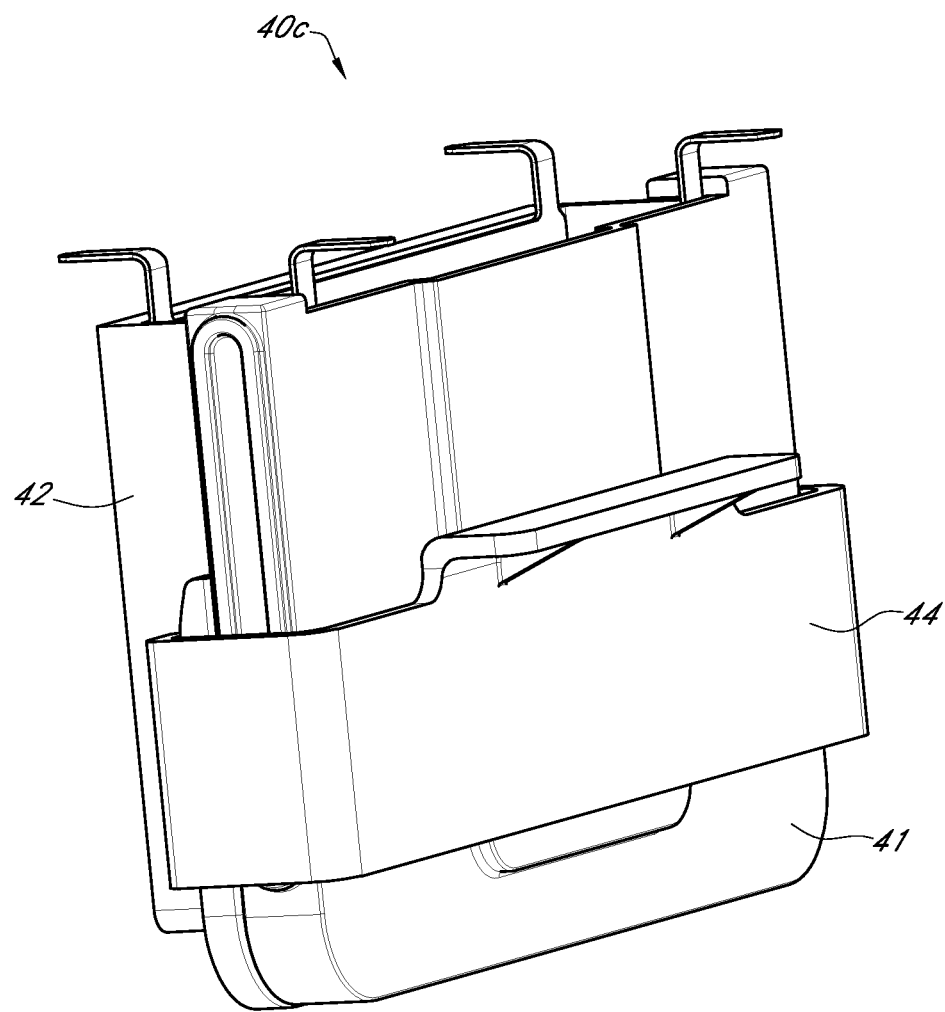

FIGS. 13A, 13B and 13C depicts an exemplary electrotransfer cassette 40c of the disclosure, having no hinges and two plates 41 and 42 with a slider lock 44 attached to one plate. In this embodiment of an electrotransfer cassette, slider 44 comprises the joining mechanism, the locking and sealing mechanisms as well. FIG. 13A depicts an open position of exemplary electrotransfer cassette 40c wherein transfer stack assembly (not shown) can be placed in second plate 42. First plate 41 is operable to enclose second plate 42 and the transfer stack. Each plate 41 and 42 houses or comprises an electrode. Plate electrodes comprise electrical interfaces (not expressly shown) that can be connected to a power supply. First plate 41 comprises or has a locking mechanism, depicted as slider 44, attached or connected thereto which is operable to close, lock and/or seal the two plates together. Slider 44 also functions as the sealing mechanism in this embodiment. First plate 41 also has mechanical features to guide sliding motion of slide 44 to enable a smooth closing/locking/sealing for a user. Additional, sealing mechanism components of electrotransfer cassette 40*c* comprise a gasket 17 which can be placed on the inner side of one of the two plates 41 or 42, such that it is located between the two plates when the plates are closed. FIG. 13B depicts a closed but unlocked position with slider on top and FIG. 13C depicts a locked position with slider slid down, according to one embodiment.

Figure 14A:
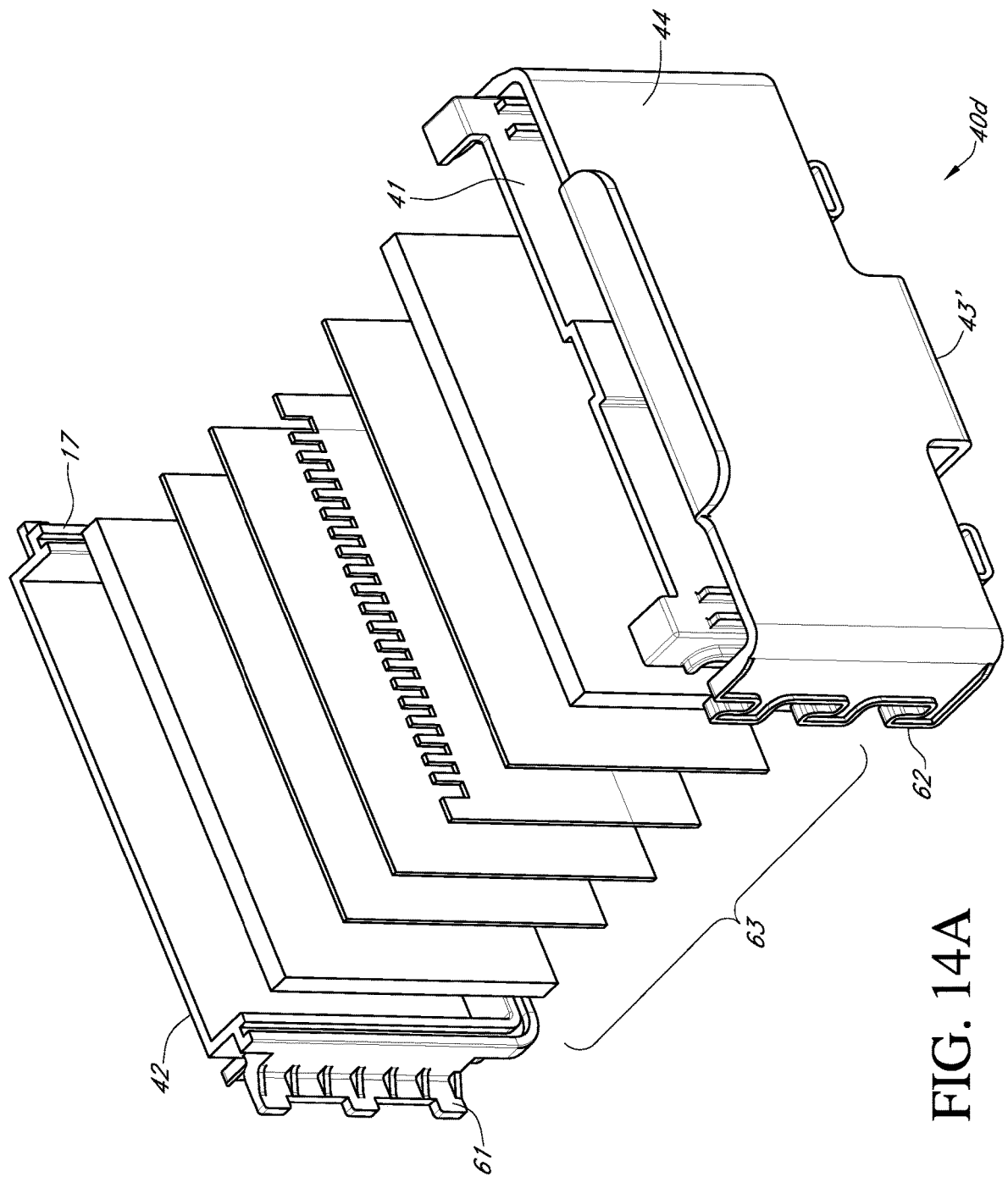
Figure 14B:
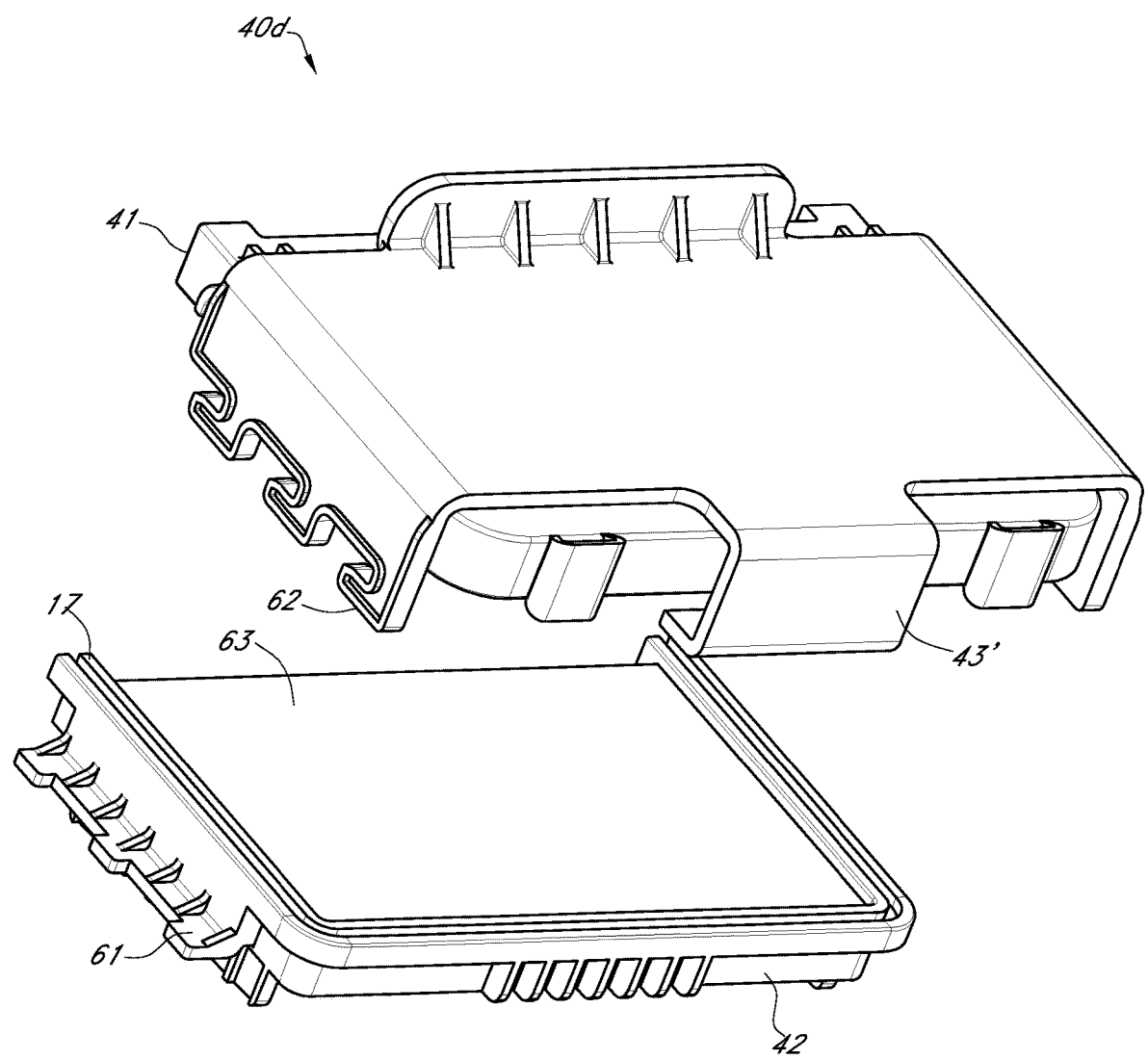
Figure 14C:
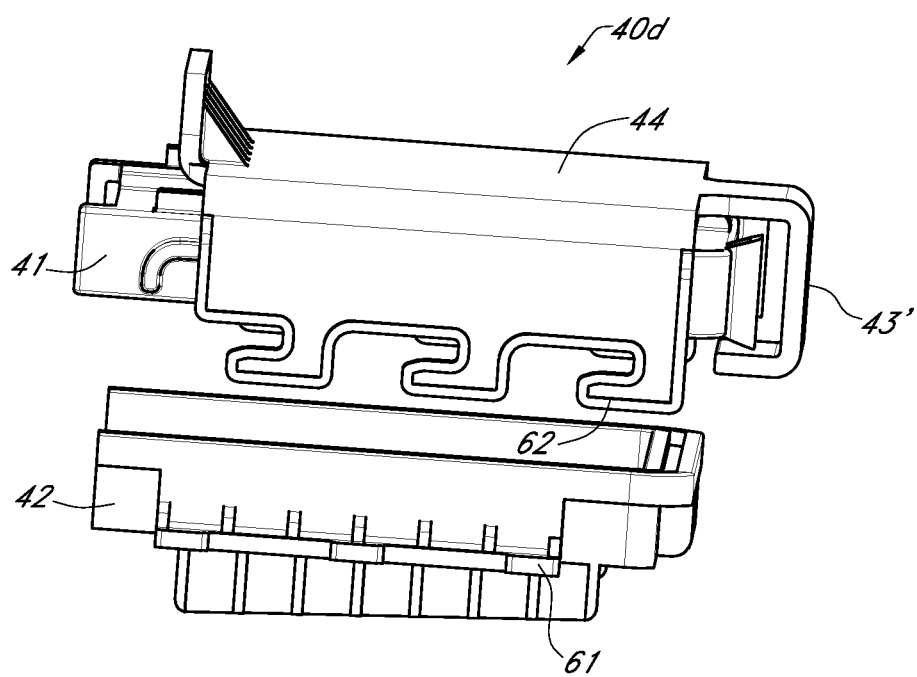
Figure 14D:
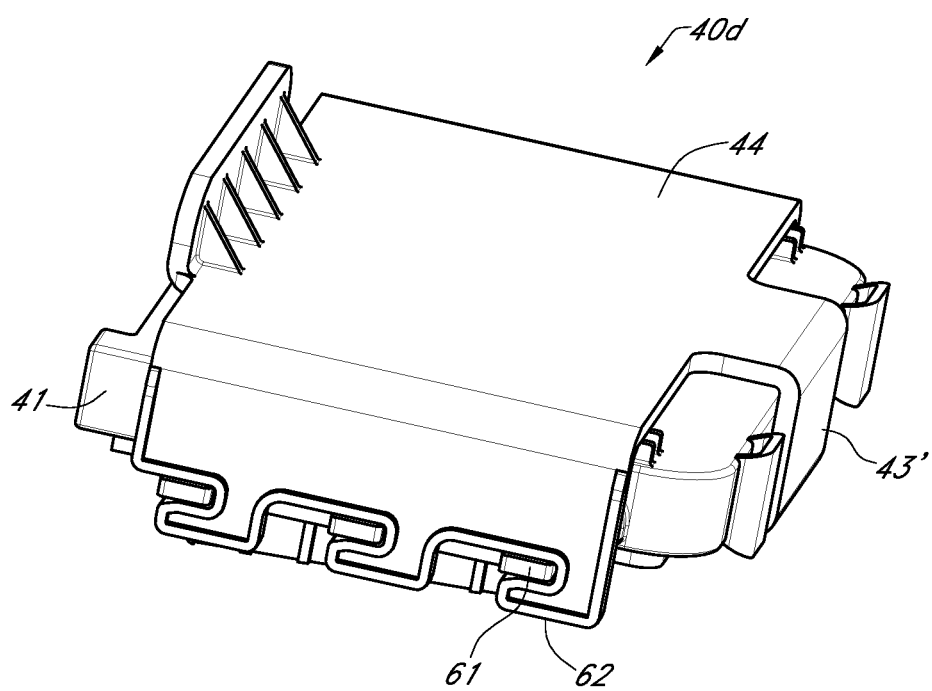
Figure 14E:
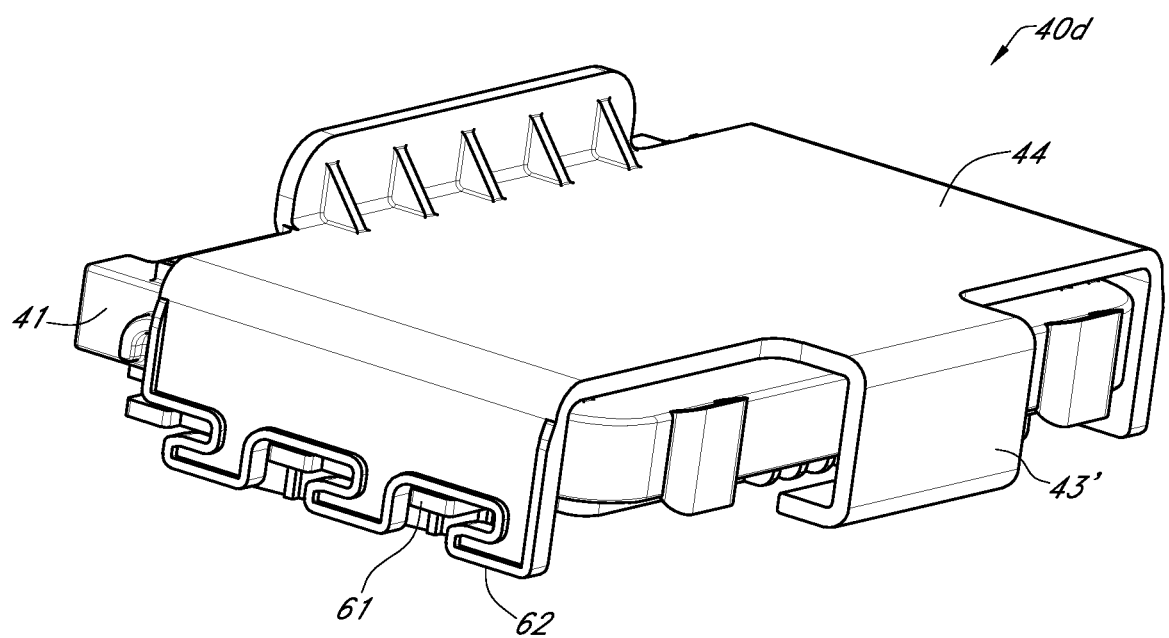

FIGS. 14A, 14B, 14C, 14D and 14E depicts an exemplary electrotransfer cassette 40*d* of the disclosure, having no hinges and having two separate plates 41 and 42 with a slider 44 on one of the plates for closing, locking and sealing. Joining mechanism 43' is comprised of two elements 43' one located on slider 44 and other located on second plate 42. Joining mechanism 43' is an extension of the mating locking features from slider 44 and second plate 42 located on their sides. Each plate 41 and 42 houses or comprises an electrode each (not depicted). Plate electrodes comprise electrical interfaces (not expressly shown) that can be directly or indirectly connected to a power supply. First plate 41 comprises or has a locking mechanism, depicted as slider 44, attached or connected thereto which is operable to close, lock and/or seal the two plates together. Slider 44 also functions as the sealing mechanism in this embodiment. First plate 41 also has mechanical features to guide sliding motion of slide 44 to enable a smooth closing/locking/sealing for a user. Additional, sealing mechanism components of electrotransfer cassette 40*d* include a gasket which can be placed on the inner side of one of the two plates 41 or 42, such that it is located between the two plates when the plates are closed. FIG. 14A depicts an open position with an exploded view of the transfer stack assembly 63. FIG. 14B depicts an open position with assembled stack 63 in plate 42 and depicting positioning of locking and sealing mechanism 44 on plate 41. FIG. 14C depicts a half-open position with details of the locking and sealing mechanism 44 which is attached to first plate 41 via mating features on the second plate. Mating and mounting features enable slider 44 to attach to first plate 41 permanently. As shown in FIG. 14D, the slide engages with one or more mating features on second plate 42. These features are located on both sides and on the bottom of both plates. FIG. 14D depicts a closed position with three mating features on each side or edge and a corresponding feature on the bottom of second plate 42 with which slider 44 engages to form a lock. A seal is then formed by sliding slider 44 upward motion. FIG. 14E depicts an unlocked position with additional details on the interlocking mechanisms, according to one embodiment.

Figure 15A:
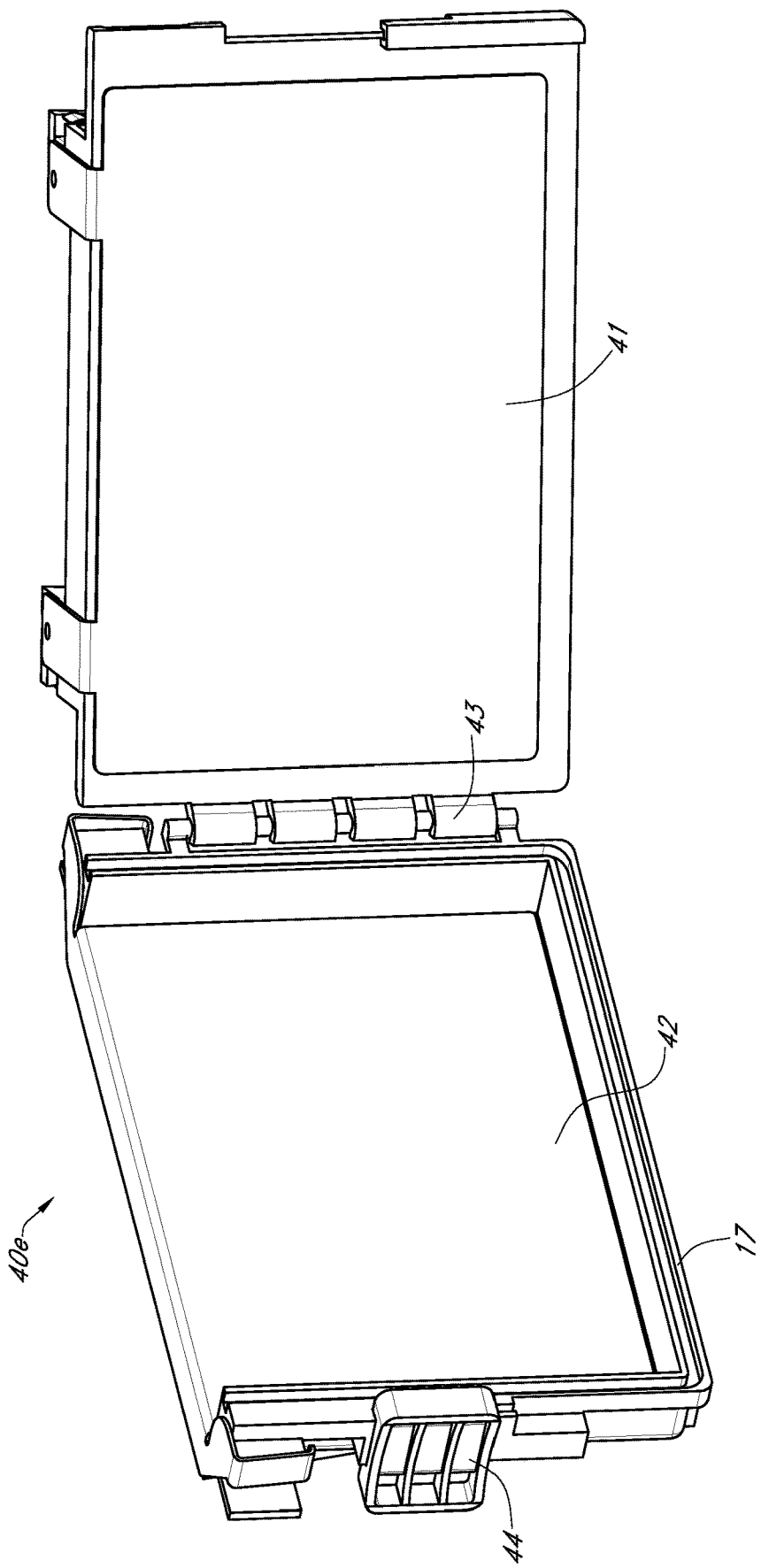
Figure 15B:
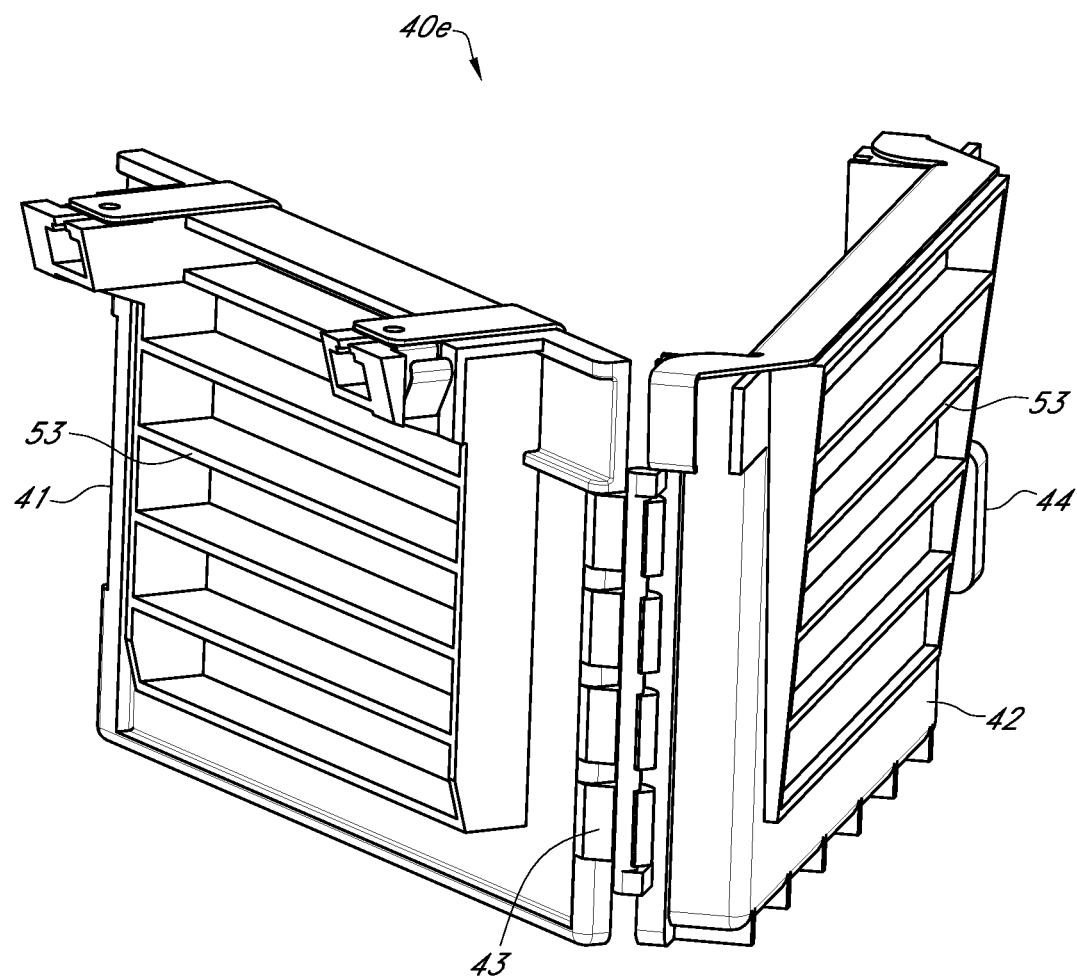

FIGS. 15A, 15B, 15C, and 15D depicts an exemplary electrotransfer cassette 40*e* of the disclosure, having hinges 43 as a joining mechanism and a slider 44 on the side of one of the plates for closing and locking. FIG. 15A depicts a front view of the inside of electrotransfer cassette 40*e* in an open position and depicts plates 41 and 42 connected by one or more hinges 43. Each plate 41 and 42 houses or comprises an electrode plate 46 and 47. Plate electrodes comprise electrical interfaces (not expressly shown) that can be connected to a power supply. Second plate 42 comprises or has a locking mechanism, depicted as slider 44, attached to the side of the second plate by snap features which allow the slider to clip onto the side the of second plate permanently. Slider 44 has mating mounting features which allow the clamp to clip into the second plate. Slider 44 is operable to close, lock and/or seal the two plates together. Slider 44 also functions as the sealing mechanism in this embodiment. First plate 41 also has mechanical features to guide sliding motion of slide 44 to enable a smooth closing/locking/sealing for a user. Additional, sealing mechanism components of electrotransfer cassette 40*e* comprise a gasket (not shown) which can be placed on the inner side of one of the two plates 41 or 42, such that it is located between the two plates when the plates are closed. FIG. 15B depicts a back view of the outside of electrotransfer cassette 40*e* in an open position depicting support structures 53 to provide mechanical support.

Figure 15C:
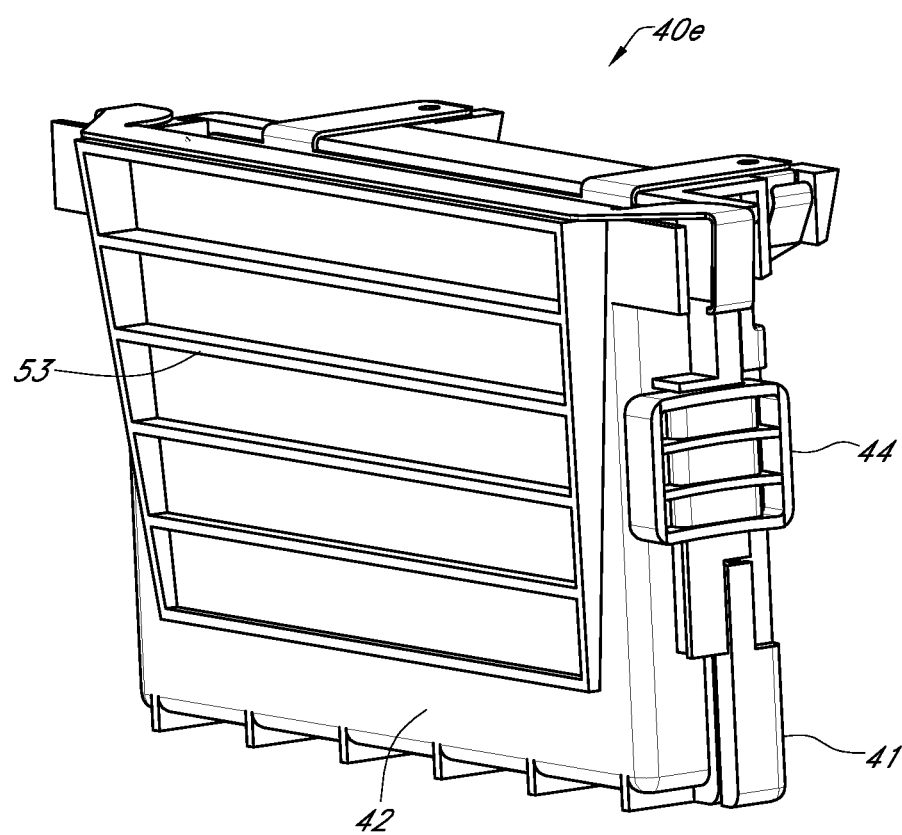
Figure 15D:
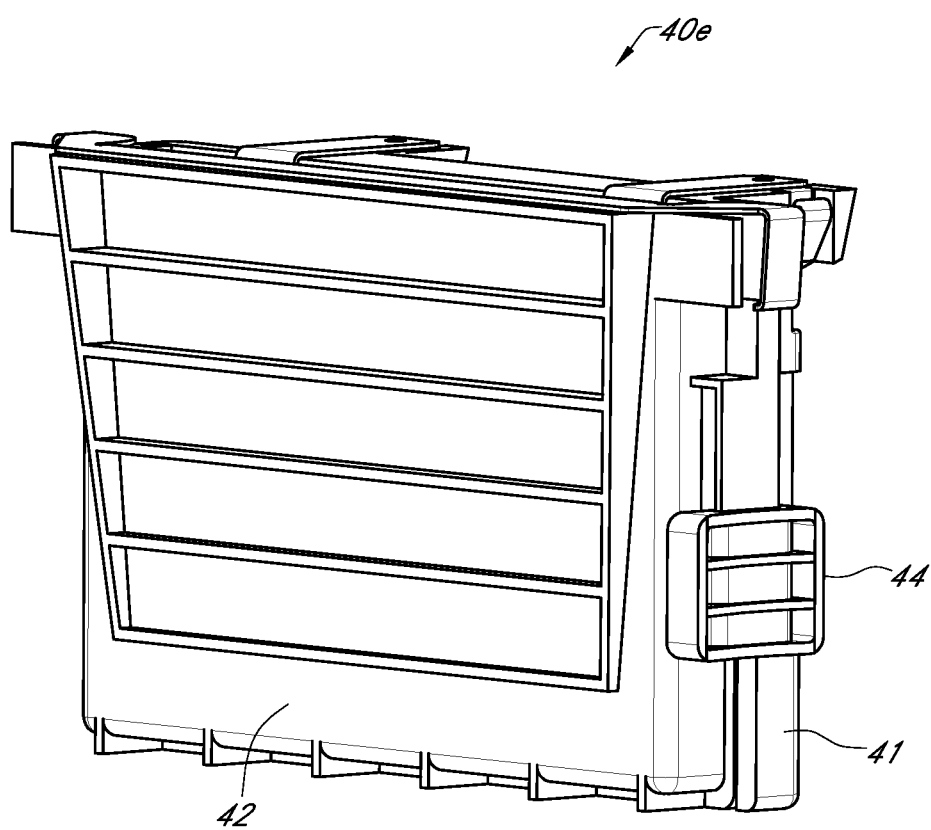

FIG. 15C depicts a closed but unlocked position with a slider that can be slide down to lock the cassette When slider 44 is slid downward a feature on the clamp engages with a feature designed into the first plate to lock and seal the two plates to form a liquid tight seal. FIG. 15D depicts the locked and sealed position of electrotransfer cassette 40*e* with slider 44 slide down, according to one embodiment.

Figure 16:
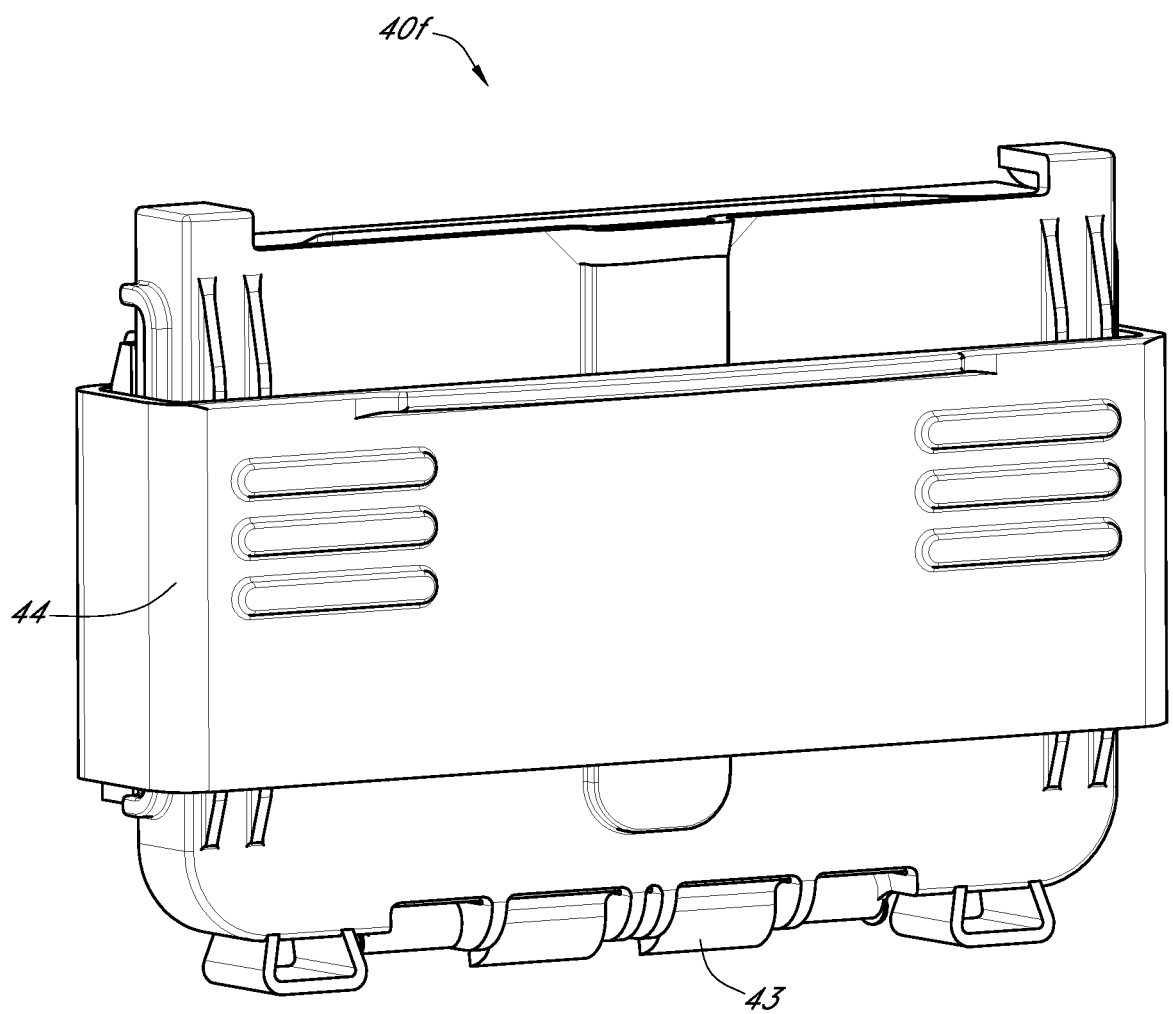
FIG. 16 depicts an exemplary electrotransfer cassette of the disclosure, having at least one hinge and at least one slider on one of the plates for closing and locking wherein the slider slides downward to form the lock and seal and upward to unlock and open, according to one embodiment.

FIG. 16 depicts an exemplary electrotransfer cassette 40*f* of the disclosure, in a closed and locked position, having at least one hinge 43 as the joining mechanism and at least one slider 44 on one of the plates for closing and locking wherein the slider slides downward to form the lock and seal and upward to unlock and open, according to one embodiment. Other components of the sealing mechanism can comprise a gasket located on the inside surface of at least one of the plates.

Figure 17A:
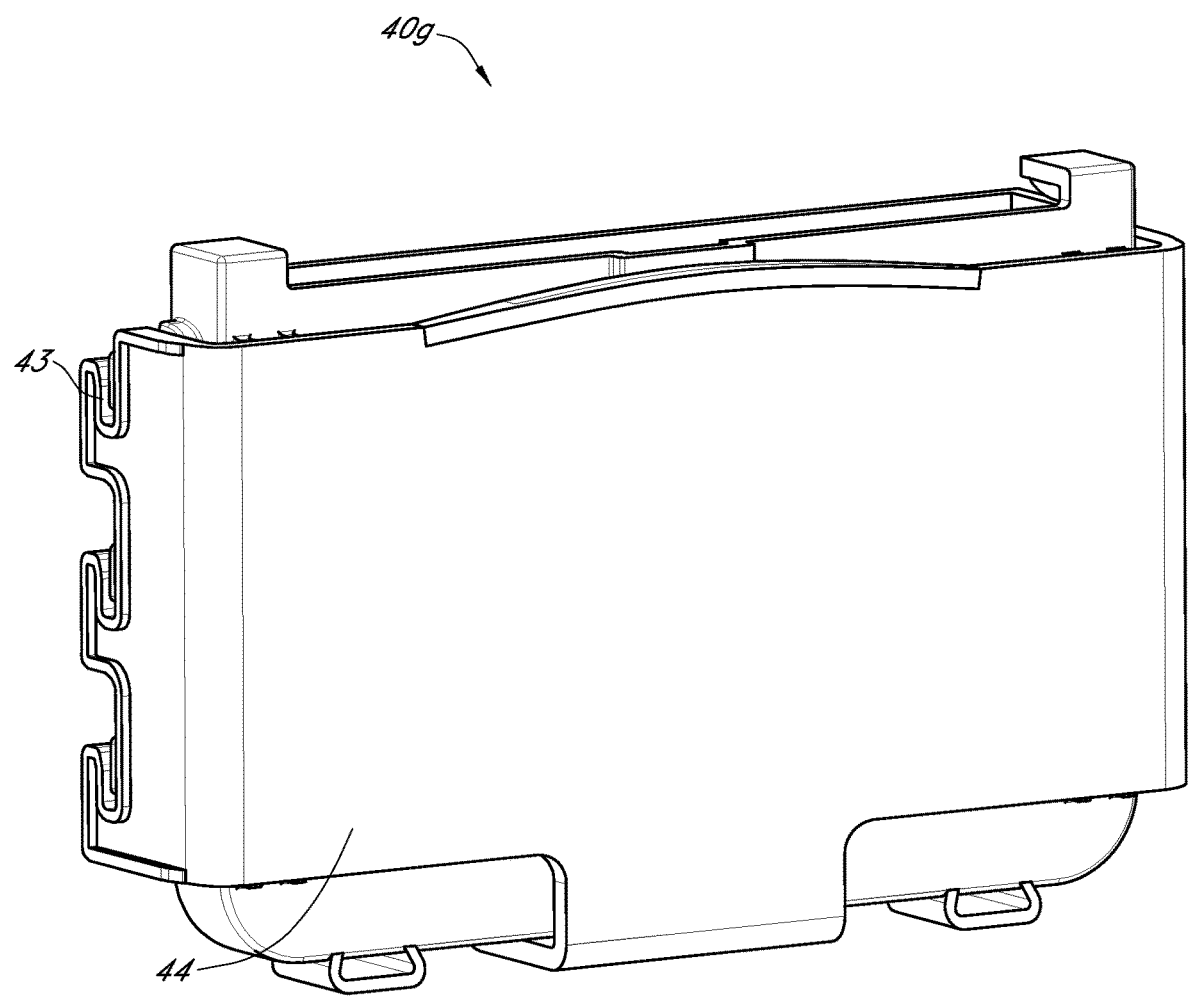
FIGS. 17A and 17B, depict two different exemplary electrotransfer cassettes according to the disclosure, having two unconnected separate plates locked together with a slider, each having different number of contact points for the locking interface of the slider, according to one embodiment.
Figure 17B:
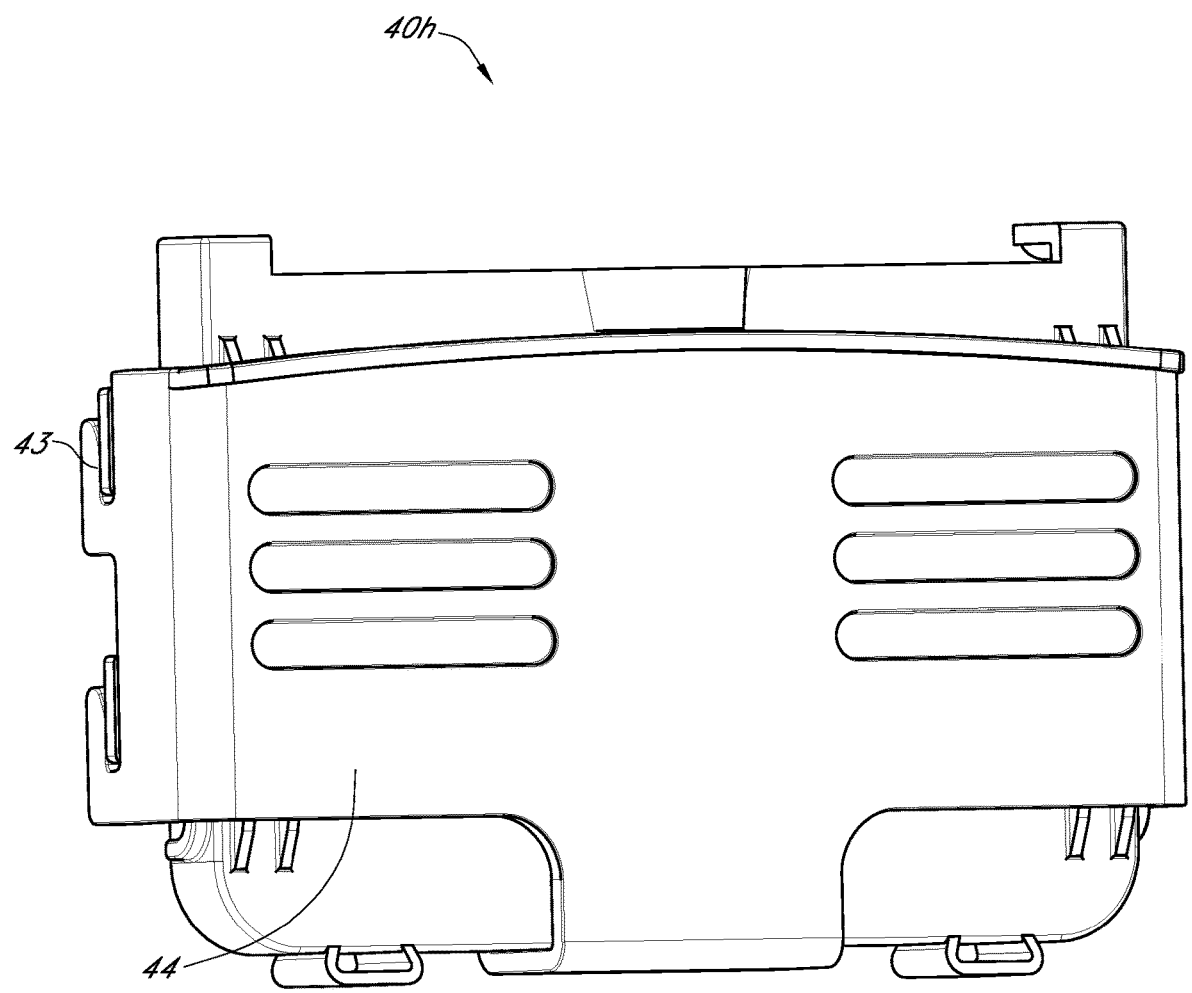

FIGS. 17A and 17B, depict two different exemplary electrotransfer cassettes 40*g* and 40*h* respectively, according to the disclosure, having two unconnected separate plates that can move between open and closed positions by joining features comprising one or more disconnected hinges that can be locked and sealed together with a slider 44, each having different number of contact points for the locking interface of the slider. Slider 44 comprises the sealing and the locking mechanism. Other components of the sealing mechanism can comprise a gasket located on the inside surface of at least one of the plates.

Slider 44 forms the liquid tight seal by engaging with one or more mating features that are designed on the opposite plate. Mating features are located on both sides and the bottom of the plates. In some embodiments, liquid tight seal is formed by pressure between gasket and plate created as the slider is moved to the locked position. FIG. 17A has three joining features on each side of the plates on which slider 44 engages with on the opposite plate and one feature to engage with on the bottom to lock and seal the electrotransfer cassette. FIG. 17B shows features on each side/edge that slider 44 engages with on opposite plates and one feature to engage with on the bottom.

Figure 18:
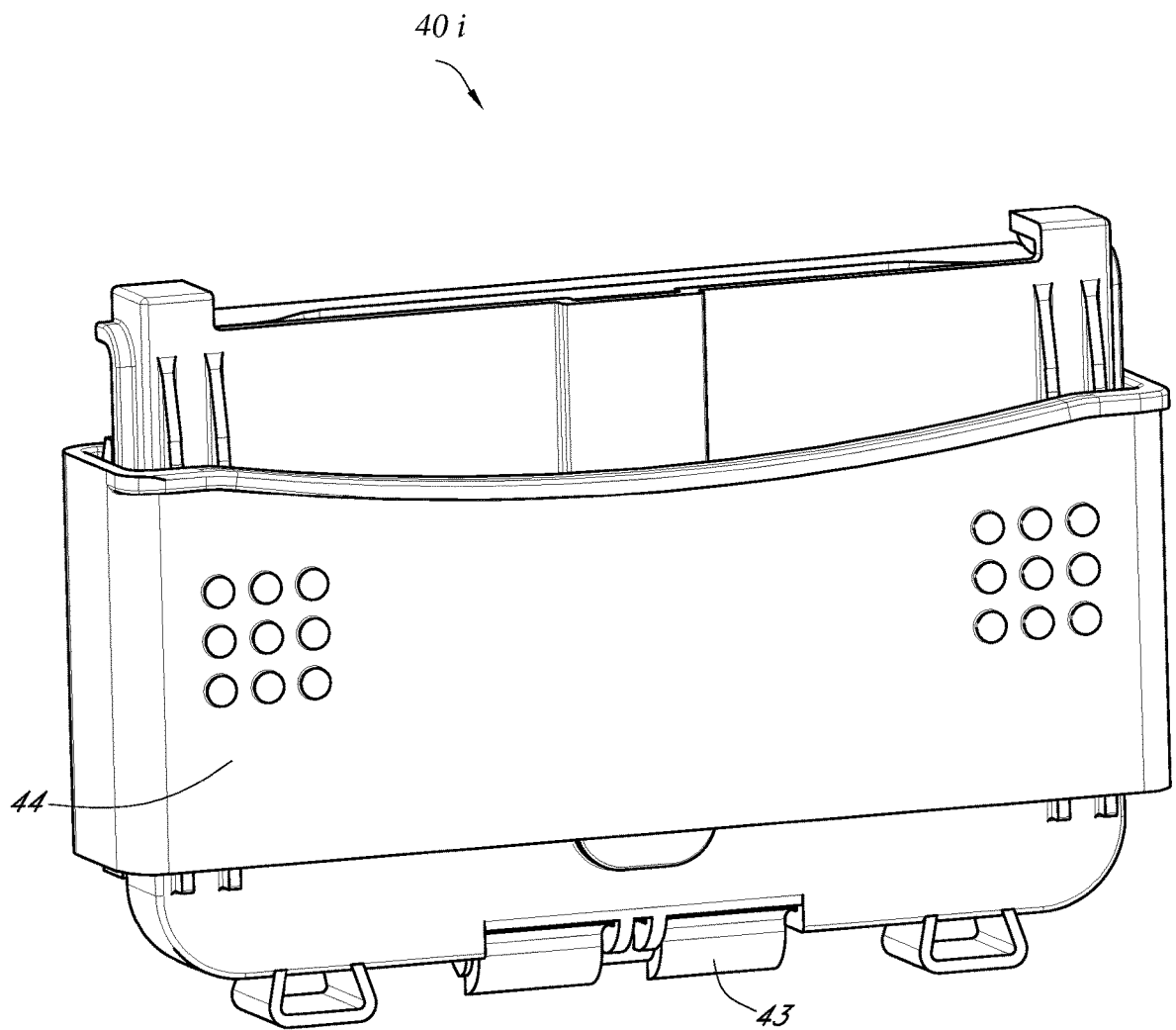
FIG. 18 depicts an exemplary electrotransfer cassette of the disclosure, having two separate plates with a joining mechanism at the bottom of the plates, such as a hook or a disconnectable hinge, and a slider for closing and locking, where the slider slides down to lock the cassette and upward to unlock, according to one embodiment.

FIG. 18 depicts an exemplary electrotransfer cassette 40*i* of the disclosure, having two separate plates 41 and 42 with a joining mechanism 43 at the bottom of the plates, such as a hook or a disconnectable hinge, and a slider 44 for closing and locking, where the slider slides down to lock the cassette and upward to unlock. Slider 44 comprises the sealing and the locking mechanism. Other components of the sealing mechanism can comprise a gasket located on the inside surface of at least one of the plates.

Figure 19A:
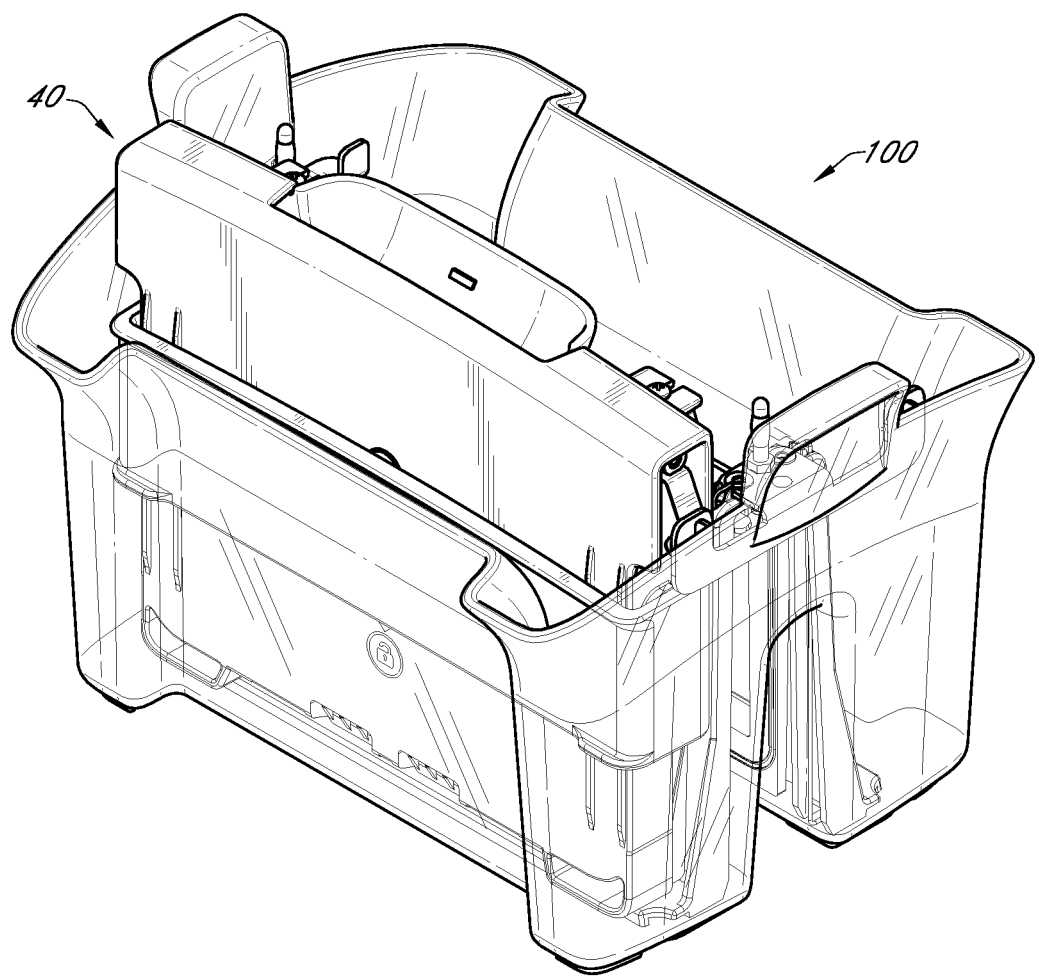
FIG. 19A depicts a front perspective view of the exemplary electrotransfer system of the disclosure, showing an exemplary electrotransfer cassette of FIG. 10H, inserted into one chamber of the system, according to one embodiment.
Figure 19B:
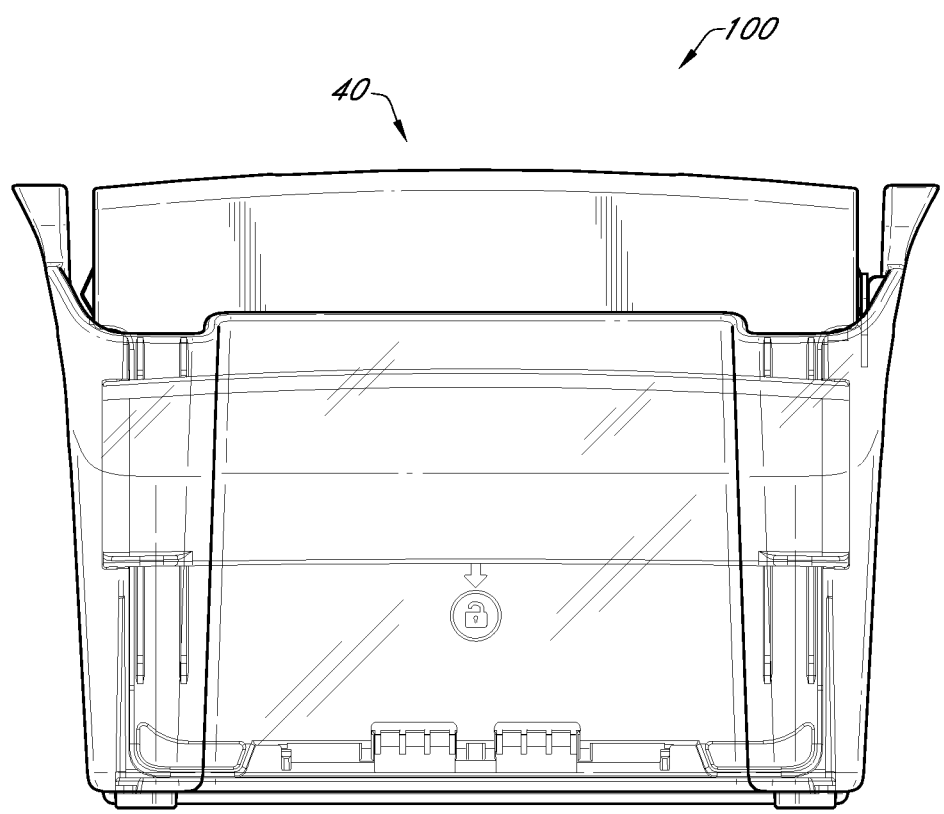
FIG. 19B depicts a front view of the exemplary electrotransfer system of FIG. 16A, according to one embodiment.
Figure 19C:
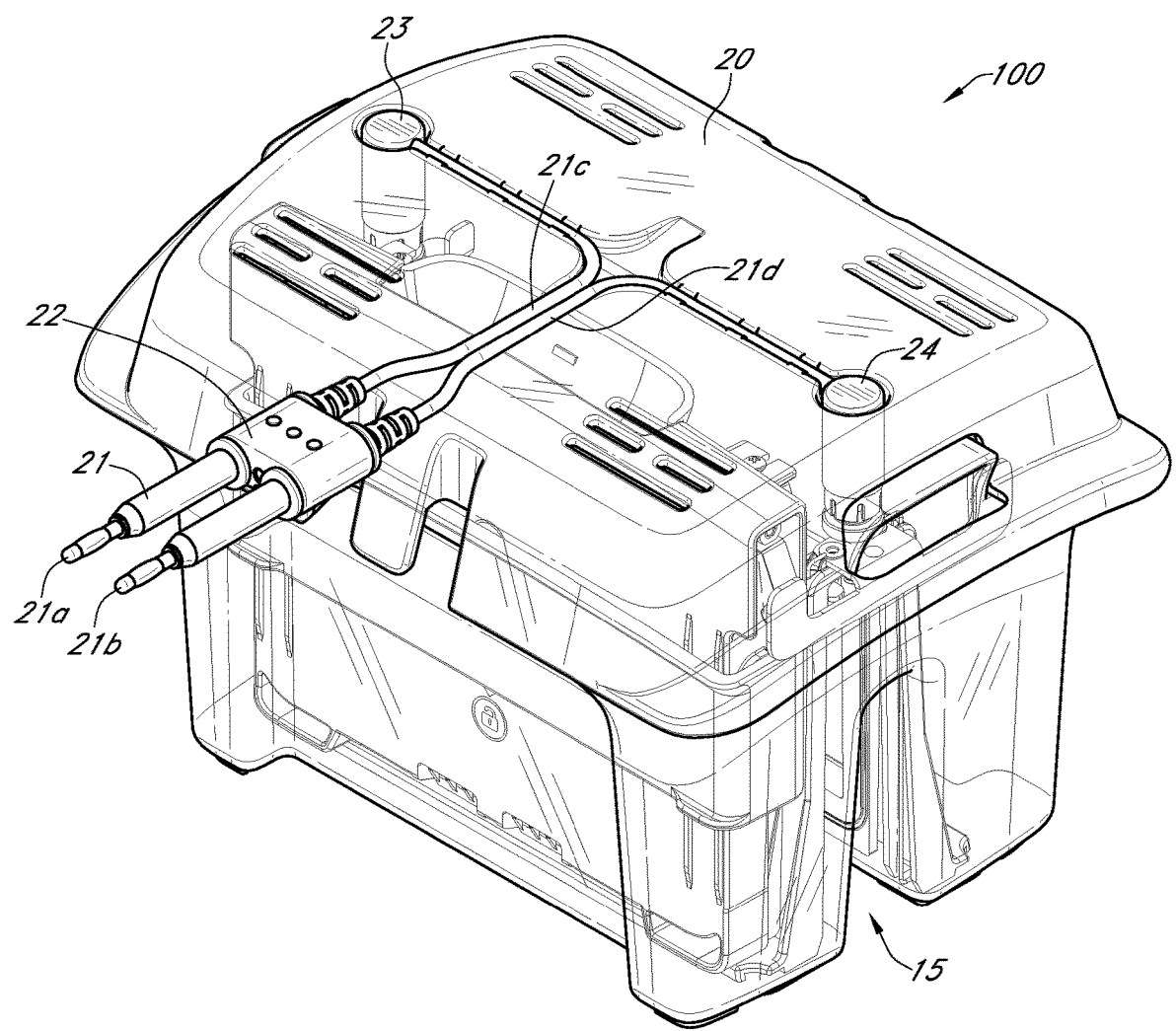
FIG. 19C depicts a front perspective view of the exemplary electrotransfer system of FIG. 16A, with a lid placed on top, according to one embodiment.

6) Systems for Electrotransfer:

As shown in FIGS. 19A-19C, an electrotransfer cassette 40 of the present disclosure is configured to be placed in a system 100 of the disclosure that can perform both electrophoresis and/or electrotransfer. In some embodiments, electrotransfer cassettes such as 40 and 40a-40i, as shown and described in FIGS. 10A-18, are configured to be placed in either system 100 or any other system that can perform electrotransfer. Like parts have similar numbering as shown in previous drawings and are not repeated.

In some embodiments, an electrotransfer cassette of the present disclosure is configured to be placed in a system of the disclosure that can perform both electrophoresis and/or electrotransfer or in any electrotransfer system after it is sealed.

In some embodiments, in use, a liquid reservoir of a closed and sealed electrotransfer cassette of the present disclosure, is filled with a buffer and placed in a chamber of a system of the disclosure that can perform both electrophoresis and/or electrotransfer and the lid of the system is placed on the chamber and connected to a power source to complete the electrical circuit of the electrotransfer cassette system.

FIG. 19A depicts a front perspective view of the exemplary electrotransfer system 100 of the disclosure, showing an exemplary electrotransfer cassette of FIG. 10H, inserted into one chamber of the system, according to one embodiment. FIG. 19B depicts a front view of the exemplary electrotransfer system of FIG. 19A, according to one embodiment. FIG. 19C depicts a front perspective view of the exemplary electrotransfer system of FIG. 19A, with a lid placed on top, according to one embodiment.

System 100 for performing electrotransfer as depicted in FIG. 19C with a lid 20. As shown in FIGS. 19A and 19B, system 100, comprises at least two chambers 10a and 10b, a single first electrode 12 spanning the two chambers, connected to a first electrical node 12d located on a top side of the chambers, a second electrode, 13a and 13b, located in each chamber, the two second electrodes connected at a common second electrical node 13d located on the top side of the chambers, each chamber configured to independently receive an electrotransfer cassette 40. Although the embodiments depicted in FIGS. 19A-19C show electrotransfer cassette 40, other electrotransfer cassettes of the present disclosure such as 40a-40i can also be inserted into chambers 10a and 10b to arrive at system 100 for electrotransfer. Similarly, although the specification describes in additional detail electrotransfer cassette 40 as an example embodiment to describe electrotransfer systems this is not to be construed as limiting the scope of the present application. Electrotransfer cassettes 40a-40i are also described having similar components and the differences are detailed in sections above.

Electrotransfer cassette 40 comprises two plates 41 and 42 joined by at least one hinge 43 configured to allow the two plates to move from an open position and a closed position, a slider 44 operable to lock the two plates in the closed position and to seal the two plates in the closed position to form a liquid-proof seal on three sides 48, 49 and 50, wherein second plate 42 is configured to receive components of a transfer stack on its interior side 42a, and wherein external side 42b of the second plate and external side 41b of first plate 41 comprise at least one electrical connection 45 (such as 45a, 45b, 45c and 45d) each, that is connected to an electrode 46 or 47 located on the inside of each plate, the electrical connections 45 on the first plate 41 and second plate 42 in electrical contact with the first electrode 12a and/or 12b and second electrodes 13c' and/or 13c" of chambers 10a and 10b, and a removable lid 20 that covers the base 120. Lid 20 provides electrical connectivity to a power source, lid 20 having electrical connectors such as 23a and 24a that electrically connect with the electrical connections/interfaces 45 of electrotransfer cassette 40 to complete the circuit when the electrotransfer cassette 40 is placed in base 120 and the lid 20 covers the base. In one embodiment, a system for electrotransfer 100 of the disclosure comprises one electrotransfer cassette. In one embodiment, a system for electrotransfer of the disclosure comprises comprising two electrotransfer cassettes.

In non-limiting examples, electrotransfer cassettes that can be used can include cassettes that can be used to simultaneously transfer biomolecules from one or more mini-gel cassettes, one or more midi-gel cassettes, one or more large gel cassettes to one or more electro transfer membranes.

Figure 20:
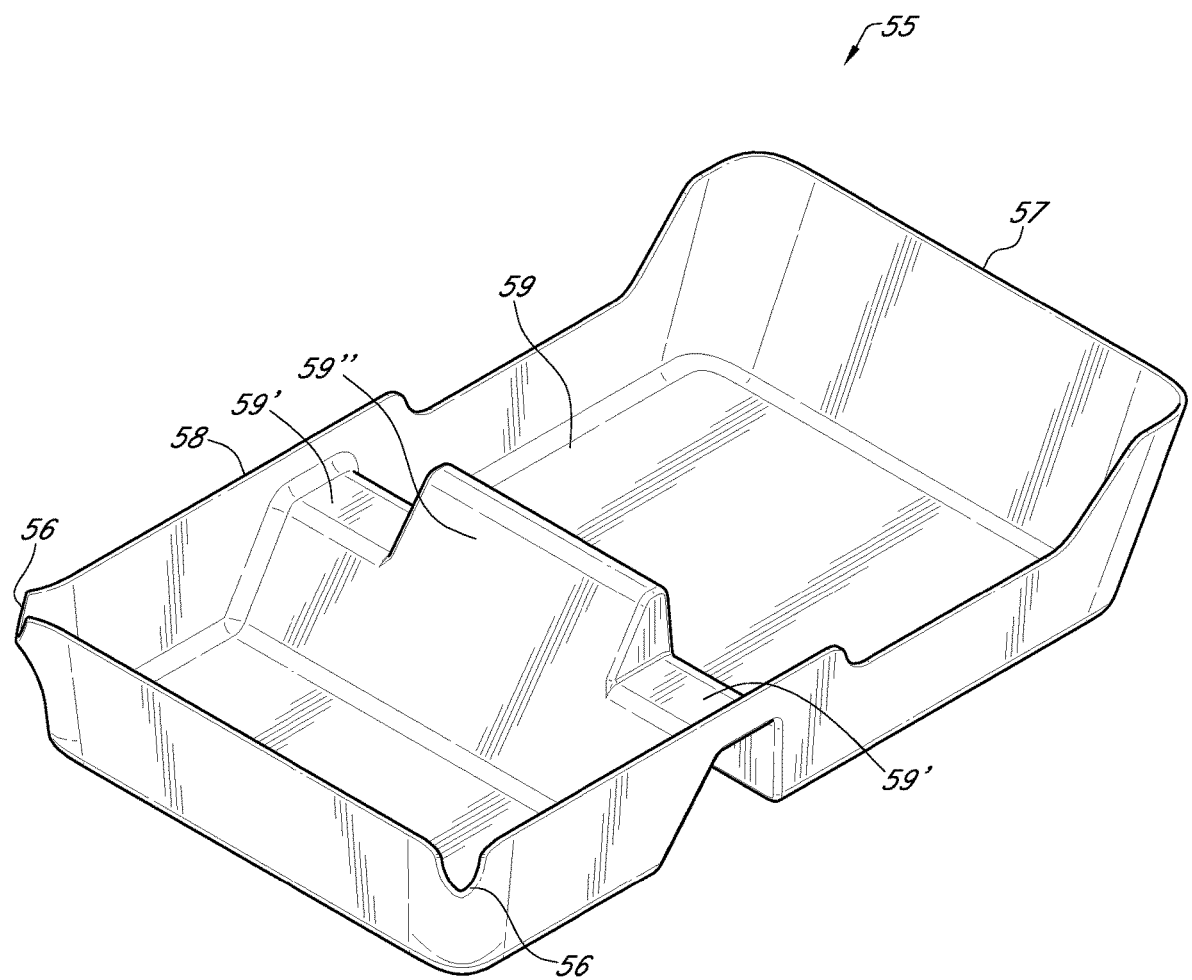
FIG. 20 depicts a front perspective view of the exemplary tray used to assemble an electrotransfer stack and cassette, according to one embodiment.
Figure 22A:
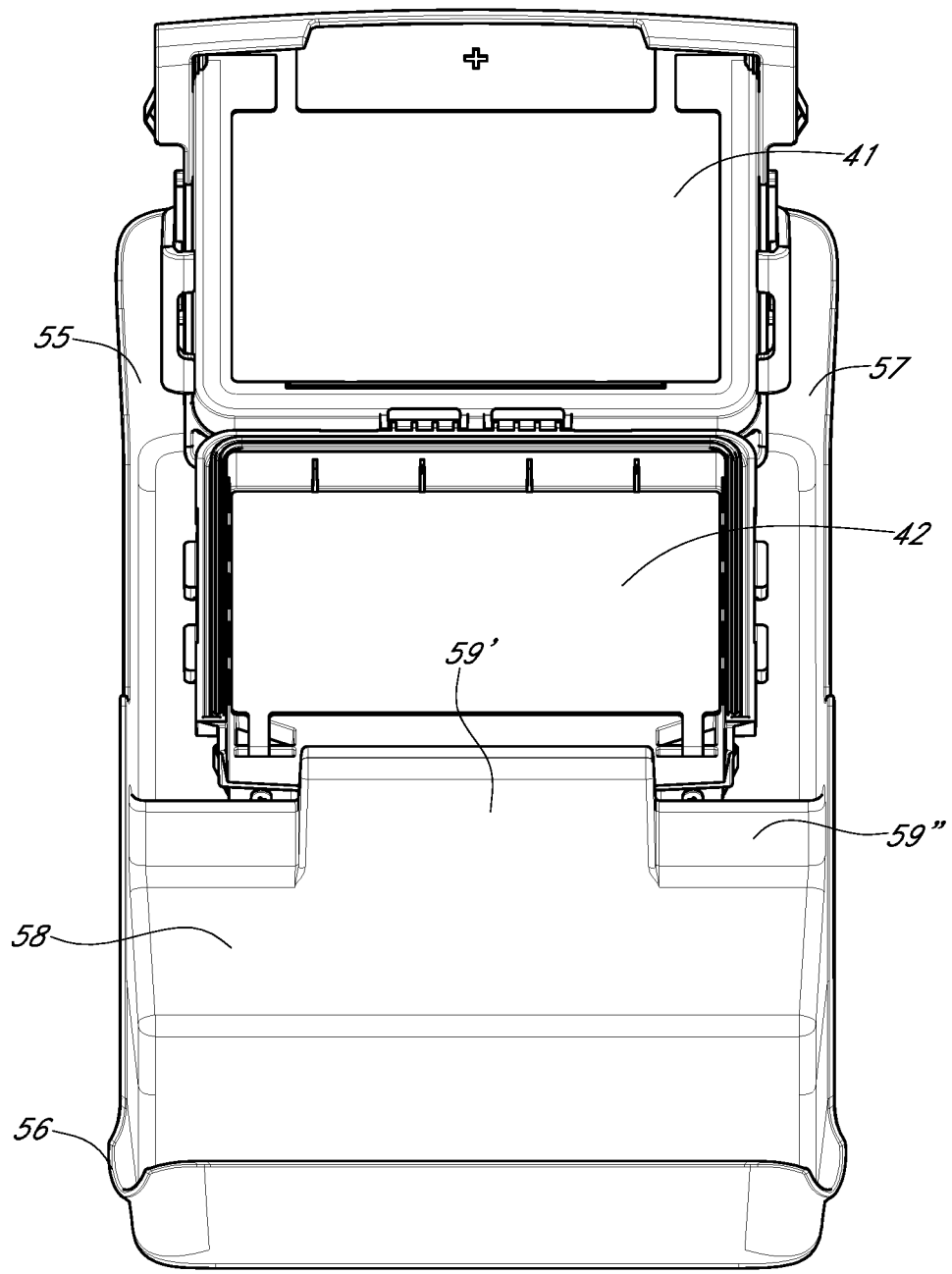
Figure 22B:
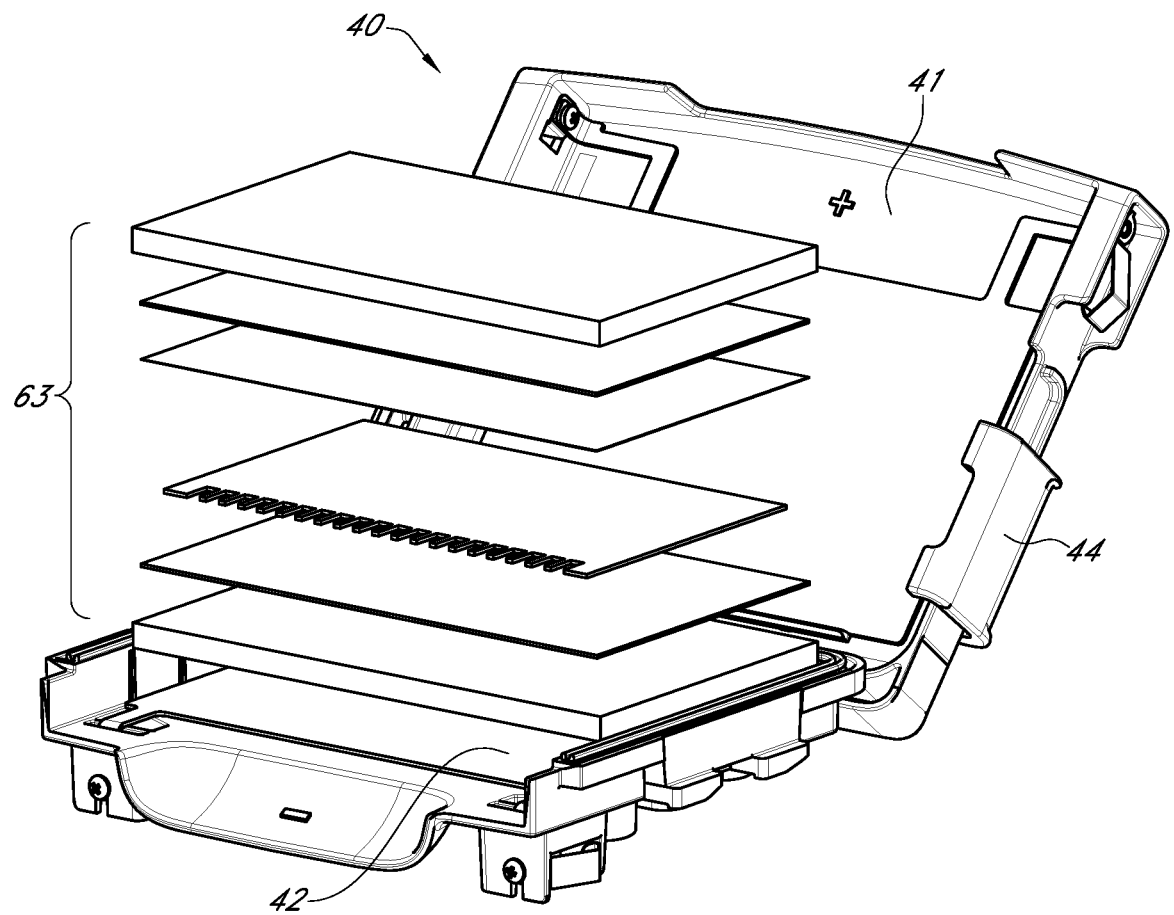

7) Tray for Electrotransfer:

FIG. 20 depicts a front perspective view of the exemplary tray 55 used to assemble an electrotransfer stack 63 in an electrotransfer cassette (40, or 40a-40i), according to one embodiment. Tray 55 comprises two compartments 57 and 58, a partition 59 and spouts 56, wherein the larger compartment 57 is used to assemble a transfer stack 63 in a electrotransfer cassette (40 or 40a-40i). FIG. 22A depicts an exemplary tray 55 being used with an open electrotransfer cassette 40, according to one embodiment. In use, an open electrotransfer cassette of the disclosure (such as 40, 40a-h), is placed in tray 55. An open electrotransfer cassette, such as in FIG. 22B is placed such that partition 59 separates sections of the tray 55. The back wall of tray 55 is tapered so an electrotransfer cassette sits open while a user is assembling the transfer stack. Compartment 58, shown as front compartment in FIG. 20, is used for wetting transfer stack materials and components and, compartment 57, shown as the rear compartment in FIG. 20 is used for assembling the transfer stack inside a second plate 42 of an open electrotransfer cassette 40. The larger rear compartment 57 is where the electrotransfer cassette 40 is placed in its open configuration with the second plate 42 (cathode side) is placed in bottom of compartment 57 (on flat surface of 57) and the first plate 41 (anode side) is placed on the angled surface of compartment 57. When a user assembles/builds a transfer stack 63 into the second plate 42 of electrotransfer cassette 40, while in the tray, any buffer that spills out of the electrotransfer cassette is captured by the tray to prevent buffer spillage in the lab.

Partition 59 has a taller surface 59", flanked by ledges 59'. Taller surface 59" can have a printed image of the transfer stack configuration to guide a user to assemble a transfer stack into an electrotransfer cassette correctly. The surface is angled such that the printed image (not shown here) is not blocked by the transfer stack while a user is assembling it. Ledges 59' allow any liquid in the rear compartment 57 to flow into the front compartment 58 for disposal after the transfer stack is assembled and the electrotransfer cassette 40 is closed and locked. Tray 55 has two pour spots 56 in the front corner to allow for safe disposal of buffers used. Pour spouts 56 are configured for ease, ergonomic and safely pouring hazardous waste into waste containers. Since transfer buffer contains the hazardous chemical methanol that has to be disposed of in a hazardous waste containers and not down the sink the pour spouts 56 are especially useful.

II. Methods:

Embodiments of the disclosure relate to methods of performing gel electrophoresis that comprise at least one of obtaining a gel electrophoresis system, obtaining at least one sample comprising biomolecules that are to be electrophoresed, and performing electrophoresis. Embodiments of the disclosure relate to methods of performing electrotransfer of biomolecules using the devices and systems described herein. Non limiting examples of biomolecules that can be electrophoresed or transferred include, but are not limited to, nucleic acids, DNA, RNA, polypeptides and proteins.

1) Methods of Electrophoresis

Figure 21:
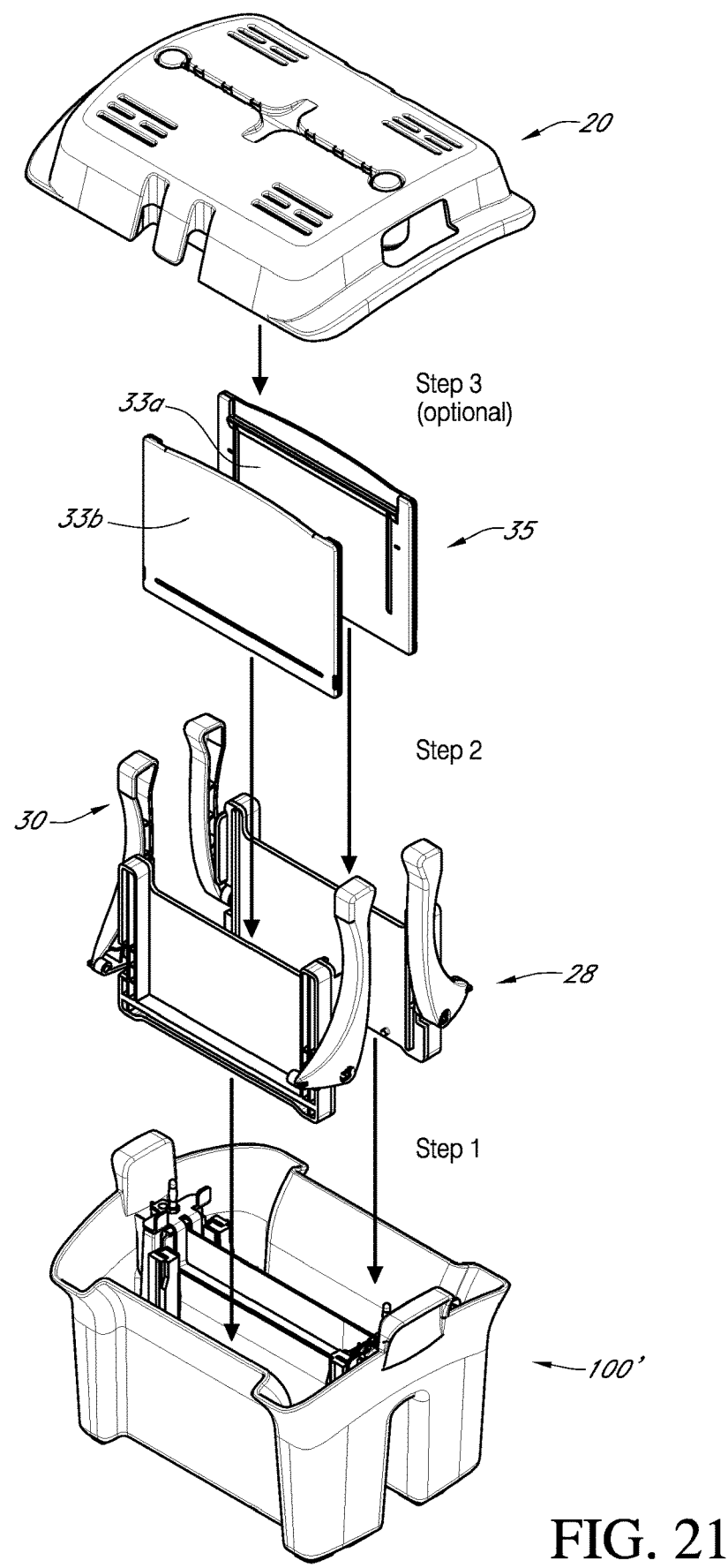
FIG. 21 pictorially depicts an example method of electrophoresis, according to one embodiment.

FIG. 21 depicts example method steps of assembling an electrophoresis system 100, 100' or 110' for electrophoresis wherein system 100' of the disclosure first receives clamp 28. This is followed by inserting an electrotransfer cassette 35 in between the clamp and the inner chamber wall of the system and clamping the cam handles 30 of clamp 28 to the locked position by moving cam handles 30 to the locked position. Alternatively, system 100 can first receive electrophoresis cassette 35 and then the clamp 28.

While FIG. 21 depicts receipt of electrotransfer cassettes 35 and clamps 28 in both chambers, as is apparent from the description in sections above, only one chamber can be assembled with one electrophoresis cassette and one clamp.

FIG. 21 depicts cam handles 30 in locked position. During insertion of clamp 28 into system 100, cam arms 30 will be in an unlocked position and will be moved into a locked position after the insertion of cassette 35.

In systems where lid 20 is part of system 100, lid 20 can be place on top prior to connecting electrical interfaces on system 100' via the lid electrical connector to a power supply. Alternatively, system 100' electrical interfaces 12d and 13d can be directly or indirectly connect to a power supply. Clamps, cam handles, electrodes and nodes/interfaces are as shown and described in other parts of this specification.

In some embodiments, a method of performing gel electrophoresis comprises: obtaining an electrophoresis cassette 35 with a gel; removing a gel comb from the electrophoresis cassette; optionally rinsing the wells with water or running buffer; placing the electrophoresis cassette into at least one chamber 10a or 10b of a system 100' or 100 of the present disclosure; placing a clamp 28 of the disclosure into the chamber and clamping the gel cassette onto a portion of a surface of the chamber; pouring an electrophoresis buffer into the first buffer reservoir formed by the clamping; pouring an electrophoresis buffer into the second buffer reservoir formed by the clamping; loading samples and optionally loading controls into the wells of the gel; connecting the electrical nodes/interfaces/connection 12d and 13d of the system (that are electrically connected to the electrodes of the chambers) to a power source; selecting the voltage and time of the power supply; performing electrophoresis on the samples and controls.

In some embodiments of the method, the gel cassette is placed adjacent to a gasket 17 on a wall of the at least one chamber.

In some embodiments, the clamping step comprises moving cam handles 30 of a clamp of the disclosure toward the gel cassette 35 to lock them in place.

In some embodiments, a first buffer reservoir and a second buffer reservoir contain the same buffer. In some embodiments, a first buffer reservoir and a second buffer reservoir contain different buffers. Buffer choice may be guided by the composition of gel matrix and gel buffers.

In some embodiments, wherein a system of the disclosure has a lid 20. In these embodiments, the step of connecting the electrical nodes/interfaces/connection 12d and 13d in the system 100 to a power source comprises the steps of: placing a lid 20 onto the chambers, after clamp arms 30a and 30b are locked, such that the lid electrical connections 23a and 24a are connected in the correct polarity to the system electrode interfaces/nodes/connections 12d and 13d; and connecting the plug 21 in the lid to a power source.

In some embodiments, a method of performing gel electrophoresis of the disclosure comprises: obtaining an electrophoresis cassette having a gel; removing a gel comb from the electrophoresis cassette; removing a strip of tape from the electrophoresis cassette; optionally rinsing the wells with water or running buffer; placing the electrophoresis cassette into at least one chamber of a system for electrophoresis of the disclosure, with the well openings of the cassette oriented toward the cathode electrode; placing a clamp of the disclosure into the chamber and clamping the gel cassette onto a portion of a surface of the chamber forming two independent reservoirs, a cathode reservoir and an anode reservoir; pouring a buffer into the first buffer reservoir, the cathode reservoir; (the buffer of the cathode reservoir may optionally have an antioxidant added to it); pouring a buffer into the second buffer reservoir, the anode reservoir; loading samples and controls into the wells of the gel cassette; placing the lid of the system onto the chambers; connecting the electrical connection on the lid to a power source; selecting the voltage and time of the power supply; performing electrophoresis on the samples and controls.

2) Methods of Electrotransfer

The present disclosure also provides electrotransfer cassettes (40, 40a-40i) and electrotransfer systems 100 and 100'. In some embodiments, a gel used for electrotransfer of biomolecules from the gel onto a transfer membrane, is a gel run in any electrophoresis system. In other embodiments, a gel used for an electrotransfer method of the disclosure can be a gel run in an electrophoresis system 100, 100' or 110 as described above.

In some embodiments, a gel on which electrophoresis has been performed to resolve biomolecules is first removed from an electrophoresis cassette. This can comprise prying or breaking an electrophoresis cassette open with a gel knife and removing the gel prior to assembling a transfer stack. A transfer stack typically comprises a sponge and one or more layers of filter paper soaked in electrotransfer buffer (or any porous material such as a gel/matrix soaked in an electrotransfer buffer), followed by a gel onto which biomolecules that are resolved by electrophoresis is placed onto, followed by a transfer membrane (typically nitrocellulose, PVDF, nylon membrane, or any porous material), another stack of one or more layers of filter paper and another sponge soaked in electrotransfer buffer (see FIG. 22B). This stack can be assembled onto one plate of an electrotransfer cassette. Typically, the plate in the electrotransfer cassette having the cathode is the plate in which the stack is assembled. In some embodiments of this disclosure, a tray of the disclosure is designed to place an electrotransfer cassette in the open position and assemble the transfer stack (see FIG. 22A for tray and placement of electrotransfer cassette in tray). Trays of the disclosure are designed to contain the excess buffer and avoid spillage and messes on lab benches and tables.

FIGS. 22A-22F depicts methods steps of electrotransfer using devices and systems of the disclosure. In one embodiment, a method of performing electrotransfer of biomolecules comprising: obtaining a gel onto which biomolecules have been separated by electrophoresis; assembling a transfer stack onto a second plate of an electrotransfer cassette of the disclosure comprising placing a blotting material on top of the gel and further placing filter papers and sponges above and below the blotting material and gel (FIG. 22B); closing the first plate of the electrotransfer cassette on to the second plate (FIG. 22C); locking and sealing the electrotransfer cassette on at least three or more sides by a locking and sealing mechanism on the electrotransfer cassette (FIG. 22D or FIG. 10H); placing the electrotransfer cassette into at least one chamber of a system of the disclosure that can perform electrotransfer and electrophoresis (FIGS. 22D and 22E); connecting the electrical connection/nodes/interfaces on the system to a power source (not depicted); selecting a transfer voltage and a run-time on the power supply; performing electrotransfer of biomolecules from the gel onto the blotting material.

Figure 22C:
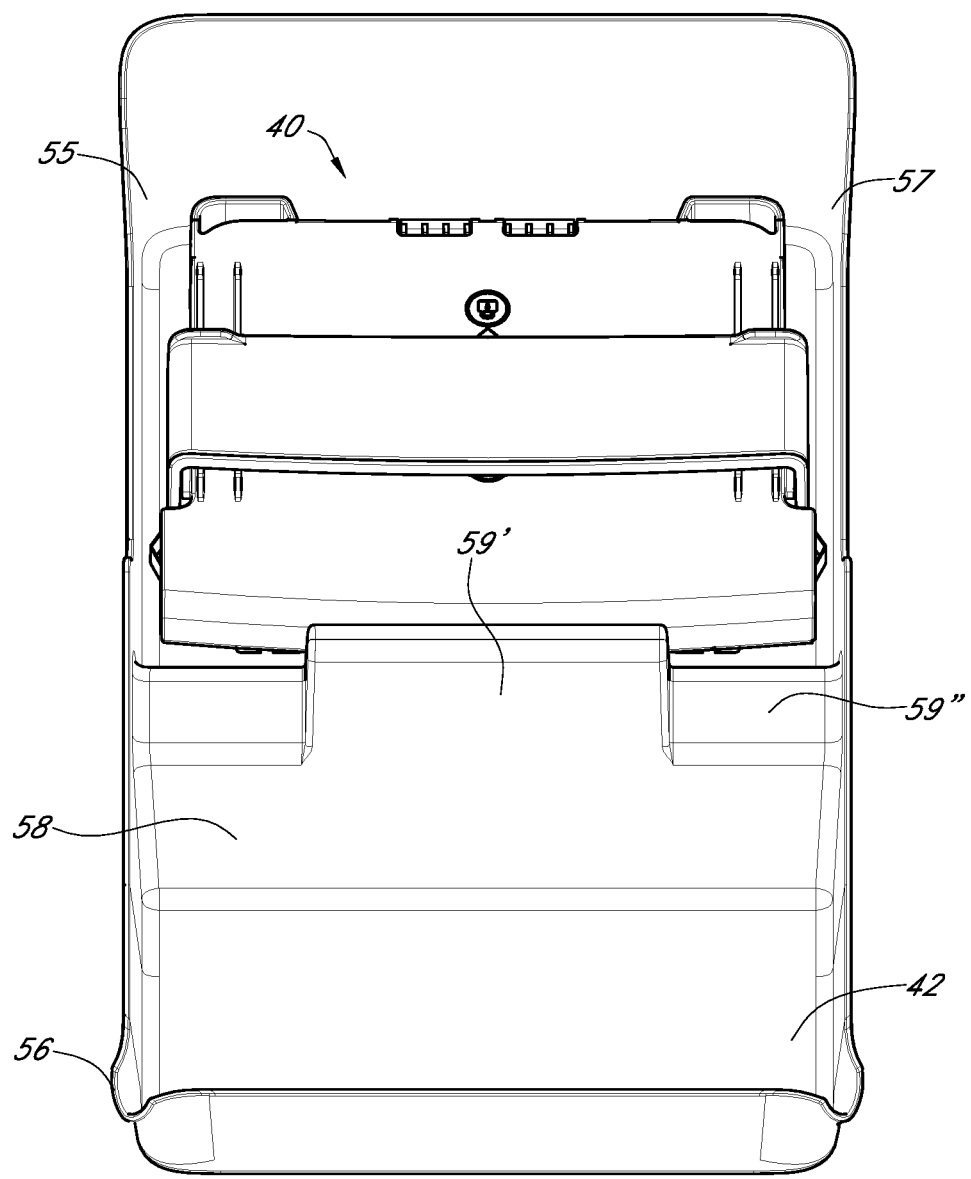
Figure 22D:
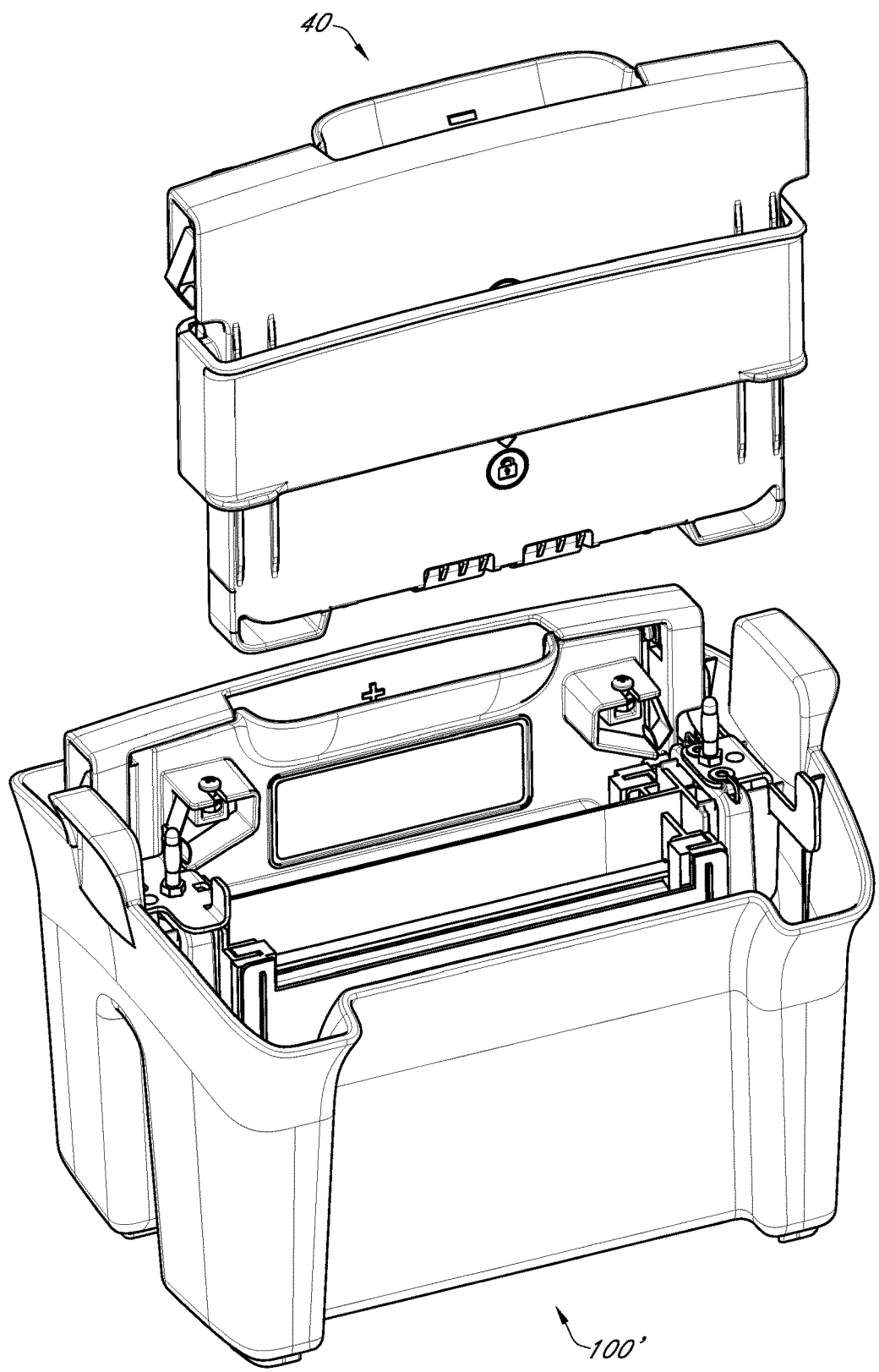
Figure 22E:
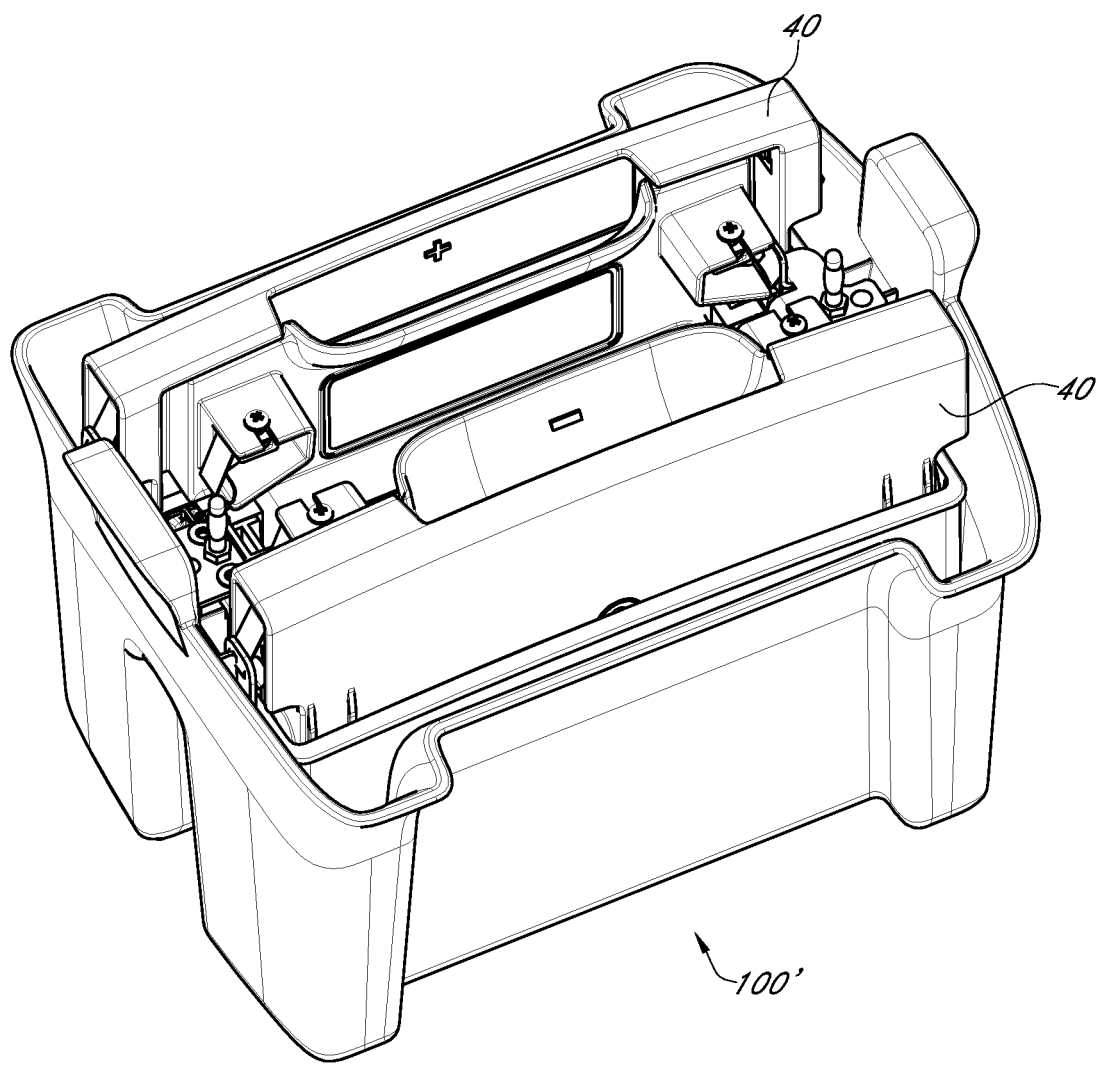

In one embodiment the locking and sealing is by sliding a slider on the electrotransfer cassette to lock and seal the electrotransfer cassette (for example, FIG. 22C and FIG. 22D or FIG. 10H). In another embodiment the locking and sealing is by clamping a clamp on the electrotransfer cassette to lock and seal the electrotransfer cassette (for example, FIGS. 11A-D).

Figure 22F:
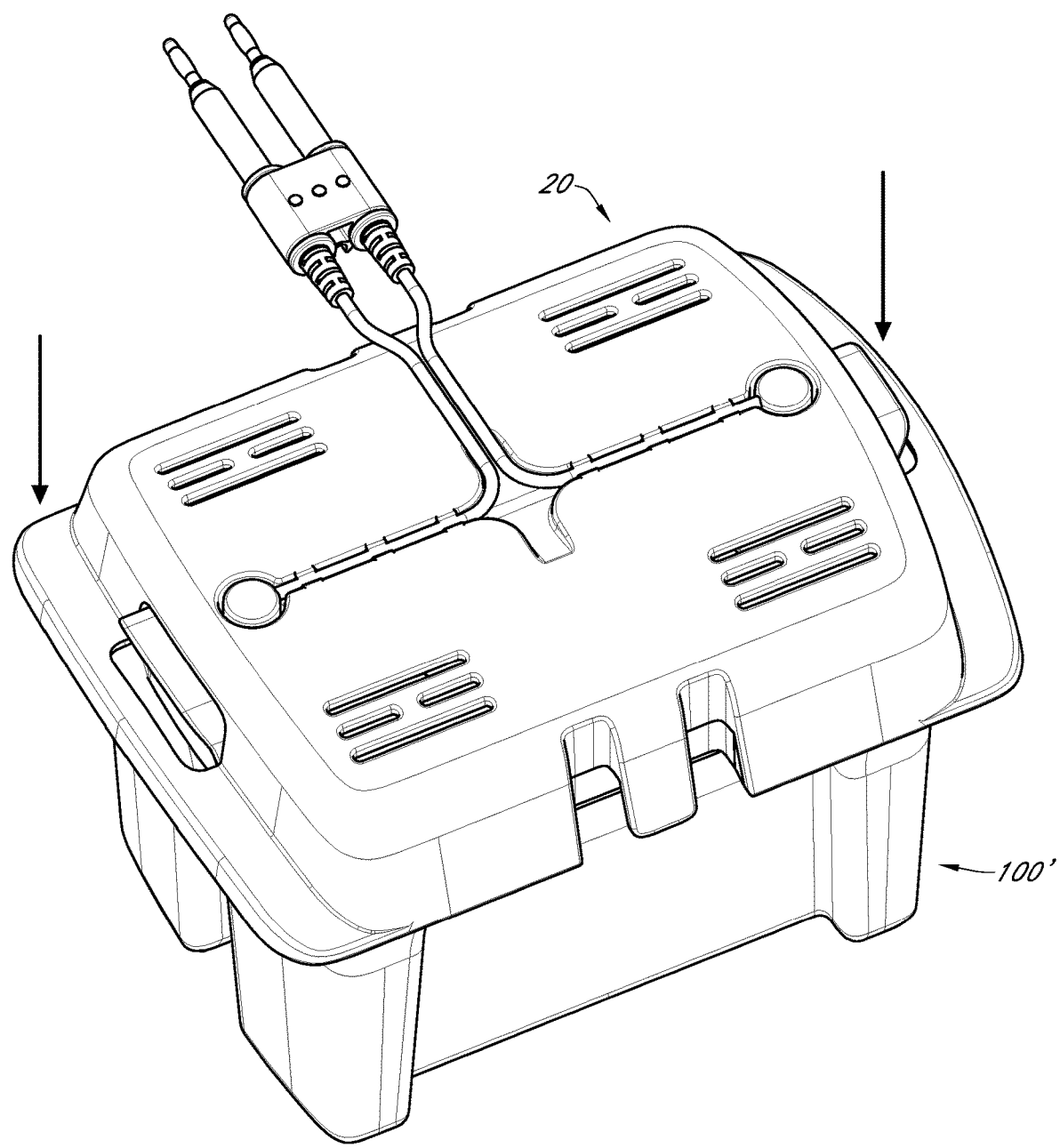

In some embodiments, the sealing forms a liquid-proof seal. In some embodiments the liquid-proof seal is formed on at least three sides of the electrotransfer cassette (FIG. 22D or FIG. 10H). In one embodiment, placing the electrotransfer cassette into a chamber of a system of the disclosure comprises: standing the electrotransfer cassette such that the joining side (hinge/hook side) is on the bottom of the system and the unsealed fourth side is on top (FIG. 22D or FIG. 10H). At this stage, the method can comprise optionally pouring an electrotransfer buffer into the opening on top of the electrotransfer cassette. In some embodiments, there is no need to pour additional electrotransfer buffer into the electrotransfer cassette since the transfer stack has sufficient buffer. In embodiments, where a system of the disclosure has a lid the step of connecting the electrical connection on the system to a power source comprises: placing the lid onto the chambers such that lid electrical connections, such as 23a and 24a, connect with chamber electrode connections, such as 12d and 13d, and connecting the electrical connection, such as 21, on the lid to a power source (FIG. 22F).

In some embodiments, the assembly of the transfer stack in the second plate is done by placing the open electrotransfer cassette into a tray to avoid spillage of buffer on surfaces (FIG. 22A and FIG. 22C). In some embodiments, the step of stack assembly comprises the steps of: soaking a filter paper and sponges in a transfer buffer; pouring transfer buffer into the first plate; placing a layer of sponge followed by filter paper on the second plate; orienting a gel comprising resolved biomolecules (nucleic acids or proteins) with the wells toward the bottom side of the electrotransfer cassette and placing this gel over the filter paper; placing a transfer membrane on top of the gel; using a roller to remove any bubbles from each layer of the stack (FIG. 22B).

In some embodiments, the step of stack assembly comprises the steps of: using a gel or a matrix or a material having ions; placing and orienting a gel comprising resolved biomolecules (nucleic acids or proteins) with the wells toward the bottom side of the electrotransfer cassette over the gel/matrix/material having ions. This embodiment relates to assembly of a dry blotting stack assembly. In some non-limiting examples, the gel/matrix/material having ions can comprise an ion reservoir or conductive ions in the gel/matrix/material that are not a liquid buffer.

In some embodiments, the present disclosure provides a method for simultaneously performing both electrotransfer and electrophoresis comprising: securing an electrophoresis cassette with a clamp in a first chamber of a system of the disclosure; loading a sample comprising biomolecules to be electrophoresed into the electrophoresis cassette; placing an electrotransfer cassette with a transfer stack having a gel with biomolecules and a blotting material onto which electrotransfer of biomolecules is desired into a second chamber of the system of the disclosure; selecting a voltage and optionally selecting a time for which the voltage run is desired using a power supply device; performing electrophoresis in the electrophoresis cassette and electrotransfer of biomolecules from the gel onto the blotting material. In some embodiments, the electrophoresis and the electrotransfer are each carried out at a different time since a common voltage is used.

EXAMPLES

Example 1

Electrophoresis Using Different Gel Chemistries

Electrophoresis Systems and Devices of the disclosure were used to perform electrophoresis on several different gel chemistries and formulations. Some non-limiting, exemplary run conditions during electrophoresis are provided in Table 1 for various types of gel chemistries for gels cast as midi-sized gels. The current values in the table below are for one gel. If running two gels, the current would be doubled. Note that current and run-time values are approximate and will vary depending on gel percentage and the power supply used for electrophoresis.

TABLE 1

| Gel Type | Constant Voltage (V) | Starting Current | Maximum Current | Run Time (minutes) |
| --- | --- | --- | --- | --- |
| 4-12% Bis-Tris (MES buffer) | 200 | 200 | 300 | 30 |
| 4-12% Bis-Tris (MOPS buffer) | 200 | 190 | 210 | 40 |
| 3-8% Tris-Acetate (Denatured) | 150 | 60 | 80 | 60 |
| 3-8% Tris-Acetate | 150 | 40 | 60 | 135 |
| 4-20% Tris-Glycine Plus (Denatured) | 200 | 90 | 100 | 60 |
| 4-20% Tris-Glycine Plus (Native) | 125 | 40 | 50 | 120 |

Example 2

Electrotransfer Systems, Devices and Methods Performance Compared to Existing Electrotransfer Devices In electrotransfer experiments the electrotransfer systems of the present disclosure were compared to a Bio-Rad's Criterion tank blotting (electrotransfer) system. In some embodiments, the present electrotransfer systems performed electrotransfer of proteins at much lower voltages, currents and power as compared to the Bio-Rad Criterion tank. In one example, performing electrotransfer using one NuPAGE midi-gel in both systems yielded the following results:

Electrotransfer in systems of the present disclosure were performed at 25 V/725 mA/18.1 W (note: 25V*0.725A=18.1 W)

In contrast, electrotransfer in Bio-Rad's Criterion Tank blotter required much higher voltages and power of 100 V/930 mA/93.0 W.

Accordingly, lower power and hence cheaper power supply units can be used with the electrotransfer systems of the present disclosure as compared to existing systems. For example, electrotransfer of proteins in four NuPAGE midi-size gels can be performed with a 3 A power supply in electrotransfer system and cassette of the present disclosure.

Example 3

Electrotransfer Systems & Devices Assembly and Performance

In electrotransfer experiments, electrotransfer systems of the present disclosure were compared to a Thermo Fisher Mini Blot Module B1000 (which is an existing electrotransfer system) to analyze the liquid-proof sealing by conducting experiments to study the comparative rate of leakage. A timed leak test was performed as follows:
1. Wet the electrotransfer system unit and open and close the unit while running it under water. Ensure the unit is wetted before each leak test.
2. Build an electrotransfer stack and saturate all components completely in water prior to measurements:
   1) Wet sponges (qty 2).
   2) Wet filter paper (qty 4)
   3) Assemble the electrotransfer stack in this order: Sponge (×1), filter papers (×4), and sponge (×1)
   4) Roll each layer with the blot roller to remove any bubbles between each stack layer.
3. Tared a weighing scale with the tray in which the electrotransfer system unit will be placed in
4. Timers were set for various time intervals of at least up to 30 mins, where 30 minutes is the recommended time for an electrotransfer.
5. The electrotransfer systems were closed and clamped
6. Shake/tap off any excess water
7. Stand the electrotransfer system in the tray on the weighing scale
8. Fill water to the bottom of the fill line
9. Start the timer
10. Record leak rate by lifting the electrotransfer system out of the tray and recording the weight of the water that may have leaked into the tray.

Results of the existing Thermo Fisher Mini Blot Module B1000 versus an exemplary electrotransfer system of disclosure the are provided in Tables 2 and 3 respectively. As can be seen in Tables 2 and 3, while the existing Mini Blot Module had an average 9.9675 grams of leaked water, the electrotransfer systems of the present disclosure in Table 3 had no leakage from the 0-30 minute measurements at various time intervals.

TABLE 2

Results of the Leak Test for the Thermo Fisher Mini Blot Module B1000: Mass of buffer leaked from Mini Blot Module B1000 System over time

|  | T = 0 min | T = 30 min | T = 90 min |
|---|---|---|---|
| Mini Blot Module 1 | 0 | 10.9 | Not measured |
| Mini Blot Module 2 | 0 | 9.04 | Not measured |
| Mini Blot Module 3 | 0 | 3.43 | 6.16 |
| Mini Blot Module 4 | 0 | 16.5 | 16.87 |
| Average | 0 | 9.9675 | 11.515 |

Note:
Mini Blot Modules 1, 2, 3 and 4 are different electrotransfer units used for the experiments

TABLE 3

Results of the Leak Test for an exemplary electrotransfer system of the present disclosure:

| Electrotransfer Unit Number | T = 1 min | T = 2 min | T = 5 min | T = 10 min | T = 15 min | T = 30 min |
|---|---|---|---|---|---|---|
| DVT #1 | 0 | 0 | 0 | 0 | 0 | 0 |
| DVT #2 | 0 | 0 | 0 | 0 | 0 | 0 |
| DVT #3* | 0 | 0 | 0 | 0 | 0 | 0 |
| Average | 0 | 0 | 0 | 0 | 0 | 0 |

Note:
DVT#1, #2 and #3 are different electrotransfer units used for the experiments.

Example 4

Electrotransfer Systems & Devices Performance

In electrotransfer experiments, electrotransfer systems of the present disclosure were subject to "accelerated aging" by treating the electrotransfer systems at 80° C. for various numbers of hours to simulate "real time aging." The devices were also subject to transfer runs, repetitive clamping and opening, and transfer buffer to simulate real use over time. The aged units were analyzed for liquid-proof sealing in relation to their "age" by conducting experiments to study the comparative rate of leakage. The set up for the timed leak test was performed as described in Example 3 above. Data for the rate of leakage in relation to aging is set forth in Table 4 below. As noted in Table 4, the hours of "aging" are correlated to equivalent time on the shelf for the electrotransfer units. For example, at Time=0 corresponded to no aging at 80° C., Time=one month corresponded to aging at 80° C. for 14.39 hours. Time=24 months corresponded to aging at 80° C. for 345.36 hours etc. This experiment demonstrated that even with aging the electrotransfer systems of the present disclosure had much lower leak rates than leak rates of existing systems.

TABLE 4

Accelerated Life Testing - Leak Test for exemplary electrotransfer systems of the present disclosure:

| Test # | Date | Time aged at 80 C. (hr) | Electrotransfer System Unit Number | 1 min leak (g) | 2 min leak (g) | 5 min leak (g) | 10 min leak (g) | 15 min leak (g) | 30 min leak (g) |
|---|---|---|---|---|---|---|---|---|---|
| | | | Equivalent Time = Zero | | | | | | |
| 1 | 19 Nov. 2019 | 0 | DVT #1 | 0 | 0 | 0 | 0 | 0 | 0 |
| 1 | 19 Nov. 2019 | 0 | DVT #2 | 0 | 0 | 0 | 0 | 0 | 0 |
| 1 | 19 Nov. 2019 | 0 | DVT #3* | 0 | 0 | 0 | 0 | 0 | 0 |

TABLE 4-continued

Accelerated Life Testing - Leak Test for exemplary electrotransfer systems of the present disclosure:

| Test # | Date | Time aged at 80 C. (hr) | Electrotransfer System Unit Number | 1 min leak (g) | 2 min leak (g) | 5 min leak (g) | 10 min leak (g) | 15 min leak (g) | 30 min leak (g) |
|---|---|---|---|---|---|---|---|---|---|
| | | | Equivalent Time = One Month | | | | | | |
| 2 | 22 Nov. 2019 | 14.39 | DVT #1 | 0 | 0 | 0.3 | 0.3 | 0.26 | 0.26 |
| 2 | 22 Nov. 2019 | 14.39 | DVT #2 | 0 | 0 | 0 | 0 | 0 | 0 |
| | | | Equivalent Time = 6 months | | | | | | |
| 3 | 26 Nov. 2019 | 86.34 | DVT #1 | 0 | 0 | 0 | 0 | 0 | 0 |
| 3 | 26 Nov. 2019 | 86.34 | DVT #2 | 0 | 0 | 0 | 0 | 0 | 0 |
| | | | Equivalent Time = 12 months | | | | | | |
| 4 | 26 Nov. 2019 | 172.67 | DVT #1 | 0 | 0 | 0 | 0 | 0 | 0 |
| 5 | 26 Nov. 2019 | 172.67 | DVT #1 | 0 | 0 | 0 | 0 | 0 | 0 |
| 4 | 26 Nov. 2019 | 172.67 | DVT #2 | 0 | 0 | 0.15 | 0.5 | 0.8 | 1.6 |
| 5 | 26 Nov. 2019 | 172.67 | DVT #2 | 0 | 0 | 0 | 0 | 0 | 0 |
| | | | Equivalent Time = 12 months-unaged gaskets | | | | | | |
| 6 | 26 Nov. 2019 | 0 | DVT #1 | 0 | 0 | 0 | 0 | 0.45 | 0.45 |
| 6 | 26 Nov. 2019 | 0 | DVT #2 | 0 | 0 | 0 | 0 | 0 | 0 |
| | | | Equivalent Time = 24 months-DVT #3 | | | | | | |
| 2 | 11 Dec. 2019 | 345.36 | DVT #3* | 0 | 0 | 0 | 0.4 | 1.02 | 1.8 |
| 2 | 11 Dec. 2019 | 0 | DVT #3* | 0 | 0 | 0 | 0 | 0 | 0 |
| | | | Equivalent Time = 24 months | | | | | | |
| 7 | 23 Dec. 2019 | 345.36 | DVT #1 | 1.1 | 1.77 | 3.65 | 6.66 | 9.1 | 15.78 |
| 8 | 23 Dec. 2019 | 345.36 | DVT #1 | 0 | 0 | 0 | 0 | 0.72 | 0.8 |
| 7 | 23 Dec. 2019 | 345.36 | DVT #2 | 1.42 | 1.58 | 1.65 | 1.73 | 1.6 | 1.6 |
| 8 | 23 Dec. 2019 | 345.36 | DVT #2 | 0.7 | 1.43 | 2.21 | 2.34 | 2.43 | 2.25 |
| 9 | 23 Dec. 2019 | 0 | DVT #1 | 0 | 0 | 0 | 0 | 0 | 0 |
| 9 | 23 Dec. 2019 | 0 | DVT #2 | 0 | 0 | 0 | 0 | 0 | 0.55 |
| 10 | 24 Dec. 2019 | 345.36 | DVT #1 | 0 | 0 | 0 | 0 | 0 | 0 |
| 10 | 24 Dec. 2019 | 345.36 | DVT #2 | 0 | 0 | 0 | 0 | 0 | 0 |
| | | | Average amount leaked for all tests | 0.14 | 0.21 | 0.35 | 0.52 | 0.71 | 1.09 |

*DVT units were aged from 0-24 months

Since existing Mini Blot Module B1000 systems that were tested in the 30 minute leak test in Example 3 were older and used systems they are comparable to the electrotransfer systems of the present disclosure that were subject to accelerated aging as described above.

Tables 5 and 6 below provide a summary of data for 30 minute Leak Tests for accelerated aged electrotransfer systems of the present disclosure compared to older Mini Blot Module B1000 systems which extracted from the tables above for easier comparison of 30 minute performance.

TABLE 5

Leak Rate of Blot Modules of the Present Disclosure

| Test # | Blot Module | 30 min leak (g) |
|---|---|---|
| 1 | DVT #1 | 0 |
| 2 | DVT #2 | 0 |
| 3 | DVT #3 | 0 |
| 4 | DVT #1 | 0.26 |
| 5 | DVT #2 | 0 |
| 6 | DVT #1 | 0 |
| 7 | DVT #2 | 0 |
| 8 | DVT #1 | 0 |
| 9 | DVT #1 | 0 |
| 10 | DVT #2 | 1.6 |
| 11 | DVT #2 | 0 |
| 12 | DVT #1 | 0.45 |
| 13 | DVT #2 | 0 |
| 14 | DVT #3 | 1.8 |
| 15 | DVT #3 | 0 |
| 16 | DVT #1 | 15.78 |
| 17 | DVT #1 | 0.8 |
| 18 | DVT #2 | 1.6 |
| 19 | DVT #2 | 2.25 |
| 20 | DVT #1 | 0 |
| 21 | DVT #2 | 0.55 |
| 22 | DVT #1 | 0 |
| 23 | DVT #2 | 0 |
| Average leak amount | | 1.09 |

TABLE 6

Leak Rate of Mini Blot Module B1000 System

| Test # | Blot Module | 30 min leak (g) |
|---|---|---|
| 1 | Mini Blot Module 1 | 10.9 |
| 2 | Mini Blot Module 2 | 9.04 |
| 3 | Mini Blot Module 3 | 3.43 |
| 4 | Mini Blot Module 4 | 16.5 |
| Mini average leak amount | | 9.97 |

As seen from the summary of data for the 30 minute leak tests existing Mini Blot Module B1000 systems has a 30 minute leak rate of 9.97 g as compared to several tests for the electroblot systems of the present disclosure that has a leak rate of 1.09 g.

All publications, patents, and patent applications mentioned in this specification are herein incorporated by reference to the same extent as if each individual publication, patent, or patent application was specifically and individually indicated to be incorporated by reference.

While embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A system, comprising:
   a tank portion comprising:
      at least two chambers;
         each chamber of the at least two chambers independently configured to receive either an electrophoresis cassette or an electrotransfer cassette; and
      a first electrode and a second electrode,
         wherein the first electrode and the second electrode each have an electrical interface that can be connected to a power supply,
         wherein the first electrode comprises a first extension that extends into a first chamber of the at least two chambers and a second extension that extends into a second chamber of the at least two chambers,
         wherein the second electrode comprises a first extension that extends into the first chamber of the at least two chambers and a second extension that extends into the second chamber of the at least two chambers such that each chamber of the at least two chambers has an anode and a cathode,
         wherein the first extension of the first electrode is disposed across the first chamber and spaced apart from the first extension of the second electrode, and
         wherein the second extension of the first electrode is disposed across the second chamber and spaced apart from the second extension of the second electrode.

2. The system of claim 1, wherein the at least two chambers are arranged back to back, the at least two chambers are adjacent to each other, or the at least two chambers are arranged in tandem.

3. The system of claim 1, wherein the at least two chambers are separated by at least one common surface between them.

4. The system of claim 3, wherein the first electrode and the second electrode lie along the at least one common surface.

5. The system of claim 1, further comprising:
   a lid configured to cover the at least two chambers, the lid comprising:
      an electrical connection that is removably connectable to a power source; and
      one or more electrical contacts configured to electrically connect with the first electrode and the second electrode, to complete an electrical circuit between the first electrode and the second electrode for each of the at least two chambers, when the lid is placed on the at least two chambers.

6. The system of claim 1, wherein each chamber of the at least two chambers is further configured to independently receive a clamping mechanism that is operable to clamp the electrophoresis cassette.

7. The system of claim 6, wherein placement and clamping of the electrophoresis cassette into one of the at least two chambers forms two fluidically separated sub-chambers in the one of the at least two chambers.

8. The system of claim 7, wherein a first sub-chamber is formed between a portion of a first interior surface of the one of the at least two chambers, a portion of a gasket, and a plate of the electrophoresis cassette that faces the first interior surface of the one of the at least two chambers, and wherein a second sub-chamber is formed between left and right sides of the electrophoresis cassette, an outer edge of the plate of the electrophoresis cassette that faces toward a second interior surface of the one of the at least two chambers and a remainder of the one of the at least two chambers into which the electrophoresis cassette and the clamping mechanism are placed.

9. The system of claim 6, wherein the clamping mechanism comprises:
   a cam plate having a flat surface and two protruding ridges;
   the two protruding ridges of the cam plate configured to be placed adjacent to and in contact with edges of a first plate of the electrophoresis cassette;
   two independently movable cam handles that are operable to move forward toward the cam plate or backward away from the cam plate;
   the two cam handles attached to the cam plate via a peg located on the cam plate;
   wherein moving the cam handles forward toward the cam plate secures the electrophoresis cassette to the flat surface; and
   wherein moving the cam handles backward away from the cam plate releases the electrophoresis cassette from the flat surface.

10. The system of claim 1, wherein the second electrode lies along a wall of the first chamber.

11. The system of claim 1, wherein the second electrode lies along a wall of the second chamber.

* * * * *